United States Patent
Zhu et al.

(10) Patent No.: US 12,245,104 B2
(45) Date of Patent: Mar. 4, 2025

(54) MULTICAST SERVICE TRANSMISSION METHOD AND DEVICE

(71) Applicant: Huawei Technologies Co., Ltd., Guangdong (CN)

(72) Inventors: Yuanping Zhu, Shanghai (CN); Yada Huang, Shanghai (CN); Jun Wang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/315,264

(22) Filed: May 10, 2023

(65) Prior Publication Data

US 2023/0362594 A1 Nov. 9, 2023

Related U.S. Application Data

(63) Continuation of application No. 16/868,834, filed on May 7, 2020, now abandoned, which is a continuation
(Continued)

(30) Foreign Application Priority Data

Nov. 9, 2017 (CN) .......................... 201711098505.6

(51) Int. Cl.
*H04W 4/06* (2009.01)
*H04N 21/6405* (2011.01)
(Continued)

(52) U.S. Cl.
CPC ............. *H04W 4/06* (2013.01); *H04W 76/10* (2018.02); *H04N 21/6405* (2013.01); *H04N 21/64322* (2013.01); *H04W 88/16* (2013.01)

(58) Field of Classification Search
CPC ..... H04W 68/005; H04W 76/10; H04W 4/06; H04W 88/16; H04N 21/6405; H04N 21/64322
See application file for complete search history.

(56) References Cited

U.S. PATENT DOCUMENTS

2008/0175238 A1 7/2008 Venkatachalam
2015/0208209 A1 7/2015 Jamadagni et al.
(Continued)

FOREIGN PATENT DOCUMENTS

| CN | 101155047 A | 4/2008 |
| CN | 101155053 A | 4/2008 |

(Continued)

OTHER PUBLICATIONS

3GPP TR 23.746, V14.0.0, "3rd Generation Partnership Project; Technical Specification GroupServices and System Aspects; Study on System ArchitectureEnhancements to eMBMS for Television Video Service (Release 14)",Sep. 26, 2016 (Sep. 26, 2016), pp. 1-38, XP051295332.
(Continued)

*Primary Examiner* — Joshua L Schwartz
(74) *Attorney, Agent, or Firm* — WOMBLE BOND DICKINSON (US) LLP

(57) ABSTRACT

A multicast service transmission method includes: a management device that receives a first message; the management device based on the first message, instructs a gateway device to send a data packet of the first multicast service to the terminal device or the access network device, or the management device instructs a gateway device to stop sending a data packet of the first multicast service to the terminal device or the access network device.

20 Claims, 29 Drawing Sheets

Related U.S. Application Data of application No. PCT/CN2018/114842, filed on Nov. 9, 2018.

(51) Int. Cl.
*H04N 21/643* (2011.01)
*H04W 76/10* (2018.01)
*H04W 88/16* (2009.01)

(56) References Cited

U.S. PATENT DOCUMENTS

| | | | |
|---|---|---|---|
| 2015/0229523 A1 | 8/2015 | Park et al. | |
| 2016/0105291 A1* | 4/2016 | Anchan | H04W 76/14 370/312 |
| 2016/0316351 A1 | 10/2016 | Kodaypak et al. | |
| 2016/0337937 A1 | 11/2016 | Mccann et al. | |
| 2017/0041752 A1* | 2/2017 | Baek | H04W 4/06 |
| 2020/0059761 A1* | 2/2020 | Li | H04L 63/0892 |

FOREIGN PATENT DOCUMENTS

| | | |
|---|---|---|
| CN | 101163260 A | 4/2008 |
| CN | 106550334 A | 3/2017 |
| CN | 106658418 A | 5/2017 |
| IN | 105472568 A | 4/2016 |
| WO | 2016161242 A1 | 10/2016 |

OTHER PUBLICATIONS

3GPP TS 23.501 V1.4.0 (Sep. 2017); 3rd Generation Partnership Project; Technical Specification Group Services and System Aspects; System Architecture for the 5G System;Stage 2(Release 15);total 151 pages.

Ning Liao et al: "Optimized Multicast Service Management in aMobile WiMAX TV System", Jan. 10, 2009 (Jan. 10, 2009), pp. 1-5, XP031425415.

Huawei et al: "5WWC High level requirements", 3GPP Draft; S2-176713_Sep. 1, 2017 (Sep. 1, 2017), XP051336017, total 4 pages.

3GPP TS 38.300 V1.1.1 (Oct. 2017),3rd Generation Partnership Project; Technical Specification Group Radio Access Network;NR; NR and NG-RAN Overall Description;Stage 2(Release 15), total:60pages.

3GPP TS 38.413 V0.4.0 (Oct. 2017),3rd Generation Partnership Project; Technical Specification Group Radio Access Network;NG Radio Access Network(NG-RAN); NG Application Protocol (NGAP)(Release 15), total:88pages.

\* cited by examiner

MULTICAST SERVICE TRANSMISSION METHOD AND DEVICE

CROSS-REFERENCE TO RELATED APPLICATIONS

This application is a continuation of U.S. patent application Ser. No. 16/868,834, filed on May 7, 2020, which is a continuation of International Application No. PCT/CN2018/114842, filed on Nov. 9, 2018, which claims priority to Chinese Patent Application No. 201711098505.6, filed on Nov. 9, 2017. All of the afore-mentioned patent applications are hereby incorporated by reference in their entireties.

TECHNICAL FIELD

This application relates to the communications field, and more particularly, to a multicast service transmission method, a management device, a gateway device, an access network device, and a terminal device.

BACKGROUND

In recent years, with vigorous development of network construction, a popularity rate of broadband gradually increases on the earth. A large quantity of emerging services emerge. Therefore, networks are continuously requested to have a higher speed. Some old and traditional wired connection modes cannot meet requirements of broadband services for higher speeds. A large quantity of optical fibers need to be deployed to reconstruct and upgrade access networks. However, in some old metropolitan areas or some remote areas with much land and few people, laying of optical fibers is extremely expensive, and construction costs are high. Therefore, to meet a broadband access requirement in this scenario, wireless access becomes a possible option.

For home broadband access, an internet protocol television (IPTV) is an important wireless access service. The IPTV service includes a live TV service and a video on demand (VoD) service. For the IPTV, a live TV program is a typical IP multicast service, and is distributed among a content server, an intermediate routing node, and a terminal device in a multicast mode, but a video on demand program is distributed from a content server to a terminal device in a unicast mode. Each live TV channel program in the IPTV can be used as a multicast service and assigned with a multicast address. The multicast address represents a set of corresponding receivers. For a terminal wanting to receive an IP multicast service, the terminal needs to request to join/exit a multicast IP address corresponding to a multicast service by using the internet group management protocol (IGMP) or the multicast listener discovery protocol (MLD), to start to receive/terminate the corresponding multicast service. A process in which a user switches channels is a process in which the terminal leaves or joins the multicast service. In addition, some information or content may also be pushed in a multicast mode, to improve transmission efficiency and reduce pressure on a backhaul network. Therefore, it needs to be considered that a multicast service is supported in a radio network architecture.

SUMMARY

This application provides a multicast service transmission method, a management device, a gateway device, an access network device, and a terminal device, so that in a wireless access system, a multicast service can be supported, and services such as an internet television service are compatible. This reduces costs of providing the multicast service by an operator.

According to a first aspect, a multicast service transmission method is provided. The method includes: receiving, by a management device, a first message, where the first message includes any one or more of the following: an identifier corresponding to a first multicast service, an indication for requesting to receive or terminate the first multicast service, an identifier of a terminal device requesting to receive or terminate the first multicast service, and an identifier of an access network device serving the terminal device; and instructing, by the management device, a gateway device to send a data packet of the first multicast service to the terminal device or the access network device, or instructing, by the management device, a gateway device to stop sending a data packet of the first multicast service to the terminal device or the access network device.

Therefore, in this application, the management device instructs the gateway device to send the data packet of the first multicast service to the terminal device or the access network device, and the management device instructs the gateway device to stop sending the data packet of the first multicast service to the terminal device or the access network device, so that in a wireless scenario, a multicast service can be accessed, and services such as an internet television service are compatible. This reduces costs of providing the multicast service by an operator.

In one embodiment of the first aspect, the method further includes: updating, by the management device, a multicast member list based on the first message, where the multicast member list includes any one or more of the following: an identifier corresponding to a multicast service whose connection has been established, an identifier corresponding to a terminal device requesting the multicast service whose connection has been established, and an identifier corresponding to an access network device serving the terminal device requesting the multicast service whose connection has been established.

In one embodiment of the first aspect, the updating, by the management device, a multicast member list based on the first message includes:

adding, by the management device, an information entry corresponding to both the terminal device and the first multicast service to the multicast member list; or setting, by the management device in the multicast member list, an information entry corresponding to both the terminal device and the first multicast service to be valid; or deleting, by the management device, an information entry corresponding to both the terminal device and the first multicast service from the multicast member list; or setting, by the management device in the multicast member list, an information entry corresponding to both the terminal device and the first multicast service to be invalid; or adding, by the management device, an information entry corresponding to both the access network device and the first multicast service to the multicast member list; or setting, by the management device in the multicast member list, an information entry corresponding to both the access network device and the first multicast service to be valid; or deleting, by the management device, an information entry corresponding to both the access network device and the first multicast service from the multicast member list; or setting, by the management device in the multicast member list, an information entry corresponding to both the access network device and the first multicast service to be invalid, where the information entry corresponding to both the terminal device and the first multicast service includes the identifier corresponding to the first multicast service and the identifier corresponding to the terminal device; and the information entry corresponding to both the access network device and the first multicast service includes the identifier corresponding to the first multicast service and the identifier corresponding to the access network device.

In one embodiment of the first aspect, the method further includes: instructing, by the management device, the gateway device to establish a connection related to the first multicast service to the network device.

In one embodiment of the first aspect, the method further includes: when a valid information entry of the multicast member list does not include an information entry of the first multicast service, instructing, by the management device, the gateway device to disconnect the connection related to the first multicast service to the network device.

In one embodiment of the first aspect, the method further includes: sending, by the management device, a second message, where the second message is used to query whether there is a device requesting to receive the first multicast service in a network served by the management device, the second message includes the identifier corresponding to the first multicast service, and the device includes a terminal device and an access network device; or the second message is used to query whether there is a device requesting to receive any multicast service in a network served by the management device, and the device includes a terminal device and an access network device.

In one embodiment of the first aspect, the identifier corresponding to the terminal device includes any one or more of the following information:

an identifier of the terminal device, an identifier of a connection session established by the terminal device, a bearer identifier of the terminal device, a tunnel identifier corresponding to a session or a bearer of the terminal device, an identifier of the access network device serving the terminal device, and an identifier of a cell serving the terminal device.

In one embodiment of the first aspect, the method further includes: sending, by the management device, second configuration information to the access network device, where the second configuration information includes any one or more of the following information: first indication information used to indicate a mode in which the gateway device sends the data packet of the first multicast service to the access network device, and/or second indication information used to indicate a mode in which the access network device sends the data packet of the first multicast service to the terminal device, where the mode in which the gateway device sends the data packet of the first multicast service to the access network device includes that the gateway device sends the data packet of the first multicast service to the access network device in a unicast mode or a multicast mode, and the mode in which the access network device sends the data packet of the first multicast service to the terminal device includes that the access network device sends the data packet of the first multicast service to the terminal device in a unicast mode or a multicast mode.

In one embodiment of the first aspect, the method further includes: sending, by the management device, a third message to the access network device, where the third message includes: an identifier corresponding to an added or deleted terminal device that is served by the access network device and that is in a member of the first multicast service, and the identifier corresponding to the first multicast service; and the member of the first multicast service includes a terminal device requesting to receive the first multicast service.

In one embodiment of the first aspect, a function of the management device and a function of the gateway device are set in a same device.

In one embodiment of the first aspect, the method further includes: obtaining, by the management device, a quality of service parameter of the first multicast service; and sending, by the management device, a quality of service profile to the access network device, where the quality of service profile includes an identifier of a quality of service flow QoS flow corresponding to the first multicast service, and a quality of service parameter corresponding to the QoS flow; or the quality of service profile includes an identifier of a bearer corresponding to the first multicast service, and a quality of service parameter corresponding to the bearer.

In one embodiment of the first aspect, the method further includes: sending, by the management device, a fourth message to the gateway device, where the fourth message includes any one or more of the following: first configuration information including the first indication information, the identifier corresponding to the added or deleted terminal device that is served by the gateway device and that is in the member of the first multicast service, an identifier corresponding to an access network device serving the terminal device, and the identifier corresponding to the first multicast service; and the first indication information is indication information used to indicate a send mode of the data packet of the first multicast service between the gateway device and the access network device.

In one embodiment of the first aspect, the method further includes: sending, by the management device, configuration information of the first multicast service flow to the gateway device, where the configuration information of the first multicast service flow includes a service data flow (SDF) template related to the first multicast service, and the SDF template includes at least one packet filtering rule used by the gateway device to map, according to the packet filtering rule, a received data packet of the first multicast service to a QoS flow matching with the first multicast service for sending.

According to a second aspect, a multicast service transmission method is provided. The method includes: receiving, by a gateway device, a data packet that is of a first multicast service and that is sent by a network device; and sending, by the gateway device, the data packet of the first multicast service to an access network device, where the sending, by the gateway device, the data packet of the first multicast service to an access network device includes: sending, by the gateway device, the data packet of the first multicast service to the access network device in a multicast mode, or sending, by the gateway device, the data packet of the first multicast service to the access network device in a unicast mode.

Therefore, in this application, the gateway device receives the data packet that is of the first multicast service and that is sent by the network device, and the gateway device sends the data packet of the first multicast service to the access network device, so that in a wireless access system, the gateway device may access a multicast service, and services such as an internet television service are compatible. This reduces costs of providing the multicast service by an operator.

In one embodiment of the second aspect, the sending, by the gateway device, the data packet of the first multicast service to the access network device in a multicast mode includes:
  sending, by the gateway device, the data packet of the first multicast service to the access network device through a first channel, where the first channel is a channel for transmitting the data packet of the first multicast service; or
  sending, by the gateway device, the data packet of the first multicast service to the access network device through a first channel, where the first channel is a channel for transmitting data packets of a plurality of different multicast services.

In one embodiment of the second aspect, the sending, by the gateway device, the data packet of the first multicast service to the access network device in a unicast mode includes:
  replicating, by the gateway device, a received data packet of the first multicast service according to a quantity of terminal devices requesting to receive the first multicast service, where a data packet that is of the first multicast service and that is obtained after the replication includes a first identifier, and the first identifier is used to indicate a terminal device requesting to receive the data packet of the first multicast service; or
  the sending, by the gateway device, the data packet of the first multicast service to the access network device in a multicast mode includes:
  replicating, by the gateway device, a received data packet of the first multicast service according to a quantity of access network devices serving terminal devices requesting to receive the first multicast service, where a data packet that is of the first multicast service and that is obtained after the replication includes a second identifier, and the second identifier is used to indicate the first multicast service.

According to a third aspect, a multicast service transmission method is provided. The method includes: receiving, by an access network device, a data packet that is of a first multicast service and that is from a gateway device; and
  sending, by the access network device, the data packet of the first multicast service to a terminal device based on a multicast member list, where the sending, by the access network device, the data packet of the first multicast service to a terminal device includes: sending, by the access network device, the data packet of the first multicast service to the terminal device in a multicast mode, or sending, by the access network device, the data packet of the first multicast service to the terminal device in a unicast mode.

In one embodiment of the third aspect, the method further includes: receiving, by the access network device, a third message from a management device, where the third message includes any one or more of the following: an indication for adding or deleting a multicast member, an identifier corresponding to an added or deleted terminal device, and an identifier corresponding to the first multicast service; or
  receiving, by the access network device, a fifth message from the terminal device, where the fifth message is a message used by the terminal device to request to receive or terminate the first multicast service, and the fifth message includes any one or more of the following: an identifier corresponding to the first multicast service and an identifier corresponding to the terminal device.

In one embodiment of the third aspect, the access network device may update the multicast member list based on the third message or the fifth message, where the multicast member list includes: an identifier corresponding to a multicast service whose connection has been established, and/or an identifier corresponding to a terminal device requesting to receive the multicast service whose connection has been established; and the method includes:
  adding, by the access network device, an information entry corresponding to both the terminal device and the first multicast service to the multicast member list; or
  setting, by the access network device in the multicast member list, an information entry corresponding to both the terminal device and the first multicast service to be valid; or
  deleting, by the access network device, an information entry corresponding to both the terminal device and the first multicast service from the multicast member list; or
  setting, by the access network device in the multicast member list, an information entry corresponding to both the terminal device and the first multicast service to be invalid, where
  the information entry corresponding to both the terminal device and the first multicast service includes the identifier corresponding to the first multicast service and the identifier corresponding to the terminal device.

In one embodiment of the third aspect, the method further includes: sending, by the access network device, a sixth message to the management device, where the sixth message includes any one or more of the following: the identifier corresponding to the first multicast service, an indication for requesting to receive or terminate the first multicast service, an identifier of a terminal device requesting to receive or terminate the first multicast service, and an identifier of the access network device.

In one embodiment of the third aspect, the identifier corresponding to the terminal device includes any one or more of the following information:
  an identifier of the terminal device, an identifier of a connection session established by the terminal device, a bearer identifier of the terminal device, and a tunnel identifier corresponding to a session or a bearer of the terminal device.

In one embodiment of the third aspect, the sending, by the access network device, the data packet of the first multicast service to a terminal device based on a multicast member list includes:
  determining, by the access network device, that the access network device sends the data packet of the first multicast service to the terminal device in a multicast mode or a unicast mode, based on any one or more of the following: a quantity of terminal devices requesting to receive the first multicast service, quality of a link between the access network device and a terminal device requesting to receive the first multicast service, and second indication information that is sent by the management device and that is used to indicate a mode in which the access network device sends the data packet of the first multicast service to the terminal device.

In one embodiment of the third aspect, the sending, by the access network device, the data packet of the first multicast service to the terminal device in a unicast mode includes: replicating, by the access network device, a received data packet of the first multicast service according to the quantity of terminal devices requesting to receive the first multicast service; and after adding a first identifier to a data packet that is of the first multicast service and that is obtained after the replication, sending, by the access network device, a data packet including the first identifier to the terminal device requesting to receive the first multicast service, where the first identifier is used to indicate the terminal device requesting to receive the data packet of the first multicast service.

According to a fourth aspect, a multicast service transmission method is provided. The method includes: obtaining, by a first terminal device, multicast service session connection indication information; and sending, by the first terminal device, first request information to an access network device based on a multicast service session connection indication information, where the first request information is used to request establishment of a session supporting a multicast service.

In one embodiment of the fourth aspect, the method further includes: receiving, by the first terminal device, a seventh message sent by a second terminal device, where the seventh message includes any one or more of the following: an identifier corresponding to a first multicast service, an indication for requesting to receive or terminate the first multicast service, and an identifier of the second terminal device; and the obtaining, by a first terminal device, multicast service session connection indication information includes:
considering, by the first terminal device, the seventh message as the multicast service session connection indication, where the seventh message includes an indication for requesting to receive the first multicast service; or
obtaining, by the first terminal device, the multicast service session connection indication based on a service request of an application layer; or
obtaining, by the first terminal device, the multicast service session connection indication based on preconfigured information.

In one embodiment of the fourth aspect, the method further includes: sending, by the first terminal device, an eighth message to the access network device, where the eighth message includes any one or more of the following: the identifier corresponding to the first multicast service, the indication for requesting to receive or terminate the first multicast service, an identifier corresponding to the first terminal device, and the identifier of the second terminal device.

In one embodiment of the fourth aspect, the method further includes:
receiving, by the first terminal device, the seventh message of the second terminal device, and updating, by the first terminal device, a multicast member list based on the seventh message, where
the multicast member list includes any one or more of the following: an identifier corresponding to a multicast service that can be received by the first terminal device, and an identifier corresponding to the second terminal device.

In one embodiment of the fourth aspect, the updating, by the first terminal device, a multicast member list based on the seventh message includes:
adding, by the first terminal device, an information entry corresponding to both the second terminal device and the first multicast service to the multicast member list; or
setting, by the first terminal device in the multicast member list, an information entry corresponding to both the second terminal device and the first multicast service to be valid; or
deleting, by the first terminal device, an information entry corresponding to both the second terminal device and the first multicast service from the multicast member list; or
setting, by the first terminal device in the multicast member list, an information entry corresponding to both the second terminal device and the first multicast service to be invalid, where
the information entry corresponding to both the second terminal device and the first multicast service includes the identifier corresponding to the first multicast service and the identifier corresponding to the second terminal device; and the identifier corresponding to the second terminal device includes any one or more of the following: the identifier of the second terminal device, an identifier of an interface/a port between the second terminal device and the first terminal device, an identifier of a bearer or a logical channel between the second terminal device and the first terminal device, and the like.

According to a fifth aspect, a management device is provided. The management device includes: a receiving module, configured to receive a first message, where the first message includes any one or more of the following: an identifier corresponding to a first multicast service, an indication for requesting to receive or terminate the first multicast service, an identifier corresponding to a terminal device requesting to receive or terminate the first multicast service, and an identifier corresponding to an access network device serving the terminal device; and a sending module, configured to instruct a gateway device to send a data packet of the first multicast service to the terminal device or the access network device, or instruct the gateway device to stop sending a data packet of the first multicast service to the terminal device or the access network device.

In one embodiment of the fifth aspect, the management device further includes processing module. The processing module is configured to update a multicast member list based on the first message, where the multicast member list includes any one or more of the following: an identifier corresponding to a multicast service whose connection has been established, an identifier corresponding to a terminal device requesting the multicast service whose connection has been established, and an identifier corresponding to an access network device serving the terminal device requesting the multicast service whose connection has been established.

In one embodiment of the fifth aspect, the processing module is configured to:
add an information entry corresponding to both the terminal device and the first multicast service to the multicast member list; or set, in the multicast member list, an information entry corresponding to both the terminal device and the first multicast service to be valid; or delete an information entry corresponding to both the terminal device and the first multicast service from the multicast member list; or set, in the multicast member list, an information entry corresponding to both the terminal device and the first multicast service to be invalid; or add an information entry corresponding to both the access network device and the first multicast service to the multicast member list; or set, in the multicast member list, an information entry corresponding to both the access network device and the first multicast service to be valid; or delete an information entry corresponding to both the access network device and the first multicast service from the multicast member list; or set, in the multicast member list, an information entry corresponding to both the access network device and the first multicast service to be invalid, where the information entry corresponding to both the terminal device and the first multicast service includes the identifier corresponding to the first multicast service and the identifier corresponding to the terminal device; and the information entry corresponding to both the access network device and the first multicast service includes the identifier corresponding to the first multicast service and the identifier corresponding to the access network device.

In one embodiment of the fifth aspect, the sending module is configured to: instruct the gateway device to establish a connection related to the first multicast service to a network device.

In one embodiment of the fifth aspect, the sending module is configured to: when a valid information entry of the multicast member list does not include an information entry of the first multicast service, instruct the gateway device to disconnect the multicast connection related to the first multicast service to the network device.

In one embodiment of the fifth aspect, the sending module is configured to: send a second message, where the second message is used to query whether there is a device requesting to receive the first multicast service in a network served by the management device, the second message includes the identifier corresponding to the first multicast service, and the device includes a terminal device and an access network device; or the second message is used to query whether there is a device requesting to receive any multicast service in a network served by the management device, and the device includes a terminal device and an access network device.

In one embodiment of the fifth aspect, the identifier corresponding to the terminal device includes any one or more of the following information: an identifier of the terminal device, an identifier of a connection session established by the terminal device, a bearer identifier of the terminal device, a tunnel identifier corresponding to a session or a bearer of the terminal device, an identifier of the access network device serving the terminal device, and an identifier of a cell serving the terminal device.

In one embodiment of the fifth aspect, the processing module is further configured to:

send second configuration information to the access network device, where the second configuration information includes any one or more of the following information: first indication information used to indicate a mode in which the gateway device sends the data packet of the first multicast service to the access network device, and/or second indication information used to indicate a mode in which the access network device sends the data packet of the first multicast service to the terminal device, where the mode in which the gateway device sends the data packet of the first multicast service to the access network device includes that the gateway device sends the data packet of the first multicast service to the access network device in a unicast mode or a multicast mode, and the mode in which the access network device sends the data packet of the first multicast service to the terminal device includes that the access network device sends the data packet of the first multicast service to the terminal device in a unicast mode or a multicast mode.

In one embodiment of the fifth aspect, the sending module is configured to: send a third message to the access network device, where the third message includes: an identifier corresponding to an added or deleted terminal device that is served by the access network device and that is in a member of the first multicast service, and the identifier corresponding to the first multicast service; and the member of the first multicast service includes the terminal device requesting to receive the first multicast service.

In one embodiment of the fifth aspect, the management device further includes: an obtaining module, configured to obtain a quality of service parameter of the first multicast service; and the sending module is configured to send a quality of service profile to the access network device, where the quality of service profile includes a quality of service flow QoS flow identifier related to the first multicast service and a quality of service parameter corresponding to an identifier of the QoS flow.

In one embodiment of the fifth aspect, a function of the management device and a function of the gateway device are set in a same device.

In one embodiment of the fifth aspect, the sending module is configured to: send a fourth message to the gateway device, where the fourth message includes any one or more of the following: first configuration information including the first indication information, the identifier corresponding to the added or deleted terminal device that is served by the gateway device and that is in the member of the first multicast service, an identifier corresponding to an access network device serving the terminal device, and the identifier corresponding to the first multicast service; and the first indication information is indication information used to indicate a send mode of the data packet of the first multicast service between the gateway device and the access network device.

In one embodiment of the fifth aspect, the sending module is configured to:

send configuration information of the first multicast service flow to the gateway device, where the configuration information of the first multicast service flow includes a service data flow (SDF) template related to the first multicast service, and the SDF template includes at least one packet filtering rule used by the gateway device to map, according to the packet filtering rule, a received data packet of the first multicast service to a QoS flow matching with the first multicast service for sending.

According to a sixth aspect, a gateway device is provided. The gateway device includes: a receiving module, configured to receive a data packet that is of a first multicast service and that is sent by a network device; and a sending module, configured to send the data packet of the first multicast service to an access network device, where that the gateway device sends the data packet of the first multicast service to the access network device includes: the gateway device sends the data packet of the first multicast service to the access network device in a multicast mode, or the gateway device sends the data packet of the first multicast service to the access network device in a unicast mode.

In one embodiment of the sixth aspect, the sending module is configured to: send the data packet of the first multicast service to the access network device through a first channel, where the first channel is a channel for transmitting the data packet of the first multicast service; or send the data packet of the first multicast service to the access network device through a second channel, where the second channel is a channel for transmitting data packets of a plurality of different multicast services.

In one embodiment of the sixth aspect, the sending module is configured to replicate a received data packet of the first multicast service according to a quantity of terminal devices requesting to receive the first multicast service, where a data packet that is of the first multicast service and that is obtained after the replication includes a first identifier, and the first identifier is used to indicate a terminal device requesting to receive the data packet of the first multicast service; or the sending module is configured to replicate a received data packet of the first multicast service according to a quantity of access network devices serving terminal devices requesting to receive the first multicast service, where a data packet that is of the first multicast service and that is obtained after the replication includes a second identifier, and the second identifier is used to indicate the first multicast service.

The gateway device may perform the method according to any one of the second aspect or the embodiments of the second aspect.

According to a seventh aspect, an access network device is provided. The access network device includes: a receiving module, configured to receive a data packet that is of a first multicast service and that is from a gateway device; and a sending module, configured to send the data packet of the first multicast service to a terminal device based on a multicast member list, where that the access network sends the data packet of the first multicast service to the terminal device includes: the access network device sends the data packet of the first multicast service to the terminal device in a multicast mode, or the access network device sends the data packet of the first multicast service to the terminal device in a unicast mode.

In one embodiment of the seventh aspect, the receiving module is configured to:
receive a third message from a management device, where the third message includes any one or more of the following: an indication for adding or deleting a multicast member, an identifier corresponding to an added or deleted terminal device, and an identifier corresponding to the first multicast service; or
the receiving module is configured to receive a fifth message from the terminal device, where the fifth message is a message used by the terminal device to request to receive or terminate the first multicast service, and the fifth message includes any one or more of the following: an identifier corresponding to the first multicast service and an identifier corresponding to the terminal device.

In one embodiment of the seventh aspect, the access network device includes a processing module. The processing module is configured to update the multicast member list, where the multicast member list includes: an identifier corresponding to a multicast service whose connection has been established, and/or an identifier corresponding to a terminal device requesting to receive the multicast service whose connection has been established; and the processing module is configured to:
add an information entry corresponding to both the terminal device and the first multicast service to the multicast member list; or
set, in the multicast member list, an information entry corresponding to both the terminal device and the first multicast service to be valid; or
delete an information entry corresponding to both the terminal device and the first multicast service from the multicast member list; or
set, in the multicast member list, an information entry corresponding to both the terminal device and the first multicast service to be invalid, where
the information entry corresponding to both the terminal device and the first multicast service includes the identifier corresponding to the first multicast service and the identifier corresponding to the terminal device.

In one embodiment of the seventh aspect, the access network device sends a sixth message to the management device, where the sixth message includes any one or more of the following: the identifier corresponding to the first multicast service, an indication for requesting to receive or terminate the first multicast service, an identifier of a terminal device requesting to receive or terminate the first multicast service, and an identifier of the access network device.

In one embodiment of the seventh aspect, the identifier corresponding to the terminal device includes at least one of the following information: an identifier of the terminal device, an identifier of a connection session established by the terminal device, a bearer identifier of the terminal device, and a tunnel identifier corresponding to a session or a bearer of the terminal device.

In one embodiment of the seventh aspect, the processing module is configured to: determine that the access network device sends the data packet of the first multicast service to the terminal device in a multicast mode or a unicast mode, based on any one or more of the following: a quantity of terminal devices requesting to receive the first multicast service, quality of a link between the access network device and a terminal device requesting to receive the first multicast service, and second indication information that is sent by the management device and that is used to indicate a mode in which the access network device sends the data packet of the first multicast service to the terminal device.

In one embodiment of the seventh aspect, the processing module is configured to replicate a received data packet of the first multicast service according to the quantity of terminal devices requesting to receive the first multicast service; and after the processing module adds a first identifier to a data packet that is of the first multicast service and that is obtained after the replication, the sending module is configured to send a data packet including the first identifier to the terminal device requesting to receive the data packet of the first multicast service, where the first identifier is used to indicate the terminal device requesting to receive the data packet of the first multicast service.

According to an eighth aspect, a terminal device is provided, where the terminal device is a first terminal device, and includes:
- a sending module, configured to send first request information to an access network device based on a multicast service session connection indication, where the first request information is used to request establishment of a session supporting a multicast service.

In one embodiment of the eighth aspect, the obtaining module is configured to receive a seventh message sent by a second terminal device, where the seventh message includes any one or more of the following: an identifier corresponding to a first multicast service, an indication for requesting to receive or terminate the first multicast service, and an identifier of the second terminal device; and
- the obtaining module is configured to: consider the seventh message as the multicast service session connection indication, where the seventh message includes an indication for requesting to receive the first multicast service; or
- the first terminal device obtains the multicast service session connection indication based on a service request of an application layer; or
- the first terminal device obtains the multicast service session connection indication based on preconfigured information.

In one embodiment of the eighth aspect, the sending module is configured to send an eighth message to the access network device, where the eighth message includes any one or more of the following: the identifier corresponding to the first multicast service, the indication for requesting to receive or terminate the first multicast service, an identifier corresponding to the first terminal device, and the identifier of the second terminal device.

In one embodiment of the eighth aspect, the obtaining module is configured to receive the seventh message of the second terminal device; and the terminal device further includes a processing module, configured to update a multicast member list based on the seventh message, where
- the multicast member list includes any one or more of the following: an identifier corresponding to a multicast service that can be received by the first terminal device, and an identifier corresponding to the second terminal device requesting the multicast service.

In one embodiment of the eighth aspect, the processing module is configured to: add an information entry corresponding to both the second terminal device and the first multicast service to the multicast member list; or
- set, in the multicast member list, an information entry corresponding to both the second terminal device and the first multicast service to be valid; or
- delete an information entry corresponding to both the second terminal device and the first multicast service from the multicast member list; or
- set, in the multicast member list, an information entry corresponding to both the second terminal device and the first multicast service to be invalid, where
- the information entry corresponding to both the second terminal device and the first multicast service includes the identifier corresponding to the first multicast service and the identifier corresponding to the second terminal device; and the identifier corresponding to the second terminal device includes any one or more of the following: the identifier of the second terminal device, an identifier of an interface/a port between the second terminal device and the first terminal device, an identifier of a bearer or a logical channel between the second terminal device and the first terminal device, and the like.

According to a ninth aspect, a chip system is provided. The chip system includes at least one processor. The at least one processor is configured to execute a stored instruction, to enable a management device to perform the method according to any one of the first aspect or the embodiments of the first aspect.

According to a tenth aspect, a chip system is provided. The chip system includes at least one processor. The at least one processor is configured to execute a stored instruction, to enable a gateway device to perform the method according to any one of the second aspect or the embodiments of the second aspect.

According to an eleventh aspect, a chip system is provided. The chip system includes at least one processor. The at least one processor is configured to execute a stored instruction, to enable an access network device to perform the method according to any one of the third aspect or the embodiments of the third aspect.

According to a twelfth aspect, a chip system is provided. The chip system includes at least one processor. The at least one processor is configured to execute a stored instruction, to enable a terminal device to perform the method according to any one of the fourth aspect or the embodiments of the fourth aspect.

According to a thirteenth aspect, a computer program product is provided. The computer program product includes an instruction, and when the instruction is executed, a management device may be enabled to perform the method according to any one of the first aspect or the embodiments of the first aspect.

According to a fourteenth aspect, a computer program product is provided. The computer program product includes an instruction, and when the instruction is executed, a gateway device may be enabled to perform the method according to any one of the second aspect or the embodiments of the second aspect.

According to a fifteenth aspect, a computer program product is provided. The computer program product includes an instruction, and when the instruction is executed, an access network device may be enabled to perform the method according to any one of the third aspect or the embodiments of the third aspect.

According to a sixteenth aspect, a computer program product is provided. The computer program product includes an instruction, and when the instruction is executed, a terminal device may be enabled to perform the method according to any one of the fourth aspect or the embodiments of the fourth aspect.

According to a seventeenth aspect, a communications system is provided. The communications system includes: a management device, and/or a gateway device, and/or an access network device, and/or a terminal device. The management device may perform the method according to any one of the first aspect or the embodiments of the first aspect. The gateway device may perform the method according to any one of the second aspect or the embodiments of the second aspect. The access network device may perform the method according to any one of the third aspect or the embodiments of the third aspect. The terminal device may perform the method according to any one of the fourth aspect or the embodiments of the fourth aspect.

According to an eighteenth aspect, a computer storage medium is provided. The computer storage medium stores a program instruction. When the instruction is executed, the management device may perform the method according to any one of the first aspect or the embodiments of the first aspect, the gateway device may perform the method according to any one of the second aspect or the embodiments of the second aspect, the access network device may perform the method according to any one of the third aspect or the embodiments of the third aspect, and the terminal device may perform the method according to any one of the fourth aspect or the embodiments of the fourth aspect.

DESCRIPTION OF EMBODIMENTS

The following describes the technical solutions of this application with reference to the accompanying drawings.

Figure 1:
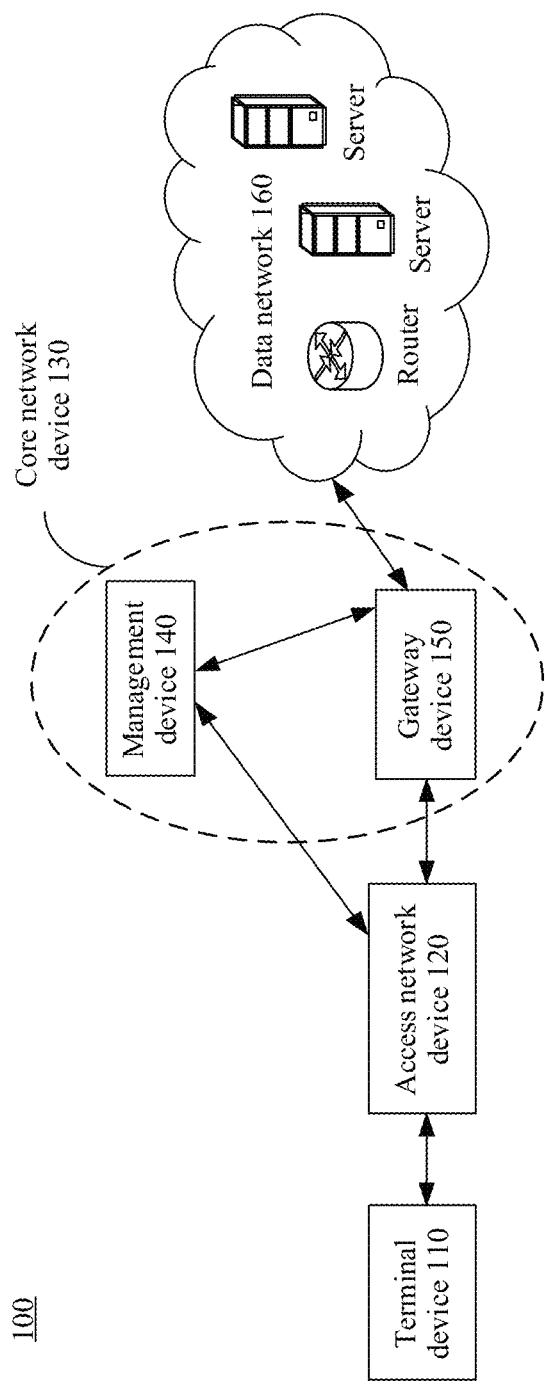
FIG. 1 is a schematic architectural diagram of a multicast service transmission method and a wireless communications system architecture according to this application.

FIG. 1 is a schematic architectural diagram of a multicast service transmission method and a wireless communications system architecture 100 according to this application. As shown in FIG. 1, the system architecture 100 includes a terminal device 110, an access network device 120, a core network device 130, and a data network 160 (DN). The core network device 130 includes a management device 140 and a gateway device 150. The terminal device 110 in FIG. 1 may be configured to connect, through a wireless air interface, to the access network device 120 deployed by an operator, and then connect to the data network by using the core network device 130. The access network device 120 is mainly configured to implement functions such as a radio physical layer function, resource scheduling and radio resource management, radio access control, and mobility management. The core network device 130 may include the management device 140 and the gateway device 150. The management device 140 is mainly configured to perform device registration, security authentication, mobility management, location management, and the like of the terminal device. The gateway device 150 is mainly configured to: establish a channel with the terminal device, and forward a data packet between the terminal device and an external data network through the channel. The data network 160 may correspond to a plurality of different service domains, such as an IP multimedia subsystem (IMS), an internet, an internet protocol television (IPTV), and another operator service domain, and is mainly configured to provide a plurality of data services for the terminal device. The data network 160 may include network devices such as a server (including a server providing a multicast service), a router, and a gateway. For a terminal wishing to receive a data packet of an IP multicast service, the terminal needs to request, by using a group management protocol, to join/exit a multicast IP address corresponding to a multicast service, to start to receive/terminate the multicast service. The group management protocol of the IP multicast is the IGMP protocol in IPv4, and is the MLD protocol in IPv6. It should be noted that, FIG. 1 is merely a diagram of an example of the architecture. In addition to the function units shown in FIG. 1, the network architecture may further include another function unit or function entity. This is not limited in the embodiments of the present application.

When a communications network shown in FIG. 1 is a 5G network, the foregoing terminal device may be user equipment (UE), for example, a mobile phone or a computer, or may be a cellular phone, a cordless telephone set, a session initiation protocol (SIP) telephone, a smartphone, a wireless local loop WLL) station, a personal digital assistant (PDA), a computer, a laptop computer, a handheld communications device, a handheld computing device, a satellite wireless device, a wireless modem card, a television set-top box (STB), a customer premises equipment (CPE), and/or another device configured to communicate on a wireless system. The foregoing access network device may be an access network (AN)/radio access network (RAN) device, or a network including a plurality of 5G-AN/5G-RAN nodes. The 5G-AN/5G-RAN node may be: an access node (AP), a next generation NodeB (NR nodeB, gNB), a gNB in which a central unit (CU) is separated from a distributed unit (DU), a transmission reception point (TRP), a transmission point (TP), or another access node. The foregoing core network device may include function units such as an access and mobility management function (AMF), a session management function (SMF), a policy control function (PCF), and a user plane function (UPF). These function units may work independently, or may be combined together to implement some control functions. For example, the AMF, SMF, and PCF may be combined together as a management device to implement access control and mobility management functions such as access authentication, security encryption, and location registration of the terminal device, session management functions such as establishment, release, and change of a user plane transmission path, and functions such as analysis of slice-related data (such as congestion) and terminal device-related data. The UPF functions as a gateway device to implement functions such as routing and forwarding of user plane data, for example, filtering data packets of the terminal device, transmitting/forwarding data, controlling a rate, and generating charging information.

Figure 2A:
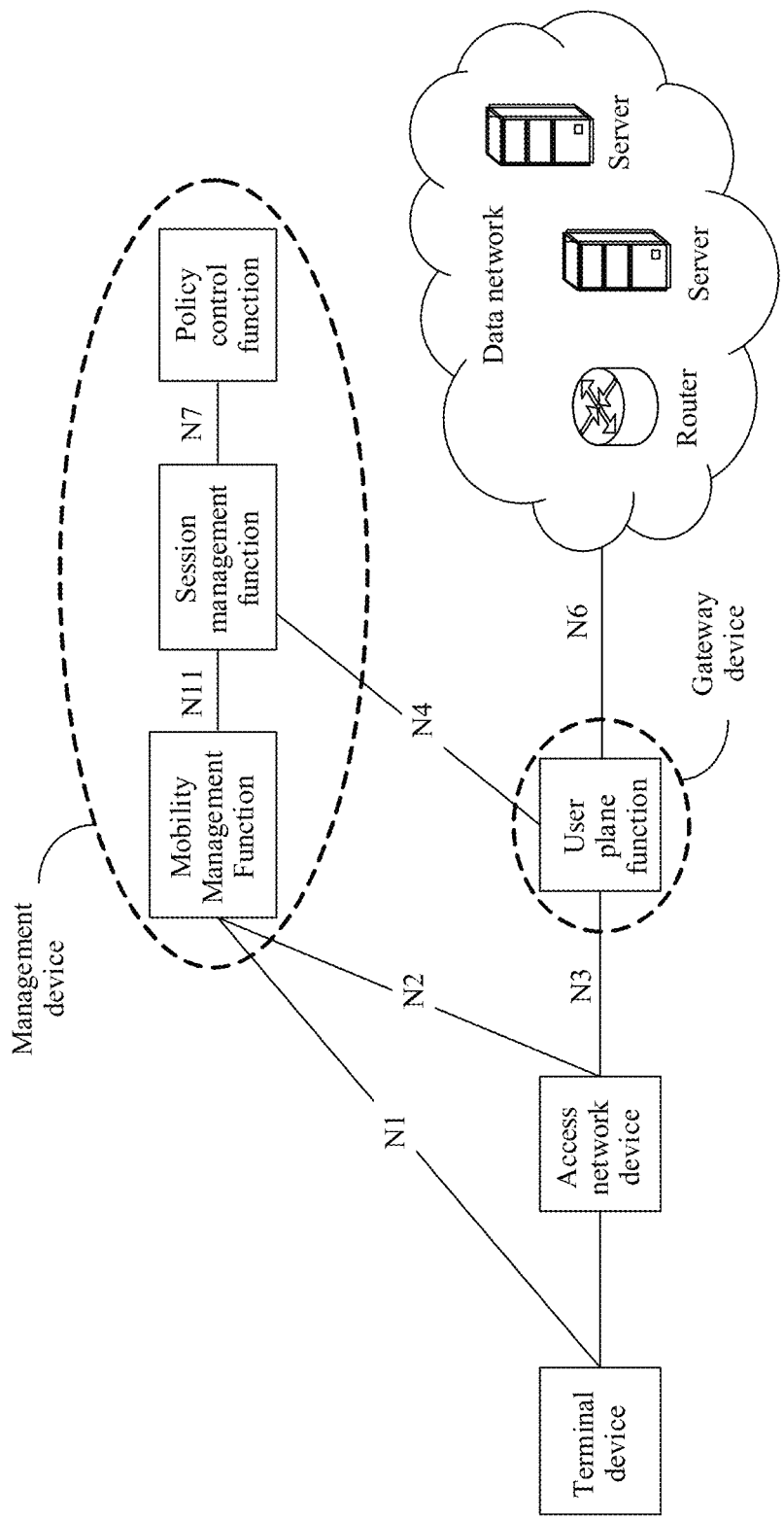
FIG. 2a, FIG. 2b, and FIG. 2c are each a schematic architectural diagram of a multicast service transmission method and a wireless communications system architecture according to this application.

FIG. 2a is a schematic diagram of a 5G network architecture according to an embodiment of the present application. In the 5G network shown FIG. 2a, function units may establish a connection through a next generation (NG) network interface to implement communication. For example, a terminal device establishes an air interface connection to a RAN device through a new radio (NR) interface, to transmit user plane data and control plane signaling. The terminal device may establish a control plane signaling connection to an AMF through an NG interface 1 (N1 for short). An AN/RAN device such as a next generation new radio NodeB (NR NodeB, gNB) may establish a user plane data connection to a UPF through an NG interface 3 (N3 for short). The AN/RAN device may establish a control plane signaling connection to the AMF through an NG interface 2 (N2 for short). The UPF may establish a control plane signaling connection to an SMF through an NG interface 4 (N4 for short). The UPF may exchange user plane data with a data network through an NG interface 6 (N6 for short). The AMF may establish a control plane signaling connection to the SMF through an NG interface 11 (N11 for short). The SMF may establish a control plane signaling connection to a PCF through an NG interface 7 (N7 for short). It should be noted that, FIG. 2a is merely an example diagram of the architecture. In addition to the function units shown in FIG. 2a, the network architecture may further include another function unit or function entity. For example, a core network device may further include another function unit such as a unified data management (UDM) function. This is not limited in the embodiments of the present application.

When the communication network shown in FIG. 1 is a 4G network, for the terminal device, refer to the related description of the terminal device in FIG. 1, and details are not described herein again. The access network device may be a NodeB (nodeB, NB), an evolved NodeB (evolution nodeB, eNB), a TRP, a TP, an AP, or another access unit. The core network device may include management devices such as a mobility management entity (MME) and a policy and charging rules function (PCRF), and gateway devices such as a serving gateway (SGW), a packet data network gateway (PGW), and a local gateway (LGW).

Figure 2B:
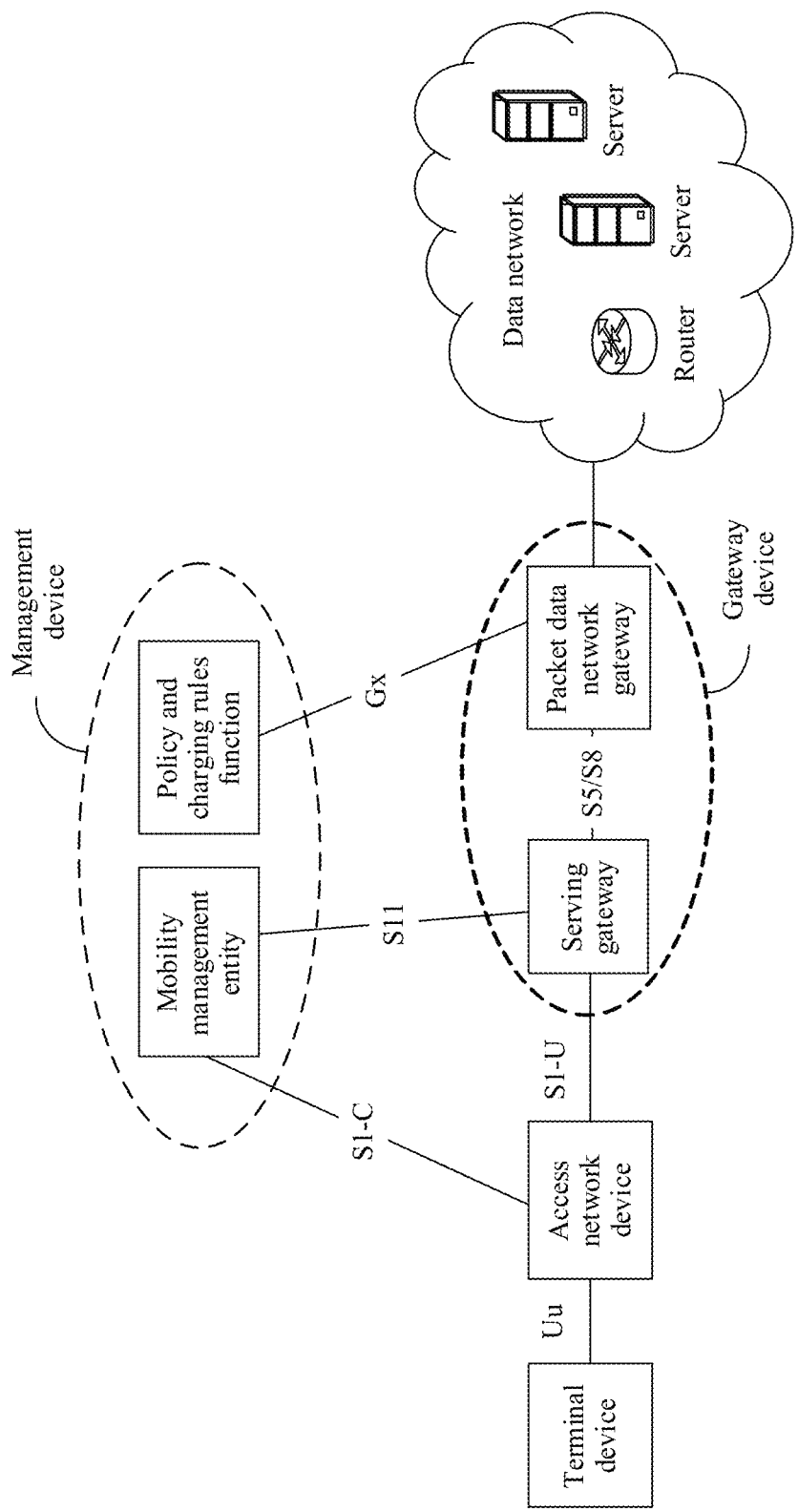

For example, in a 4G network shown in FIG. 2b, a terminal device may establish an air interface connection to an eNB through a Uu interface, the eNB establishes a control plane signaling connection to an MME through an S1-C interface, the eNB establishes a user plane data connection to an SGW through an S1-U interface, the SGW establishes a control plane signaling connection to the MME through an S11 interface, the SGW establishes a user plane data connection to a PGW through an S5/S8 interface, and the PGW is connected to a data network through an SGi interface. It should be noted that, FIG. 2b is an example diagram of the architecture. In addition to the function units shown in FIG. 2b, the network architecture may further include another function unit or function entity. This is not limited in the embodiments of the present application.

When the communications network shown in FIG. 1 is a multimedia broadcast/multicast service (MBMS) network or an evolved multimedia broadcast/multicast service (evolved MBMS, eMBMS) network, for understanding of the terminal device, refer to related descriptions of the terminal device in FIG. 1 for. For understanding of the access network device, refer to related descriptions of the access network device in FIG. 2a or FIG. 2b, and details are not described herein again. The core network device may include a management device such as a mobility management entity (MME) or a multi-cell/multicast coordination entity (MCE), and a gateway device such as an MBMS GW or a PGW/UPF.

In an MBMS/eMBMS network architecture, an MBMS gateway (MBMS GW) and a broadcast/multicast service center (BM-SC) are responsible for providing and managing an MBMS service. The BM-SC may select different gateways based on a current service feature and a quantity of users, and then establish a corresponding bearer, for example, establish a unicast bearer by using the PGW, or establish an MBMS bearer by using the MBMS GW. The MBMS gateway is responsible for control and transmission of MBMS service data, and has functions of both a control plane and a user plane. On a user plane, the MBMS GW mainly receives a data packet of the MBMS service through an SGi-mb interface, and sends the data packet of the MBMS service to a RAN device in an IP multicast mode through an M1 interface. On a control plane, the MBMS GW is mainly responsible for transmission of session control signaling between the BM-SC and the MME.

Figure 2C:
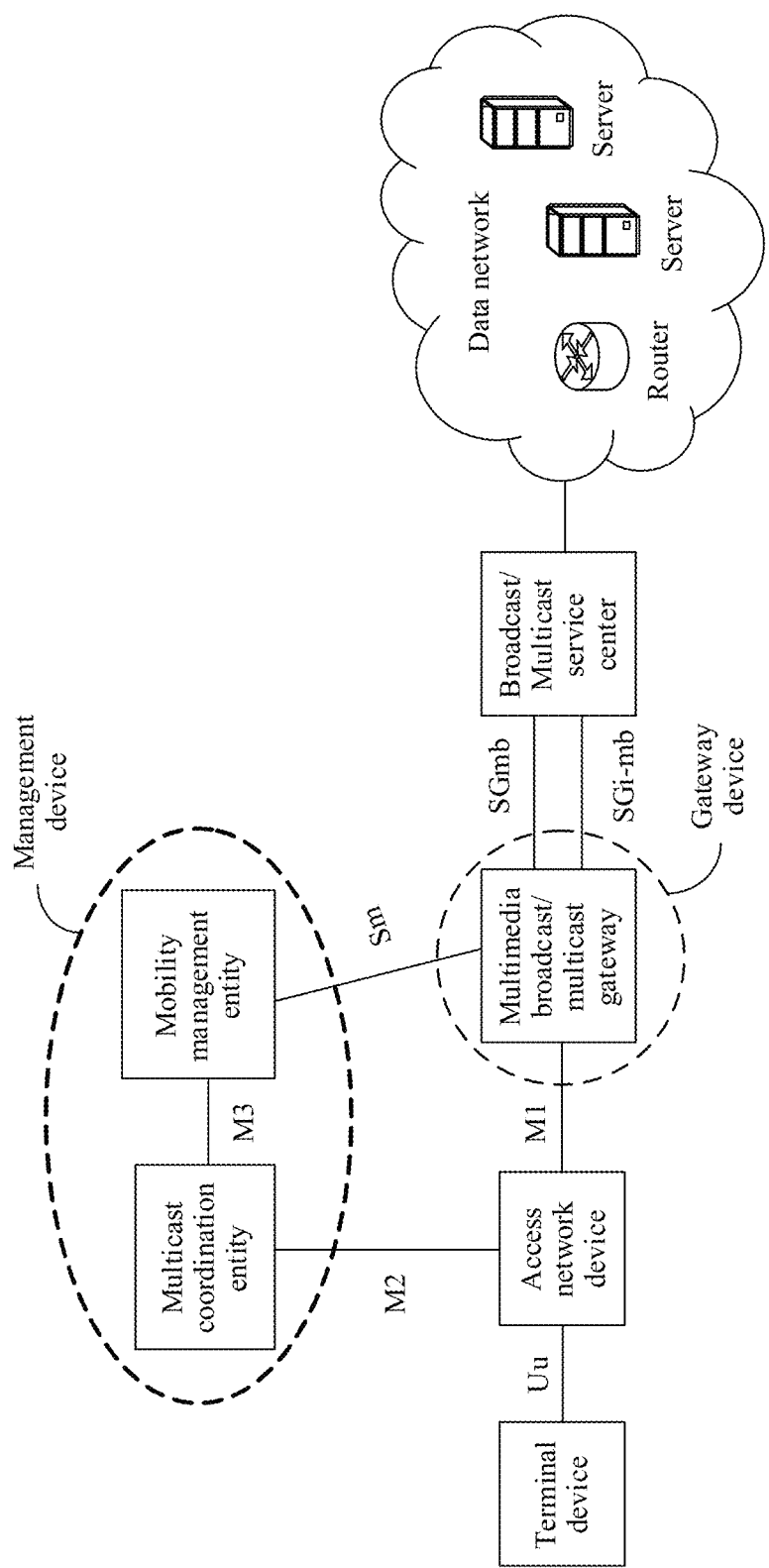

For example, FIG. 2c is a schematic diagram of a multimedia broadcast/multicast network architecture according to an embodiment of the present application. In a network shown in FIG. 2c, a terminal device may establish an air interface connection to an access network device through a Uu interface, and the access network device establishes, through an M2 interface, a control plane signaling connection to an MCE that performs radio resource configuration and management. The MCE and the access network device may be a same entity or two independent entities. The MCE establishes a control plane signaling connection to an MME through an M3 interface, and the access network device establishes a user plane data connection to an MBMS GW through an M1 interface. An SGmb interface is a control plane interface used to transmit signaling between a BM-SC and the MBMS GW, and an SGi-mb interface is a user-plane interface used to transmit data between the BM-SC and MBMS GW. It should be noted that, FIG. 2c is merely a diagram of an example of the architecture. In addition to the function units shown in FIG. 2c, the network architecture may further include another function unit or function entity. This is not limited in the embodiments of the present application.

It should be understood that a name of an interface between network elements in this application is merely an example, and the interface between the network elements may have another name. The name of the interface is not limited in this application.

The technical solutions of the embodiments of this application may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A multicast service transmission method provided in this application may be applied to a management device, a gateway device, an access network device, and a terminal device. The management device, the gateway device, the access network device, and the terminal device each may include a hardware layer, an operating system layer running on the hardware layer, and an application layer running on the operating system layer. The hardware layer includes hardware such as a central processing unit (CPU), a memory management unit (MMU), and a memory (also referred to as a main memory). An operating system may be any one or more types of computer operating systems that process a service by using a process, for example, a Linux operating system, a Unix operating system, an Android operating system, an iOS operating system, or a Windows operating system. The application layer includes applications such as a browser, a contact list, text processing software, and instant communication software.

In addition, aspects or features of this application may be implemented as a method, an apparatus or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD), a digital versatile disc (DVD), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to various media that can store, contain, and/or carry an instruction and/or data.

The following describes a send mode of a data packet of a multicast service from a gateway device to a terminal device in a mobile network.

In the mobile network, after receiving a data packet of a multicast service of a downlink, a gateway device (for example, a UPF, a packet data network gateway (PDN gateway, PGW), a serving gateway (SGW), a local gateway (LGW), or a multimedia broadcast/multicast service gateway (MBMS GW) sends the data packet of the multicast service to a RAN device, and then the RAN device sends the data packet of the multicast service to the terminal device. In the prior art, the data packet of the multicast service is sent between the gateway device and the RAN device in a multicast mode, and is sent between the RAN device and the terminal device in a single-cell broadcast mode or a multi-cell coordinated broadcast mode. In the embodiments of this application, a more flexible send mode of a data packet of a multicast service is proposed. The send mode includes: sending the data packet of the multicast service in a mobile network in a unicast mode; and/or sending the data packet of the multicast service in the mobile network in a combined mode. In one embodiment, the data packet of the multicast service is sent between the gateway device and the RAN device in a multicast mode, and the data packet of the multicast service is sent between the RAN device and the terminal device in a unicast mode or a multicast mode. The following describes a possible send mode of the data packet of the multicast service in the mobile network in the embodiments of this application.

In a first send mode, unicast send is used between the gateway device and the terminal device. In this mode, for a received data packet of a first multicast service, the gateway device needs to replicate the data packet of the first multicast service according to a quantity of terminal devices requesting the first multicast service, and then sends, by using the RAN device, the data packet of the first multicast service to each terminal device requesting the first multicast service. It should be noted that, in the embodiments of this application, that unicast send is used between the gateway device and the RAN device means that unicast send is used between the gateway device and the terminal device.

Figure 3:
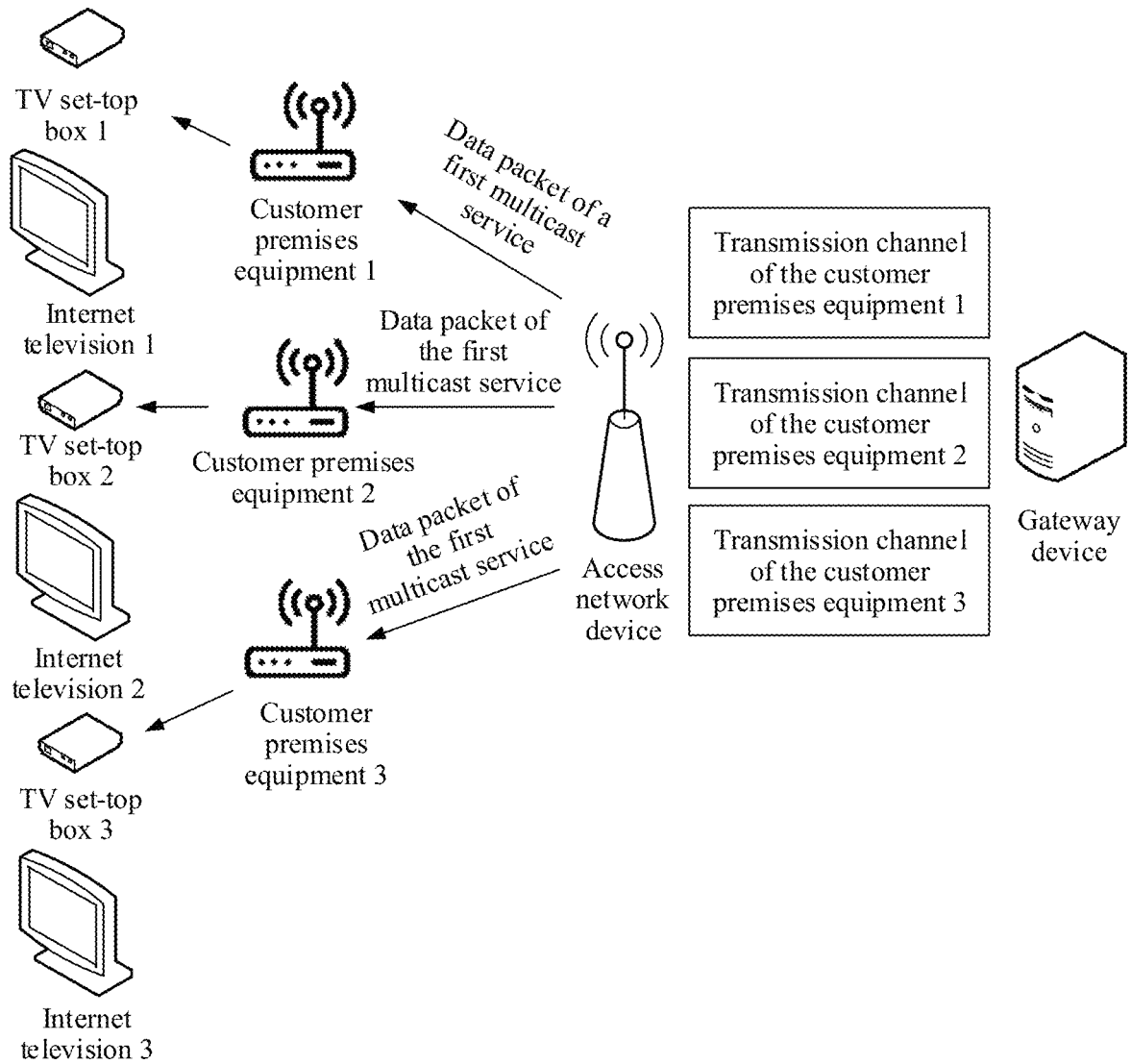
FIG. 3 shows a transmission mode of a data packet of a multicast service in a mobile network according to this application.

For example, FIG. 3 shows a transmission mode of a data packet of a multicast service in a mobile network according to this application. An STB 1, an STB 2, and an STB 3 are three terminal devices—TV set-top boxes, that request an IPTV live program 1 (namely, a first multicast service). The STB 1 is connected to a CPE 1, the STB 2 is connected to a CPE 2, and an STB 3 is connected to a CPE 3. The CPE 1, the CPE 2, and the CPE 3 are three independent customer premises equipments, and separately access the mobile network by using a RAN device. Therefore, for the STB 1 and the CPE 1, the STB 1 is a second terminal device, and the CPE 1 is a first terminal device. For the STB 2 and the CPE 2, the STB 2 is a second terminal device, and the CPE 2 is a first terminal device. For the STB 3 and the CPE 3, the STB 3 is a second terminal device, and the CPE 3 is a first terminal device. Three logical transmission channels are established between the gateway device and each of the CPE 1, the CPE 2, and the CPE 3, to transmit data packets of the multicast service. The logical transmission channels may be, for example, evolved packet system bearers (EPS bearer) or protocol data unit (PDU) sessions. If a data packet of the multicast service is transmitted by using a PDU session, the gateway device maps the data packet of the multicast service to a QoS flow and sends the data packet to the RAN device. When receiving a data packet of the first multicast service, the gateway device needs to obtain three copies of the data packet through replication, and separately send the three copies of the data packet to the RAN device by using the QoS flows in the EPS bearers or the PDU sessions of the CPE 1, the CPE 2, and the CPE 3. After receiving the three copies of the data packet of the first multicast service, the RAN device maps the three copies respectively to radio bearers (RB) of the three customer premises equipments, and sends the three copies to the CPE 1, the CPE 2, and the CPE 3. The CPE 1, the CPE 2, and the CPE 3 respectively send the received data packets of the first multicast service to the STB 1, the STB 2, and the STB 3.

In a second send mode, multicast send is used between the gateway device and an access network device, and unicast send is used between the access network device and the terminal device. For this send mode, if a plurality of terminal devices served by one RAN device all request a first multicast service, when receiving a data packet of the first multicast service, the gateway device needs to send only one copy of the data packet of the first multicast service to the RAN device. Then, the RAN device replicates the data packet of the first multicast service according to a quantity of terminal devices that request the first multicast service and that are in a serving cell of the RAN device, and sends a replicated data packet of the first multicast service to each terminal device requesting the first multicast service.

When sending the data packet of the first multicast service to the access network device in a multicast mode, the gateway device may use the following two different implementation options.

Option 1: A multicast transmission channel is established between the gateway device and the access network device, and one multicast transmission channel corresponds to one multicast service. In this embodiment of this application, the multicast transmission channel is a logical channel. For example, in a 5G network architecture, the gateway device is a UPF, and a multicast transmission tunnel (for example, a multicast N3 tunnel, that is, a GTP user plane tunnel (GPRS tunnel protocol user plane tunnel, GTP-U tunnel) of an N3 interface) is established between the UPF and the RAN device. Each multicast transmission tunnel corresponds to one multicast service. For another example, in a 4G network architecture, the gateway device is a PGW/an SGW/an LGW, and a multicast transmission tunnel (for example, a multicast S1 tunnel, that is, a GTP-U tunnel of an S1 interface) is established between the gateway device and the RAN device. Each multicast transmission tunnel corresponds to one multicast service. For still another example, in an MBMS network architecture, the gateway device is an MBMS GW, and a multicast transmission tunnel (for example, a multicast M1 tunnel, that is, a GTP-U tunnel of an M1 interface) is established between the gateway device and the RAN device. Each multicast M1 tunnel corresponds to one multicast service.

Figure 4:
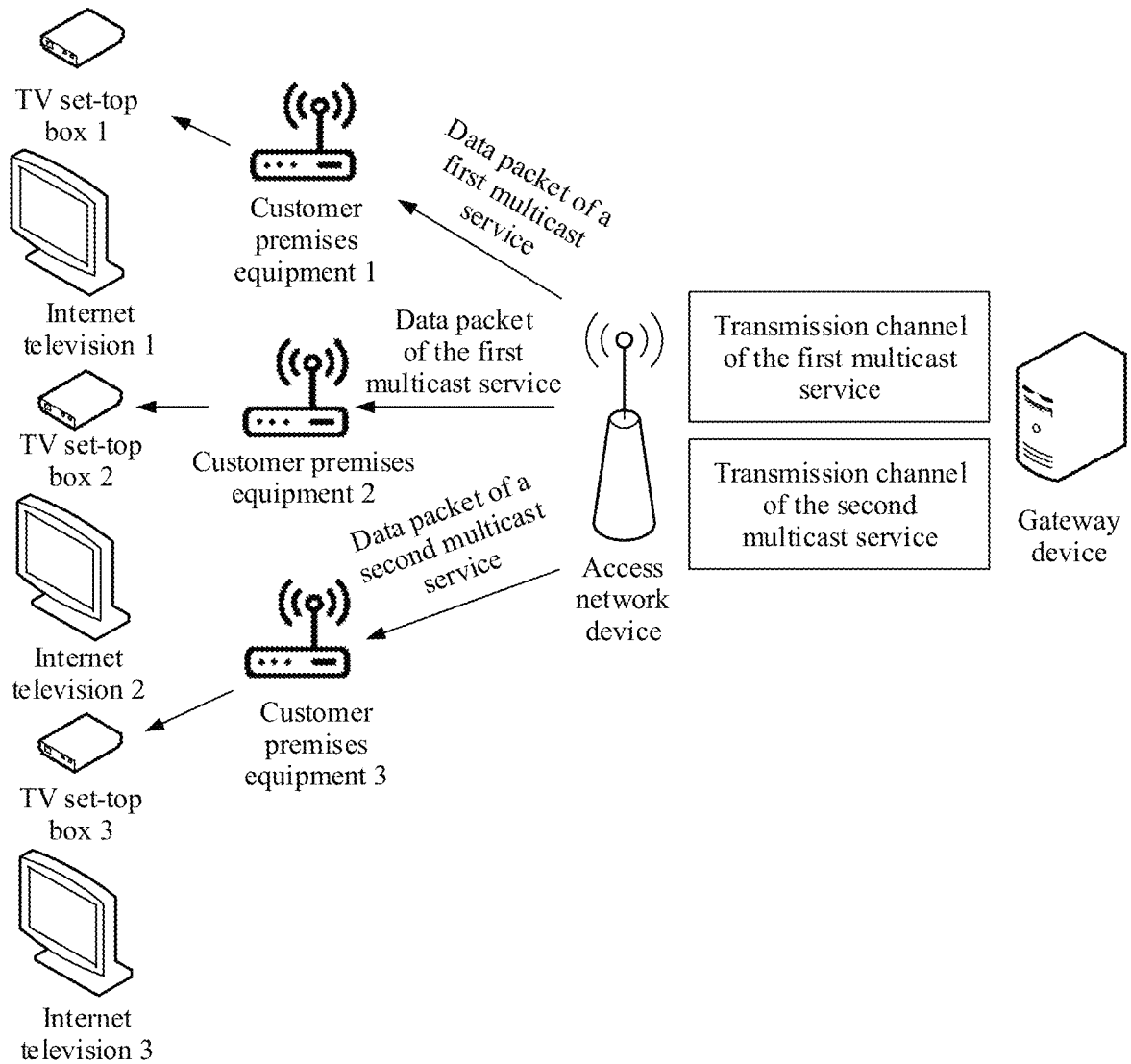
FIG. 4 shows a transmission mode of a data packet of a multicast service in a mobile network according to this application.

For the option 1, for example, FIG. 4 shows a transmission mode of a data packet of a multicast service in a mobile network according to this application. An STB 1 and an STB 2 are two TV set-top boxes that request an IPTV live program 1 (a first multicast service), and an STB 3 is a TV set-top box that requests an IPTV live program 2 (a second multicast service). The STB 1 is connected to a CPE 1, the STB 2 is connected to a CPE 2, and the STB 3 is connected to a CPE 3. The CPE 1, the CPE 2, and the CPE 3 are three independent customer premises equipments, and separately access the mobile network by using a RAN device. Therefore, for the STB 1 and the CPE 1, the STB 1 is a second terminal device, and the CPE 1 is a first terminal device. For the STB 2 and the CPE 2, the STB 2 is a second terminal device, and the CPE 2 is a first terminal device. For the STB 3 and the CPE 3, the STB 3 is a second terminal device, and the CPE 3 is a first terminal device. Two multicast logical transmission channels corresponding to the first multicast service and the second multicast service are established between the gateway device and the RAN device. The multicast logical transmission channels may be user plane transmission tunnels of an N3/S1/M1 interface. For example, the first multicast service corresponds to a multicast N3 tunnel 1, and the second multicast service corresponds to a multicast N3 tunnel 2. When receiving a data packet of the first multicast service, the gateway device needs to send the data packet to the RAN device through the multicast N3 tunnel 1. Then, after obtaining two copies of the data packet of the first multicast service through repli-cation, the RAN device maps each of the two copies to an air interface bearer between the RAN device and each customer premises equipment, and sends the two copies to the CPE 1 and the CPE 2. The CPE 1 and the CPE 2 then send the received data packets of the first multicast service to the STB 1 and the STB 2 respectively. Similarly, when receiving a data packet of the second multicast service, the gateway device needs to send the data packet to the RAN device through the multicast N3 tunnel 2. Then, the RAN device maps the data packet of the second multicast service to an RB between the RAN device and the CPE 3 and sends the data packet of the second multicast service to the CPE 3.

Option 2: A multicast transmission channel is established between the gateway device and the access network device, and one multicast transmission channel may be used to transmit a plurality of multicast services. For example, in a 5G network architecture, a gateway device is a UPF, and a multicast transmission tunnel (for example, a multicast N3 tunnel, that is, a GTP-U tunnel of an N3 interface) is established between the UPF and a RAN device. One multicast transmission tunnel corresponds to a plurality of multicast services. For another example, in a 4G network architecture, a gateway device is a PGW, and a multicast transmission tunnel (for example, a multicast S1 tunnel, that is, a GTP-U tunnel of an S1 interface) is established between the PGW and a RAN device. One multicast transmission tunnel corresponds to a plurality of multicast services. For still another example, in an MBMS network architecture, a gateway device is an MBMS GW, and a multicast transmission tunnel (for example, a multicast M1 tunnel, that is, a GTP-U tunnel of an M1 interface) is established between the MBMS GW and a RAN device. One multicast M1 tunnel corresponds to a plurality of multicast services. For the option 2, a data packet sent by the gateway device to the RAN device needs to carry an identifier corresponding to a multicast service. The RAN device may distinguish between data packets of different multicast services based on the identifier corresponding to the multicast service, and then the RAN device sends the data packets of the corresponding multicast services respectively to terminal devices requesting the multicast services.

Figure 5:
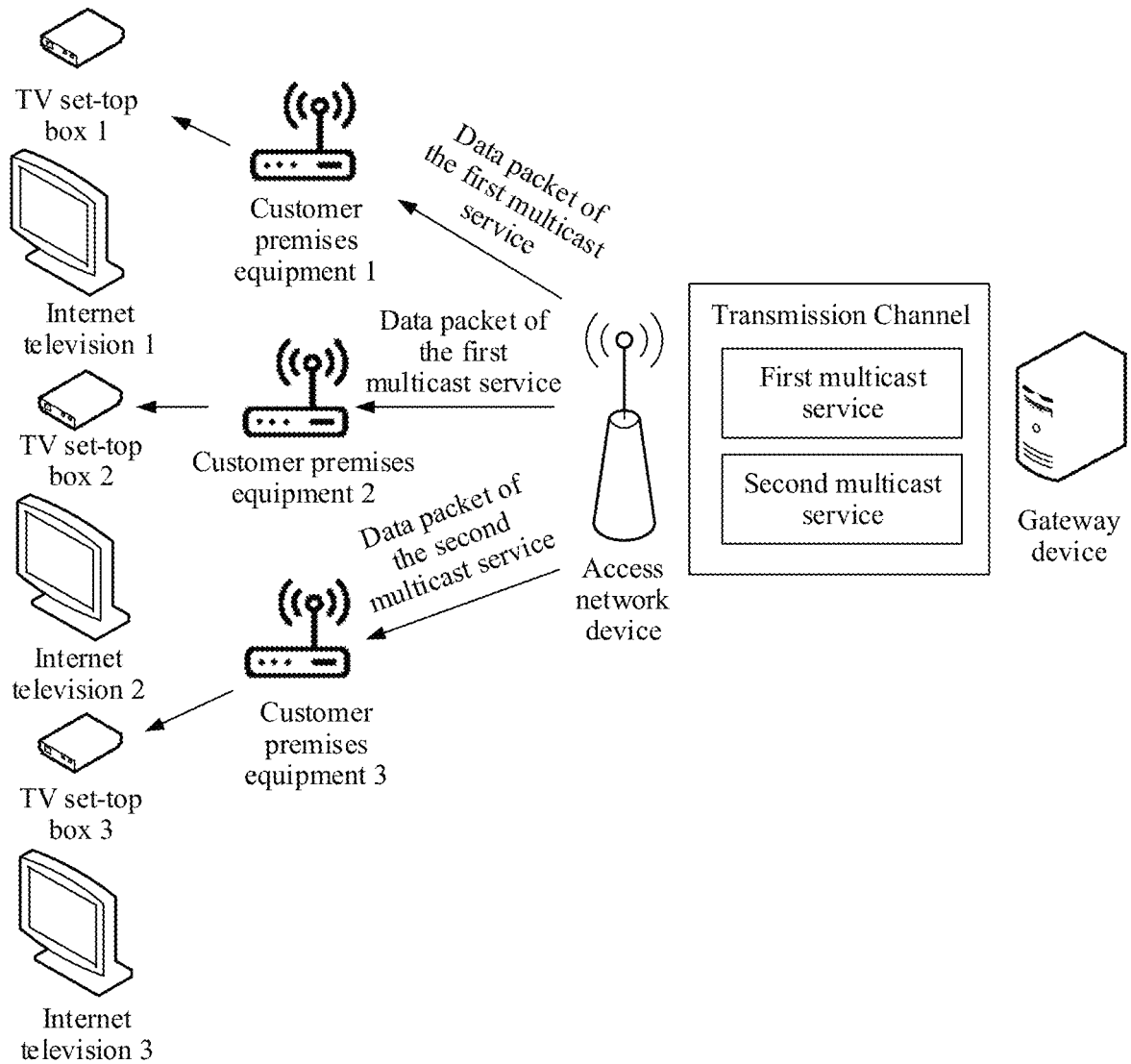
FIG. 5 shows a transmission mode of a data packet of a multicast service in a mobile network according to this application.

For the option 2, for example, FIG. 5 shows a transmission mode of a data packet of a multicast service in a mobile network according to this application. An STB 1 and an STB 2 are two TV set-top boxes that request an IPTV live program 1 (a first multicast service), and an STB 3 is a TV set-top box that requests an IPTV live program 2 (a second multicast service). The STB 1 is connected to a CPE 1, the STB 2 is connected to a CPE 2, and the STB 3 is connected to a CPE 3. The CPE 1, the CPE 2, and the CPE 3 are three independent customer premises equipments, and separately access the mobile network by using a RAN device. Therefore, for the STB 1 and the CPE 1, the STB 1 is a second terminal device, and the CPE 1 is a first terminal device. For the STB 2 and the CPE 2, the STB 2 is a second terminal device, and the CPE 2 is a first terminal device. For the STB 3 and the CPE 3, the STB 3 is a second terminal device, and the CPE 3 is a first terminal device. One multicast logical transmission channel used for transmitting the first multicast service and the second multicast service is established between a gateway device and the RAN device. The multicast logical transmission channel may be a user plane transmission tunnel of an N3/S1/M1 interface, for example, a multicast N3 tunnel 1 shown in the figure. When receiving a data packet of the first multicast service, the gateway device needs to send the data packet to the RAN device through the multicast N3 tunnel 1. The RAN device identifies, based on an identifier that is carried in the data packet and corresponds to the first multicast service, the data packet as the data packet of the first multicast service. Then, the RAN device maps data packets of the first multicast service to an RB between the RAN device and the CPE 1 and an RB between the RAN device and the CPE 2, and sends the data packet of the first multicast service to the CPE 1 and the CPE 2 respectively. The CPE 1 and the CPE 2 then send the received data packet of the first multicast service to the STB 1 and the STB 2 respectively. Similarly, when receiving a data packet of the second multicast service, the gateway device needs to send the data packet to the RAN device through the multicast N3 tunnel 1. Then, the RAN device maps the data packet of the second multicast service to an RB between the RAN device and the CPE 3 and sends the data packet of the second multicast service to the CPE 3.

In a third send mode, multicast send is used between the gateway device and an access network device, and multicast send is used between the access network device and the terminal device. For understanding of corresponding descriptions of the multicast send used between the gateway device and the access network device, refer to the content of the second send mode.

Compared with the second send mode, in the third send mode, air interface transmission resources may further be saved. When this send mode is used, if a plurality of terminal devices served by one RAN device all request the first multicast service, when receiving the data packet of the first multicast service, the gateway device needs to send only one copy of the data packet of the first multicast service to the RAN device. The RAN device may configure a uniform air interface scheduling identifier for the terminal devices requesting the first multicast service. The uniform air interface scheduling identifier corresponds to the first multicast service. The RAN device sends, by using the uniform air interface scheduling identifier, the data packet of the first multicast service to the terminal devices requesting the first multicast service.

Figure 6:
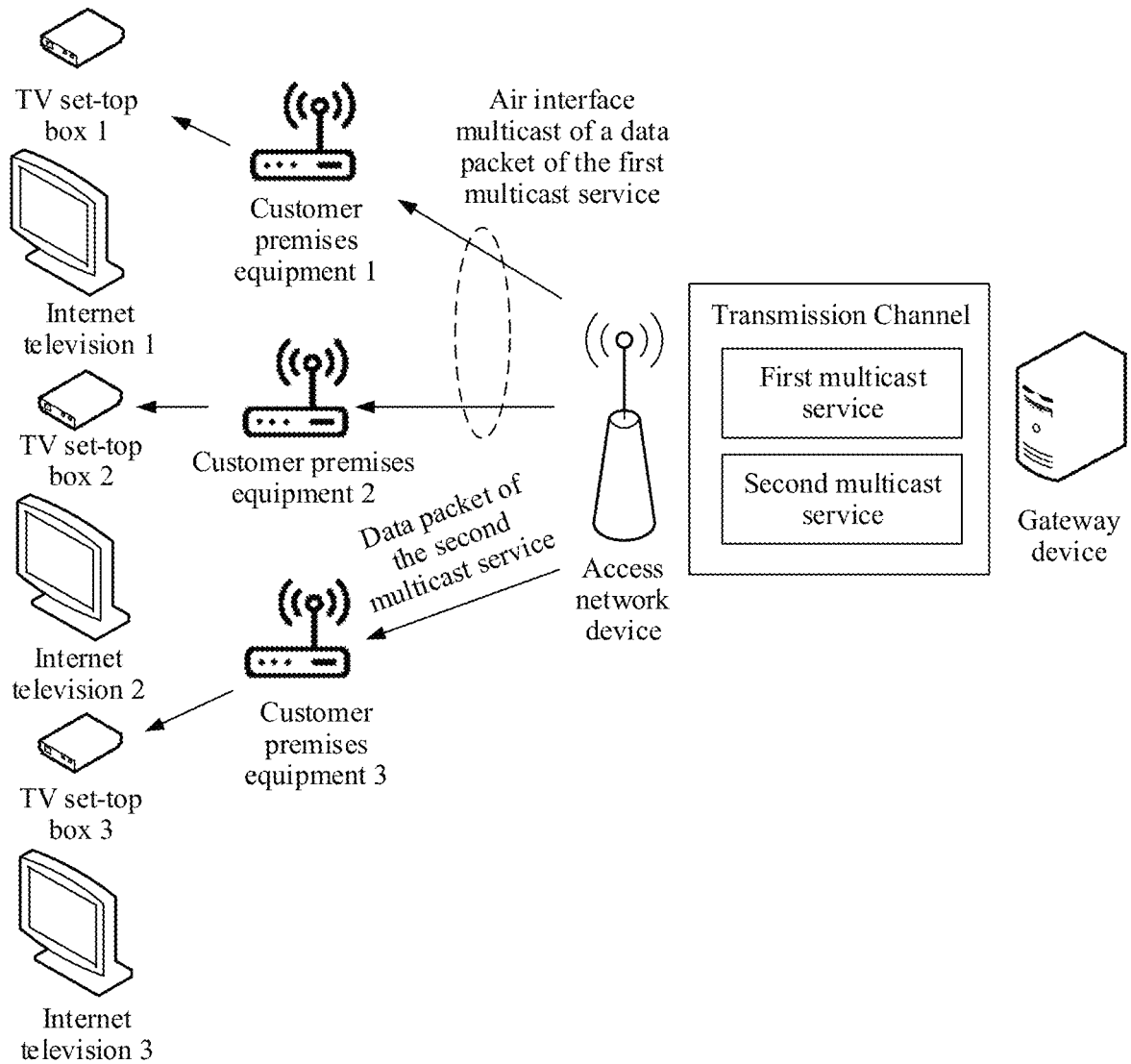
FIG. 6 shows a transmission mode of a data packet of a multicast service in a mobile network according to this application.

For the third send mode, for example, FIG. 6 shows a transmission mode of a data packet of a multicast service in a mobile network according to this application. An STB 1 and an STB 2 are two TV set-top boxes that request an IPTV live program 1 (a first multicast service), and an STB 3 is a TV set-top box that requests an IPTV live program 2 (a second multicast service). The STB 1 is connected to a CPE 1, the STB 2 is connected to a CPE 2, and the STB 3 is connected to a CPE 3. The CPE 1, the CPE 2, and the CPE 3 are three independent customer premises equipments, and separately access the mobile network by using a RAN device. Therefore, for the STB 1 and the CPE 1, the STB 1 is a second terminal device, and the CPE 1 is a first terminal device. For the STB 2 and the CPE 2, the STB 2 is a second terminal device, and the CPE 2 is a first terminal device. For the STB 3 and the CPE 3, the STB 3 is a second terminal device, and the CPE 3 is a first terminal device. In this example, a multicast send mode similar to that in FIG. 5, namely, the option 2 of the second send mode, is used between a gateway device and a RAN device. After receiving a data packet of the first multicast service, the RAN device sends the data packet of the first multicast service to the CPE 1 and the CPE 2 in an air interface multicast mode, and then the CPE 1 and the CPE 2 send the received data packet of the first multicast service to the STB 1 and the STB 2 respectively. After the RAN device receives a data packet of the second multicast service, because only one CPE requests the second multicast service, the RAN device maps the data packet of the second multicast service to an RB between the RAN device and the CPE 3 and sends the data packet of the second multicast service to the CPE 3 in a unicast mode, or the RAN device may send the data packet of the second multicast service to the CPE 3 in an air interface multicast mode. That the RAN device sends the data packet to the terminal device in an air interface multicast mode includes: For example, the RAN device allocates an air interface scheduling identifier 1 corresponding to the first multicast service to the terminal devices (the CPE 1 and the CPE 2) requesting the first multicast service, allocates an air interface scheduling identifier 2 corresponding to the second multicast service to the terminal device (the CPE 3) requesting the second multicast service, then sends, by using the air interface scheduling identifier 1, the data packet of the first multicast service to the terminal devices requesting the first multicast service, and sends, by using the air interface scheduling identifier 2, the data packet of the second multicast service to the terminal device requesting the second multicast service.

In one embodiment, a management device (for example, an SMF/a UPF/a PGW/an LGW/an MBMS GW) having a multicast service management function may determine, based on a network-level multicast member list, a send mode of the data packet of the first multicast service between the gateway device and the RAN device, and optionally, may further determine a send mode of the data packet of the first multicast service between the RAN device and the terminal device. The management device sends first configuration information to the gateway device. The first configuration information includes indication information used to indicate a send mode of the data packet of the first multicast service between the gateway device and the RAN device. The management device sends second configuration information to the RAN device. The second configuration information includes first indication information used to indicate the send mode of the data packet of the first multicast service between the gateway device and the RAN device. In one embodiment, the second configuration information further includes second indication information used to indicate a send mode of the data packet of the first multicast service between the RAN device and the terminal device. In an optional manner, the indication information used to indicate the send mode of the data packet of the first multicast service between the gateway device and the RAN device may be implicitly included in information sent by the management device to the gateway device and/or the RAN device. For example, if the information (for example, the first configuration information or the second configuration information) sent by the management device to the gateway device and/or the RAN device includes information about a specific transmission channel of the terminal device, it means that the gateway device sends the data packet of the first multicast service to the RAN device in a unicast mode. Alternatively, if the information sent by the management device to the gateway device and/or the RAN device includes information about a multicast transmission channel, it means that the gateway device sends the data packet of the first multicast service to the RAN device in a multicast mode.

For example, for a 5G network architecture, if an SMF is a management device having a multicast service management function, and a network-level multicast member list maintained by the SMF includes an identifier corresponding to the first multicast service, the SMF determines that a mode in which a gateway device UPF sends a data packet of the first multicast service to a RAN device is multicast or unicast (where for example, in the network-level multicast member list maintained by the SMF, there are N terminal devices requesting the first multicast service, and there are M access network devices serving the N terminal devices, where M<N, and in this case, the SMF determines that the UPF sends the data packet of the first multicast service to the RAN device in a multicast mode). Then, the SMF sends first configuration information to the UPF. The first configuration information includes indication information used to indicate a mode in which the UPF sends the data packet of the first multicast service to the RAN device. In one embodiment, the SMF further determines that a mode in which the RAN device sends the data packet of the first multicast service to the terminal device is unicast or multicast, and then the SMF sends second configuration information to the RAN device. The second configuration information includes first indication information used to indicate the mode in which the UPF sends the data packet of the first multicast service to the RAN device. In one embodiment, the second configuration information further includes second indication information used to indicate a mode in which the RAN device sends the data packet of the first multicast service to the terminal device. The SMF sends the second configuration information to the RAN device. The second configuration information may be sent by the SMF to the RAN device by using an AMF, or may be sent by the SMF to the RAN device by using the UPF. In one embodiment, the indication information used to indicate the mode in which the UPF sends the data packet of the first multicast service to the RAN device may be implicitly included in information sent by the SMF to the UPF and/or the RAN device. For example, the first configuration information sent by the SMF to the UPF and/or the second configuration information sent by the SMF to the RAN device include/includes information about a specific transmission channel (an identifier of a unicast tunnel) of a first terminal device. In other words, this means that the UPF sends the data packet of the first multicast service to the RAN device in a unicast mode. Alternatively, the first configuration information sent by the SMF to the UPF and/or the second configuration information sent by the SMF to the RAN device include/includes information about a multicast transmission channel (an identifier of a multicast tunnel). In other words, this means that the UPF sends the data packet of the first multicast service to the RAN device in a multicast mode.

For another example, for a 5G network architecture, if a UPF is a management device having a multicast service management function, and a network-level multicast member list maintained by the UPF includes a first multicast service corresponding to the first multicast service, because the UPF also serves as a gateway device, the UPF determines that a mode in which the UPF sends a data packet of the first multicast service to a RAN device is multicast or unicast (for example, in the network-level multicast member list maintained by the UPF, there are N terminal devices requesting the first multicast service, and there are M access network devices serving the N terminal devices, where M<N, and in this case, the UPF determines that the UPF sends the data packet of the first multicast service to the RAN device in a multicast mode). The UPF sends second configuration information to the RAN device. The second configuration information includes first indication information used to indicate a mode in which the UPF sends the data packet of the first multicast service to the RAN device. In one embodiment, the UPF further determines that a mode in which the RAN device sends the data packet of the first multicast service to the terminal device is unicast or multicast, and the second configuration information sent to the RAN device includes second indication information used to indicate a mode in which the RAN device sends the data packet of the first multicast service to the terminal device. The second configuration information is directly sent by the UPF to the RAN device, or is sent by the UPF to an SMF, and then sent by the SMF to the RAN device by using an AMF. In one embodiment, the indication information used to indicate the mode in which the UPF sends the data packet of the first multicast service to the RAN device may be implicitly included in information sent by the SMF to the RAN device. For example, the second configuration information sent by the SMF to the RAN device includes information about a specific transmission channel (an identifier of a unicast tunnel) of a first terminal device. In other words, this means that the UPF sends the data packet of the first multicast service to the RAN device in a unicast mode. Alternatively, the second configuration information sent by the SMF to the RAN device includes information about a multicast transmission channel (an identifier of a multicast tunnel). In other words, this means that the UPF sends the data packet of the first multicast service to the RAN device in a multicast mode. In this example, the UPF is both a management device having a multicast service management function, and a gateway device sending the data packet to the RAN device. Therefore, the management device does not need to send, to the gateway device, first configuration information used to indicate a mode in which the UPF sends the data packet of the first multicast service to the RAN device.

For another example, for a 4G network architecture, if a PGW is a management device having a multicast service management function, and a network-level multicast member list maintained by the PGW includes a first multicast service corresponding to the first multicast service, because the PGW also serves as a gateway device, the PGW determines that a mode in which the PGW sends a data packet of the first multicast service to a RAN device is multicast or unicast (for example, in the network-level multicast member list maintained by the PGW, there are N terminal devices requesting the first multicast service, and there are M access network devices serving the N terminal devices, where M<N, and in this case, the PGW determines that the PGW sends the data packet of the first multicast service to the RAN device in a multicast mode). The PGW sends second configuration information to the RAN device. The second configuration information includes first indication information used to indicate a mode in which the PGW sends the data packet of the first multicast service to the RAN device. In one embodiment, the PGW further determines that a mode in which the RAN device sends the data packet of the first multicast service to the terminal device is unicast or multicast, and the second configuration information sent to the RAN device includes second indication information used to indicate a mode in which the RAN device sends the data packet of the first multicast service to the terminal device. The second configuration information is directly sent by the PGW to the RAN device, or is sent by the PGW to the RAN device by using an SGW, or is sent by the PGW to an MME and then is sent by the MME to the RAN device. In one embodiment, the indication information used to indicate the mode in which the PGW sends the data packet of the first multicast service to the RAN device may be implicitly included in information sent by the PGW to the RAN device. For example, the second configuration information sent by the PGW to the RAN device includes information about a specific transmission channel (an identifier of a unicast tunnel) of a first terminal device. In other words, this means that the PGW sends the data packet of the first multicast service to the RAN device in a unicast mode. Alternatively, the second configuration information sent by the PGW to the RAN device includes information about a multicast transmission channel (an identifier of a multicast tunnel). In other words, this means that the PGW sends the data packet of the first multicast service to the RAN device in a multicast mode. In this example, the PGW is both a management device having a multicast service management function, and a gateway device sending the data packet to the RAN device. Therefore, the management device does not need to send, to the gateway device, first configuration information used to indicate a mode in which the PGW sends the data packet of the first multicast service to the RAN device.

For another example, for an MBMS network architecture, if an MBMS GW is a management device having a multicast service management function, and a network-level multicast member list maintained by the MBMS GW includes a first multicast service corresponding to the first multicast service, because the MBMS GW also serves as a gateway device, the MBMS GW determines that a mode in which the MBMS GW sends a data packet of the first multicast service to a RAN device is multicast or unicast (for example, in the network-level multicast member list maintained by the MBMS GW, there are N terminal devices requesting the first multicast service, and there are M access network devices serving the N terminal devices, where M<N, and in this case, the MBMS GW determines that the MBMS GW sends the data packet of the first multicast service to the RAN device in a multicast mode). The MBMS GW sends second configuration information to the RAN device. The second configuration information includes first indication information used to indicate a mode in which the MBMS GW sends the data packet of the first multicast service to the RAN device. In one embodiment, the MBMS GW further determines that a mode in which the RAN device sends the data packet of the first multicast service to the terminal device is unicast or multicast, and the second configuration information sent to the RAN device includes second indication information used to indicate a mode in which the RAN device sends the data packet of the first multicast service to the terminal device. The second configuration information is directly sent by the MBMS GW to the RAN device, or is sent by the MBMS GW to an MME, and then sent by the MME to the RAN device or sent by the MME to the RAN device by using an MCE. In one embodiment, the indication information used to indicate the mode in which the MBMS GW sends the data packet of the first multicast service to the RAN device may be implicitly included in information sent by the MBMS GW to the RAN device. For example, the second configuration information sent by the MBMS GW to the RAN device includes information about a specific transmission channel (an identifier of a unicast tunnel) of a first terminal device. In other words, this means that the MBMS GW sends the data packet of the first multicast service to the RAN device in a unicast mode. Alternatively, the second configuration information sent by the MBMS GW to the RAN device includes information about a multicast transmission channel (an identifier of a multicast tunnel). In other words, this means that the MBMS GW sends the data packet of the first multicast service to the RAN device in a multicast mode.

It should be further understood that, in addition to that the management device having the multicast service management function determines a mode in which the RAN device sends the data packet of the first multicast service to the terminal device, the RAN device itself may also determine a mode in which the RAN device sends the data packet of the first multicast service to the first terminal device. The RAN device determines, based on a quantity of terminal devices requesting the first multicast service and/or a status of a link between the RAN device and a terminal device requesting the first multicast service, a mode in which the RAN device sends the data packet of the first multicast service to the terminal device.

It should be further understood that, for ease of description, in the embodiments of this application, the first multicast service data packet indicates the data packet of the first multicast service.

To better understand this application, this application is described below with reference to FIG. 7A to FIG. 20 and by using a system the same as or similar to the system shown in FIG. 1 as an example.

Figure 7A:
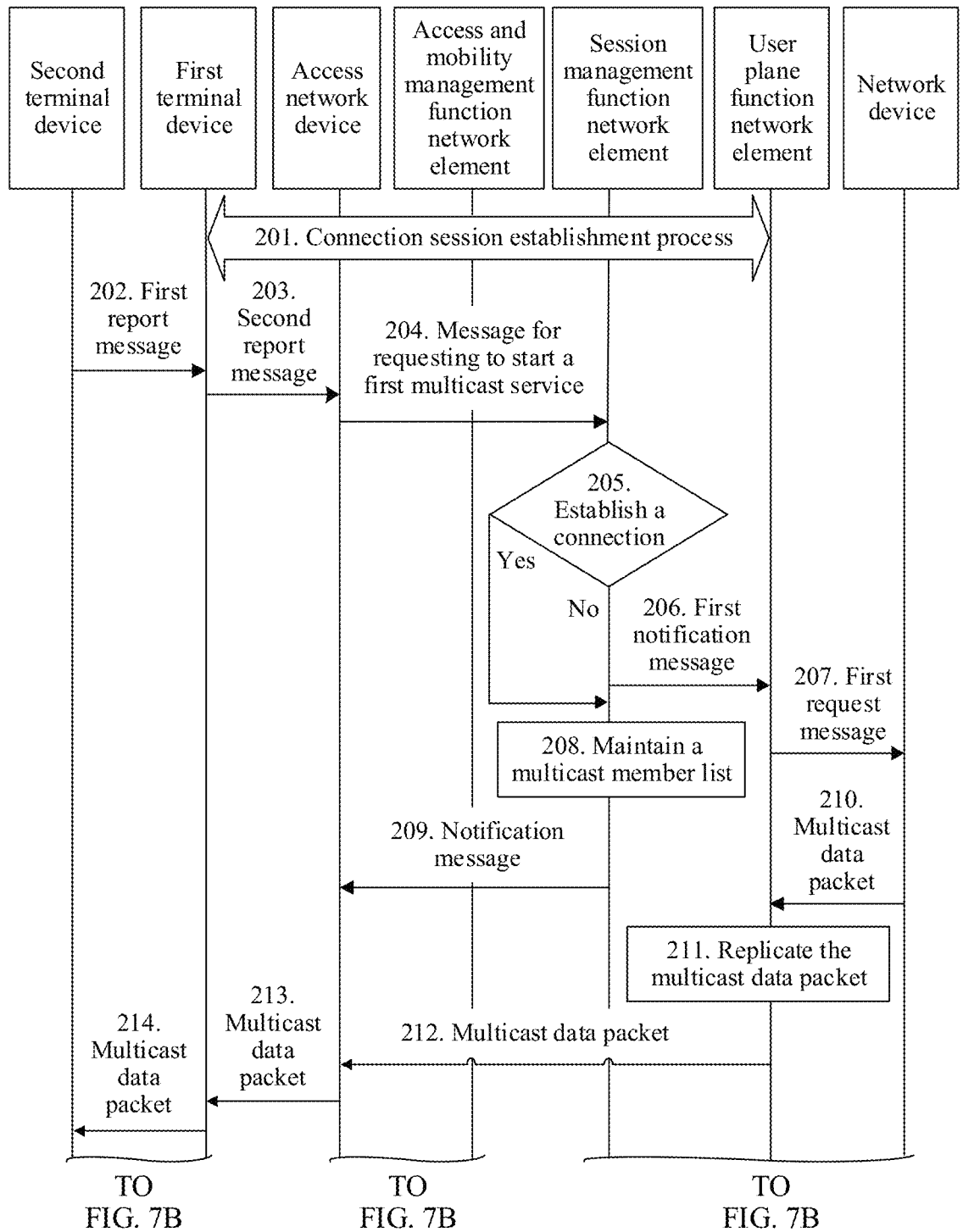
FIG. 7A and FIG. 7B are a schematic flowchart of a multicast service transmission method according to this application.
Figure 7B:

FIG. 7A and FIG. 7B are a schematic flowchart of a multicast service transmission method 200 in a 5G network architecture according to this application. In the method 200, a management device having a multicast service management function is a session management function (SMF) module, and a gateway device is a user plane function (UPF) module. As shown in FIG. 7A and FIG. 7B, the method 200 includes the following content.

Operation 201: A first terminal device sends a session establishment/modification request message to an access and management function (AMF) module by using an access network device, to trigger a process of establishing or modifying a PDU session.

In one embodiment, the session establishment/modification request message includes indication information. The indication information is used to indicate that a PDU session requested by the first terminal device needs to support a multicast service. The first terminal device may be a device such as a customer premises equipment CPE, a home gateway, or a mobile phone.

In one embodiment, the indication information is an explicit indication. For example, in the session establishment/modification request message, an indication bit is set. When the indication bit is 1, it indicates that the PDU session that is requested to be established includes the multicast service. When the indication bit is 0, it indicates that the PDU session that is requested to be established does not include the multicast service.

In one embodiment, the indication information may alternatively be an implicit indication. For example, according to a pre-agreement, an identifier such as a specific access point name (APN), data network name (DNN), network slice identifier (slice ID), or slice type is used to indicate that the PDU session that is request to be established needs to support a multicast service. For example, when it is agreed that the APN/DNN is an IPTV, or the slice ID indicates a network slice corresponding to a wireless broadband (WBB)/(wireless to the x, WTTx), it indicates that the PDU session requested to be established/modified needs to support a multicast service.

In a process of establishing the PDU session supporting the multicast service, the AMF needs to select, based on multicast service indication information in the session establishment/modification request of the first terminal device, an SMF supporting the multicast service, for example, a multicast SMF (m-SMF). Correspondingly, the SMF also needs to select, based on indication information explicitly or implicitly included in a message (for example, an SM request) that is sent by the AMF and that includes the session establishment/modification request of the first terminal device, a policy control function (PCF) module supporting the multicast service to establish a PDU-CAN session. If dynamic policy and charging control (PCC) is configured, the SMF obtains PCC rules from a PCF, or the SMF obtains PCC rules according to a static PCC rule. The SMF selects a UPF supporting a multicast service, for example, a multicast UPF (m-UPF), to establish an N4 session. In one embodiment, when selecting the UPF, the SMF may further refer to information such as the access point name APN/DNN and a UE location.

In the process of establishing the PDU session supporting the multicast service, the SMF may provide a quality of service (QoS) management and configuration function of the multicast service based on content included in the obtained PCC rules. The function includes: obtaining a QoS parameter corresponding to a QoS flow related to the multicast service, and allocating a quality of service flow identity (QoS flow identity, QFI) to a quality of service flow (QoS flow) of the multicast service; and providing a QoS-related configuration for a gateway device (for example, the UPF). The QoS related configuration includes an SDF template (for example, a multicast SDF template) of the multicast service. The SDF template includes at least one group of packet filter rules for a data packet of the multicast service, to instruct the UPF to map the data packet of the multicast service to a proper QoS flow for sending. The QoS-related configuration provided by the SMF for the UPF may be carried in a request/response/transmission message of an N4 interface. The SMF provides QoS profile information for a RAN device. The QoS profile information includes a QoS parameter configuration that is required by the RAN device and that is related to the multicast service, for example, a QFI related to the multicast service and a corresponding QoS parameter. The SMF may send the QoS profile information to the RAN device (through an N11 interface and an N2 interface) by using the AMF.

That a first terminal device sends a session establishment/modification request message to an AMF by using an access network device may be triggered by a multicast service session connection indication. This includes the following manners.

A second terminal device sends a first report message to the first terminal device. The first terminal device considers the first report message as the multicast service session connection indication. The first report message may be a message that the second terminal device requests to receive the multicast service, an access request, or the like. For example, the second terminal device is an STB, the first terminal device is a CPE, and the first report message sent by the STB to the CPE is an access request, an address allocation request (for example, DHCP discover), or a multicast service request (for example, an IGMP report message). After receiving the first report message, the CPE considers the first report message as the multicast service session connection indication, and sends the session establishment/modification request message to the AMF by using the RAN device, to trigger the process of establishing or modifying the PDU session.

Alternatively, the first terminal device obtains the multicast service session connection indication based on a service request of an application layer. For example, the first terminal device supports the multicast service. If the service request of the application layer of the first terminal device corresponds to the multicast service, the first terminal device considers the service request of the application layer as the multicast service session connection indication, and sends the session establishment/modification request message to the AMF by using the RAN device, to trigger the process of establishing or modifying the PDU session.

Alternatively, the first terminal device obtains the multicast service session connection indication based on service-related information in preconfigured information. For example, the first terminal device is a CPE, and the service-related information may be statically configured in the CPE, or the CPE obtains management/operation configuration information from a TR-069 server, where the management/operation configuration information includes the service-related information, or a UE policy obtained by the CPE from the PCF includes the service-related information. If the service-related information indicates that a service supported by the CPE includes the multicast service (for example, a DNN/APN related to the IPTV exists in configuration information of the CPE), the CPE may consider the service-related information as the multicast service session connection indication, and send the session establishment/modification request message to the AMF by using the RAN device, to trigger the process of establishing or modifying the PDU session.

In one embodiment, the second terminal device may include a terminal device that can support the multicast service, for example, a set-top box STB, an internet television set, a mobile phone, and a computer.

In this embodiment of the present application, a plurality of different terminal devices (including the second terminal device) may be connected to the first terminal device, and then connected to a mobile network by using the first terminal device. Connections are established between the first terminal device and the plurality of different terminal devices, to form a local area network served by the first terminal device.

Operation 202: A second terminal device sends a first report message to the first terminal device. The first report message is a message that the second terminal device requests to receive a first multicast service, and the first report message includes an identifier corresponding to the first multicast service.

In one embodiment, in this application, the identifier corresponding to the first multicast service may be an IP address of the first multicast service, or a temporary mobile group identity (TMGI) allocated to the first multicast service, or may be indication information that is agreed in a communications system and that indicates the first multicast service. For example, "1" indicates the first multicast service, and "2" indicates a second multicast service. It should be understood that the identifier corresponding to the first multicast service is not limited in this application, and the identifier corresponding to the first multicast service may alternatively be other information.

For example, the second terminal device is an STB, and the first terminal device is a CPE. The first report message may be a report message that the STB requests to receive a multicast service. For ease of description, in this embodiment of the present application, an IGMP join report is used to indicate that a device requests to receive a report message of a multicast service.

It should be noted that operation 202 is an optional operation. When the second terminal device has a multicast service requirement, operation 202 is performed.

In one embodiment, operation 202 may alternatively be performed before operation 201. In one embodiment, the first report message sent by the second terminal device to the first terminal device may be considered as the multicast service session connection indication by the first terminal device, and is used as a trigger condition for the first terminal device to send the session establishment/modification request message to the AMF by using the RAN device in operation 201.

Operation 203: The first terminal device sends a second report message to a RAN device. The second report message is used by the first terminal device to request to receive the first multicast service.

For example, the second report message is an IGMP join report that the CPE requests to receive the first multicast service, or the second report message is an IGMP join report that is forwarded by the CPE and that the STB requests to receive the first multicast service. The second report message carries the identifier corresponding to the first multicast service.

In one embodiment, the second report message may further carry an identifier of the second terminal device and/or an identifier corresponding to the first terminal device.

That the first terminal device requests to receive the first multicast service includes: The second terminal device has a first multicast service requirement, and the first terminal device forwards a message that the second terminal device requests to receive the first multicast service, or the first terminal device is configured with an IGMP proxy capability, and may serve as a proxy to request to receive the first multicast service; or the first terminal device itself has a first multicast service requirement and requests to receive the first multicast service.

For ease of description, in this embodiment of this application, the solution is mainly described by using an example in which the first terminal device is configured with the IGMP proxy capability, to serve as a proxy to request to receive the first multicast service, and the second report message carries the identifier corresponding to the first terminal device.

The identifier corresponding to the first terminal device includes but is not limited to at least one of the following information: an identifier of the first terminal device, an identifier of a connection session established by the first terminal device, a bearer identifier of the first terminal device, a tunnel identifier corresponding to a session or a bearer of the first terminal device, and an identifier of a RAN device serving the first terminal device (for example, an IP address of the RAN device, an eNB ID/a gNB ID, and a global eNB/gNB ID), and an identifier of a cell serving the first terminal device. The identifier of the first terminal device may be, for example, an IP address of the first terminal device, a medium access control (MAC) address, an international mobile subscriber identity (IMSI), an international mobile station equipment identity (IMEI), a temporary mobile subscriber identity (TMSI), a cell radio network temporary identifier (C-RNTI), or a UE identifier (such as an AMF UE NGAP ID, a gNB UE NGAP ID, an eNB UE S1AP ID, or an MME UE S1AP ID) of the terminal device on an interface (such as an NG interface or an S1 interface) between an access network and a core network. The bearer identifier of the first terminal device may be an evolved packet system (EPS) bearer identifier of the first terminal device, and/or an air interface bearer (RB) identifier of the first terminal device.

In one embodiment, in operation 203, that the first terminal device records information that the second terminal device requests to receive the first multicast service includes: For example, the first terminal device maintains a local multicast member list. The local multicast member list includes at least one identifier corresponding to a multicast service and/or an information entry corresponding to the multicast service, and the information entry corresponding to the multicast service includes an identifier corresponding to the second terminal device requesting to receive the multicast service. The first terminal device reads the received first report message and learns that the second terminal device requests to receive the first multicast service. If a valid information entry that is of the second terminal device and that is corresponding to the first multicast service has been stored in the local multicast member list stored by the first terminal device, the first terminal device does not need to update the local multicast member list; otherwise, the first terminal device adds, to the local multicast member list maintained by the first terminal device, an information entry that is of the second terminal device and that is corresponding to the first multicast service, or modifies the local multicast member list maintained by the first terminal device, to be validate the information entry that is of the second terminal device and that is corresponding to the first multicast service. The information entry that is of the second terminal device and that is corresponding to the first multicast service includes: the identifier corresponding to the first multicast service, and/or the identifier corresponding to the second terminal device requesting to receive the first multicast service.

For example, Table 1 shows a form of the local multicast member list maintained by the first terminal device. The first column is an identifier corresponding to a multicast service, the second column is an identifier of a second terminal device, and the third column is whether an information entry corresponding to each row is valid (where this column is optional). If the first report message is an IGMP join report indicating that a terminal device $UE_{03}$ requests to receive a first multicast service corresponding to an address of a program 1, the first terminal device adds an identifier $UE_{03}$ of the terminal device to an information entry corresponding to the address of the program 1 in the local multicast member list, and sets a value of the "Valid or not" column corresponding to the information entry of $UE_{03}$ to 1 (where 0 indicates that information in this row is invalid, and 1 indicates that information in this row is valid.) In this application, the identifier corresponding to the multicast service includes, for example, a multicast IP address corresponding to the multicast service, or a temporary mobile group identity TMGI, or other information that identifies the multicast service and that is agreed in the communications system. In this embodiment of this application, in the local multicast member list maintained by the first terminal device, the multicast service corresponding to the identifier corresponding to the multicast service may be understood as a "multicast service that can be received by the first terminal device", or may be understood as a "multicast service in which the first terminal device has joined".

TABLE 1

Form of the local multicast member list maintained by the first terminal device

| Identifier of the multicast service | Identifier of the terminal device | Valid or not |
|---|---|---|
| Address of the program 1 (224.0.1.0) | $UE_{01}$ | 0 |
|  | $UE_{02}$ | 1 |
|  | $UE_{03}$ | 1 |
| Address of the program 2 (224.0.1.1) | $UE_{04}$ | 0 |

In the example in Table 1, the identifier corresponding to the first multicast service is a multicast IP address corresponding to the first multicast service, for example, 224.0.1.0. The identifier corresponding to the second terminal device includes but is not limited to at least one of the following information: the identifier of the second terminal device, an identifier of an interface/a port between the second terminal device and the first terminal device, an identifier of a bearer or a logical channel between the second terminal device and the first terminal device, and the like. The identifier of the second terminal device may be an IP address, a MAC address, an IMSI, a TMSI, a C-RNTI, or the like of the second terminal device.

In one embodiment, the first terminal device may be configured with an IGMP/MLD proxy (IGMP/MLD proxy) function or an IGMP/MLD snooping (IGMP/MLD snooping) function, to maintain the local multicast member list. In this case, after receiving an IGMP/MLD report packet (for example, a group member report—an IGMP join report or a leave report—an IGMP leave report) of the second terminal device, the first terminal device may record information such as an identifier (for example, an IP address or a MAC address of the second terminal device) of the second terminal device requesting the multicast service or a number of a port receiving the IGMP/MLD packet, and/or an identifier (for example, a multicast IP address) corresponding to the multicast service that the second terminal device requests to receive. For example, when the first terminal device is configured with the IGMP/MLD proxy, the first terminal device may read information in the IGMP/MLD packet of the terminal device, maintain the local multicast member list including the second terminal device, and serve as an IGMP/MLD client to send the IGMP/MLD packet (including an active report and a query response) as a proxy. Alternatively, if the first terminal device is configured with the IGMP/MLD snooping function, the first terminal device may listen to information in the packet, maintain the local multicast member list including the second terminal device, and forward each received IGMP/MLD packet to the access network device.

In one embodiment, that the first terminal device determines, based on the received first report message, whether to send the second report message to the RAN device includes: For example, the first terminal device sends the second report message to the access network device each time receiving the first report message. Alternatively, the first terminal device receives the first report message. If the first terminal device does not send, within a preset period of time, the second report message used to request to receive the first multicast service, the first terminal device sends the second report message to the access network device. Alternatively, after receiving the first report message, the first terminal device checks the local multicast member list maintained by the first terminal device. If in the local multicast member list, the identifier that is corresponding to the first multicast service and that is in the first report message is not included, or in all valid information entries of the local multicast member list, no terminal device corresponds to the identifier corresponding to the first multicast service, the first terminal device sends the second report message to the access network device, to request to receive the first multicast service. The second report message includes the identifier corresponding to the first multicast service.

Operation 204: The RAN device sends, to a management device (for example, an SMF) having a multicast service management function, a message for requesting to receive the first multicast service.

In an optional manner, a process includes: The RAN device receives the second report message sent by the first terminal device, and forwards the second report message to a gateway device (for example, a UPF), and after identifying that the second report message is a message that is related to the multicast service and that is sent by the first terminal device, the UPF sends the message to the management device (for example, the SMF) having the multicast service management function, where the message includes the second report message.

It should be understood that, if the RAN device sends the second report message to the SMF by using the UPF, the SMF needs to configure a detection rule of a message related to the multicast service for the UPF. According to the detection rule configured by the SMF, after receiving the second report message, the UPF identifies the second report message as the message (such as the IGMP join report or the IGMP leave report) that is related to the multicast service and that is of the first terminal device, and forwards the second report message to the SMF, so that the SMF manages a network-level multicast member. For example, the detection rule configured by the SMF is: determining, based on a format of the IGMP report message and padding content of a corresponding field, that the received data packet is the IGMP report message.

In one embodiment, that the UPF identifies the second report message as a message that is related to the multicast service and sent by the first terminal device includes: For example, the UPF reads a source IP address and a destination IP address of the second report message, and/or content of the IGMP packet. The source address is an IP address of the first terminal device, and the destination IP address is an address of the first multicast service, an IGMP type field is displayed as a "member report" type, and an IGMP group address field is the address of the first multicast service. In this case, the UPF may determine that the second report message is an IGMP report message—an IGMP join report, that is sent by the first terminal device and used to request to receive the first multicast service. Alternatively, the UPF reads a source IP address and a destination IP address of the second report message. The source address is an IP address of the first terminal device, and the destination IP address is an address of the first multicast service. In this case, the UPF may determine that the second report message is an IGMP report message—an IGMP join report, that is sent by the first terminal device and used to request to receive the first multicast service.

In another optional manner, the RAN device may send the second report message to the SMF by using the AMF. In this manner, the first terminal device adds the second report message to a non-access stratum (NAS) message. After receiving the NAS message, the RAN device forwards the NAS message to an AMF corresponding to the first terminal device, and then the AMF forwards, to the SMF, the second report message carried in the NAS message or key information in the second report message carried in the NAS message. A manner in which the first terminal device adds the second report message to the NAS message includes: For example, the first terminal device adds the second report message to a message container of the NAS message sent by the first terminal device. Alternatively, the NAS message sent by the first terminal device is of a specific type (for example, a type related to the multicast service request), and includes information carried in the second report message, for example, any one or more of the following: the identifier corresponding to the first terminal device, the identifier corresponding to the first multicast service, an indication for requesting to receive the first multicast service, and the like.

In one embodiment, the RAN device has a multicast service management capability. In one embodiment, the RAN device may maintain a cell-level multicast member list based on the received second report message (where for example, the RAN device is configured with an IGMP proxy or IGMP snooping function, and may read the IGMP join report or IGMP leave report sent by the first terminal device, and maintain the cell-level multicast member list). The cell-level multicast member list includes an identifier of the first multicast service and/or an identifier corresponding to a terminal device (including the first terminal device) that requests the first multicast service and that is served by the RAN device, and optionally further includes the identifier of the second terminal device.

For example, Table 2 shows a form of the cell-level multicast member list maintained by the RAN device. The first column is an identifier (for example, a multicast IP address) corresponding to a multicast service, the second column is an identifier of a first terminal device, the third column is an identifier of a radio bearer that is between the RAN device and the first terminal device and used to send a data packet corresponding to the multicast service, and the fourth column indicates whether an information entry in each row is valid (where this column is optional). If the second report message is an IGMP join report indicating that a first terminal device $UE_{13}$ requests to receive a multicast service corresponding to an address of a program 1, the RAN adds, to an identifier that is of the first terminal device and that is corresponding to the address of the program 1 in the cell-level multicast member list, an identifier $UE_{13}$ of the first terminal device and an identifier $RB_3$ of a bearer that is allocated to $UE_{13}$ and that is used to send a data packet of the program 1, and sets a value of the "Valid or not" column corresponding to an information entry of $UE_{13}$ to 1 (where 0 indicates that information in this row is invalid, and 1 indicates that information in this row is valid.)

TABLE 2

Form of the cell-level multicast member list maintained by the RAN device

| Identifier of the multicast service | Identifier of the terminal device | Identifier of the bearer | Valid or not |
|---|---|---|---|
| Address of the program 1 (224.0.1.0) | $UE_{11}$ | $RB_1$ | 1 |
|  | $UE_{12}$ | $RB_2$ | 1 |
|  | $UE_{13}$ | $RB_3$ | 1 |
| Address of the program 2 (224.0.1.1) | $UE_{14}$ | $RB_4$ | 1 |

In one embodiment, the cell-level multicast member list may further include link status information. The link status information may be used by the RAN device to determine a mode in which the first multicast service data packet is sent to the first terminal device.

Operation 205: The SMF determines, based on the second report message, whether a UPF that provides a transmission service for the first multicast service of the first terminal device has established a connection related to the first multicast service to the network device.

In one embodiment, the SMF reads the address of the first multicast service in the second report message, and determines whether the UPF that provides the transmission service for the first multicast service of the first terminal device has established the connection related to the first multicast service to the network device. For example, the SMF may check a network-level multicast member list, and if the network-level multicast member list includes at least one valid information entry related to the first multicast service, the SMF may determine that the UPF has established the connection related to the first multicast service to the network device; otherwise, the SMF may determine that the UPF has not established the connection related to the first multicast service to the network device.

In this embodiment of the present application, the network device may be, for example, a device such as a router or gateway that supports IP multicast and that is in a data network DN, a multicast query node, or a multicast service server. For understanding of the network-level multicast member list and content of the valid information entry related to the first multicast service in the network-level multicast member list, refer to descriptions in operation 208.

Operation 205 is an optional operation.

Operation 206: The SMF sends a first notification message to the UPF. The first notification message is used to instruct the UPF to establish a connection related to the first multicast service to the network device.

In one embodiment, for example, with reference to operation 205, the SMF determines whether the UPF that provides the transmission service for the first multicast service of the first terminal device has established a connection related to the first multicast service to the network device. If the SMF determines that the UPF that provides the transmission service for the first multicast service of the first terminal device has not established a connection related to the first multicast service to the network device, the SMF sends the first notification message to the UPF, to instruct the UPF to establish a connection related to the first multicast service to the network device; or if the SMF determines that the UPF that provides the transmission service for the first multicast service of the first terminal device has established a connection related to the first multicast service to the network device, operation 206 and operation 207 may not be performed.

Operation 207: The UPF sends a first request message to the network device. The first request message is used by the UPF to request to establish a connection related to the first multicast service to the network device.

For example, the UPF may send, to the network device by using a multicast management protocol such as IGMP/MLD or a multicast routing protocol such as protocol independent multicast (PIM), a request message used to join the first multicast service (for example, send the IGMP join report) or join a multicast routing tree corresponding to the first multicast service (where for example, the UPF sends a graft request message for joining the multicast routing tree).

Operation 208: The SMF maintains a network-level multicast member list.

The network-level multicast member list maintained by the SMF includes an identifier corresponding to each multicast service, and further includes an information entry related to a terminal device that needs to receive the multicast service, where the information entry corresponds to the multicast service. The terminal device that needs to receive the multicast service, for example, the first terminal device, is considered as one of a member of the multicast service. The information entry includes an identifier corresponding to the terminal device serving as the member of the multicast service. For understanding of the identifier, refer to the "identifier corresponding to the first terminal device" described in operation 203.

That the SMF maintains a network-level multicast member list may include: For example, the SMF reads the identifier of the first multicast service in the second report message and the identifier corresponding to the first terminal device, and optionally, the SMF may further read the identifier of the second terminal device in the second report message. If there is already a valid information entry corresponding to both the first terminal device and the first multicast service in the network-level multicast member list maintained by the SMF, the SMF may not need to update the network-level multicast member list. Otherwise, the SMF updates the network-level multicast member list. In one embodiment, the SMF adds the information entry corresponding to both the first terminal device and the first multicast service to the network-level multicast member list, or validates the information entry corresponding to both the first terminal device and the first multicast service. The information entry corresponding to both the first terminal device and the first multicast service includes the identifier corresponding to the first multicast service, and/or the identifier corresponding to the first terminal device, and optionally, further includes the identifier of the second terminal device.

In one embodiment, if the SMF updates the network-level multicast member list, the SMF sends a network-level multicast member notification message to the UPF, to enable the UPF to know that the first terminal device is added to a member corresponding to the first multicast service, so that when receiving the data packet of the first multicast service, the UPF forwards the data packet to all terminal devices (including the first terminal device) that request content of the first multicast service, that are corresponding to the first multicast service identifier, and that are in the network-level multicast member list. The network-level multicast member notification message may include an updated network-level multicast member list, or all valid information entries corresponding to the first multicast service in the updated network-level multicast member list, or indication information used to indicate the added first terminal device and an information entry corresponding to the first multicast service.

For example, Table 3 shows a form of the network-level multicast member list maintained by the management device (for example, the SMF). The first column is an identifier corresponding to a multicast service, the second column is an identifier of an access network device, and the third column is an identifier of a terminal device. If the second report message is an IGMP join report indicating that a terminal device $UE_{22}$ requests to receive the multicast service corresponding to the address of the program 1, an access network device $RAN_2$ serves $UE_{22}$, but the network-level multicast member list in Table 3 does not include an information entry corresponding to the terminal device $UE_{22}$ and the address of the program 1, the SMF adds, to the information entry corresponding to the address of the program 1 in the network-level multicast member list, an identifier $UE_{22}$ of the terminal device and/or an identifier $RAN_2$ of the access network device serving $UE_{22}$. In this application, the identifier of the RAN device may be, for example, an IP address of the RAN device, a tunnel end identity (TEID) configured on the RAN device, a base station identifier (eNB/gNB ID), or a global base station identifier (global eNB/gNB ID).

TABLE 3

Form of the network-level multicast member list maintained by the management device

| Identifier of the multicast service | Identifier of the RAN device | Identifier of the terminal device |
|---|---|---|
| Address of the program 1 (224.0.1.0) | $RAN_1$ | $UE_{11}$ |
| | $RAN_1$ | $UE_{12}$ |
| | $RAN_2$ | $UE_{21}$ |
| Address of the program 2 (224.0.1.1) | $RAN_3$ | $UE_{31}$ |

For example, Table 4 shows another form of the network-level multicast member list. The first column is an identifier corresponding to a multicast service, the second column is an identifier of an access network device, the third column is an identifier of a terminal device, and the fourth column is whether an information entry corresponding to each row is valid. If the second report message is that a terminal device $UE_{21}$ requests to access the address of the program 1, and the access network $RAN_2$ serves $UE_{21}$, the SMF sets, in an information entry corresponding to the address of the program 1 in the network-level multicast member list, a value of the "Valid or not" column in the information entry corresponding to $UE_{21}$ to 1 (where 0 indicates that the information in this row is invalid, and 1 indicates that the information in this row is valid.)

TABLE 4

Form of the network-level multicast member list maintained by the management device

| Identifier of the multicast service | Identifier of the RAN device | Identifier of the terminal device | Valid or not |
|---|---|---|---|
| Address of the program 1 (224.0.1.0) | $RAN_1$ | $UE_{11}$ | 0 |
| | $RAN_1$ | $UE_{12}$ | 1 |
| | $RAN_2$ | $UE_{21}$ | 1 |
| Address of the program 2 (224.0.1.1) | $RAN_3$ | $UE_{31}$ | 0 |

If the second report message is that the terminal device $UE_{22}$ requests to access the address of the program 1, and the access network $RAN_2$ serves $UE_{22}$, the SMF adds, to the information entry corresponding to the address of the program 1 in the network-level multicast member list, the identifier $UE_{22}$ of the terminal device and the identifier $RAN_2$ of the access network device corresponding to the terminal device $UE_{22}$, and sets a value of the "Valid or not" column to 1.

Operation 205 to operation 208 are processes in which the SMF instructs, based on the second report message, the UPF to establish the multicast connection and maintain the network-level multicast member list.

In one embodiment, when receiving the second report message, the SMF may first maintain the network-level multicast member list. For details of a process of maintaining the network-level multicast member list by the SMF, refer to operation 208. After maintaining the network-level multicast member list, the SMF determines, based on the second report message, whether the UPF that provides the transmission service for the first multicast service of the first terminal device has established the connection related to the first multicast service to the network device. For this process, refer to operation 205. If the SMF determines that the UPF has not established the connection related to the first multicast service to the network device, the SMF sends the first notification message to the UPF, where the first notification message is used to instruct the UPF to establish the connection related to the first multicast service to the network device. For this process, refer to operation 206. After receiving the first notification message, the UPF sends the first request message to the network device, where the first request message is used by the UPF to request to establish the connection related to the first multicast service to the network device. For this process, refer to operation 207. In other words, operation 208 may be performed before operation 205 to operation 207, or operation 208 may be performed before operation 206 and operation 207 in another optional solution. Whether the SMF first maintains the network-level multicast member list or first determines whether the UPF that provides the transmission service for the first multicast service of the first terminal device has established the connection related to the first multicast service to the network device is not limited in this application.

Operation 209: The SMF sends a notification message to the RAN device.

In one embodiment, the notification message includes a cell-level multicast member notification message. The cell-level multicast member notification message includes the identifier of the first multicast service and/or identifiers corresponding to all terminal devices that are served by the RAN device and that are in members of the first multicast service. Alternatively, the cell-level multicast member notification message includes indication information used to instruct to add the first terminal device to a member of the first multicast service, where the first terminal device is served by the RAN device.

In one embodiment, the SMF determines that a send mode of the data packet of the first multicast service between the gateway device and the RAN device is unicast or multicast (a unicast mode in this embodiment), and the SMF further sends the second configuration information to the RAN device, where the second configuration information includes first indication information used to instruct the UPF to send the data packet of the first multicast service to the RAN device.

In a possible manner, the notification message sent by the SMF to the RAN device includes the second configuration information.

In a possible manner, the first indication information is implicitly included in the message sent by the SMF to the RAN device. For example, in the process of establishing a PDU session supporting the multicast service between the first terminal device and the network device, if the message sent by the SMF to the RAN device by using the AMF includes a specific transmission tunnel identifier of the first terminal device, it indicates that the send mode of the data packet of the first multicast service between the UPF and the RAN device is unicast. Alternatively, if the message sent by the SMF to the RAN device by using the AMF includes a multicast transmission tunnel identifier, it indicates that the send mode of the data packet of the first multicast service between the UPF and the RAN device is multicast.

In a possible example, the SMF may send the notification message to the RAN device by using the AMF. Alternatively, in another possible example, the SMF sends the notification message to the RAN device by using the UPF.

Operation 209 is an optional operation, and needs to be performed in some cases. For example, when the data packet of the multicast service is sent between the UPF and the RAN device in a multicast mode, and the RAN device does not have the multicast service management capability described in operation 204, operation 209 needs to be performed. Operation 209 may not be performed when the data packet of the multicast service is sent between the UPF and the RAN device (or the terminal device) in a unicast mode or when the RAN device has the multicast service management capability described in operation 204.

Operation 210: The network device sends a data packet of the first multicast service to the UPF.

For ease of description, in the embodiments of this application, the first multicast service data packet indicates the data packet of the first multicast service.

Operation 211: The UPF receives the data packet that is of the first multicast service and that is sent by the network device, and replicates the data packet of the first multicast service.

In an optional manner, that the UPF replicates the data packet of the first multicast service includes: The UPF learns, based on the network-level multicast member notification message sent by the SMF, of terminal devices that are served by the UPF and that are members of the first multicast service, and then replicates the data packet based on a quantity of the members of the first multicast service. In one embodiment, the UPF may further add an identifier corresponding to a terminal device and/or information related to QoS guarantee to a replicated data packet. For example, the network-level multicast member information maintained by the SMF is shown in Table 3. The first multicast service corresponds to the program 1, and members of the first multicast service include $UE_{11}$, $UE_{12}$, and $UE_{21}$. After receiving a data packet of the program 1, the UPF replicates three copies of the data packet based on the network-level multicast member notification message sent by the SMF, and sends replicated data packets to $UE_{11}$, $UE_{12}$, and $UE_{21}$ respectively. In one embodiment, the UPF may add, to the replicated data packet, one or more of the following information: an identifier (for example, a QoS flow identity, QFI) of a QoS flow to which the data packet of the first multicast service is mapped, a corresponding 5G quality of service identifier (5G QoS identifier, 5QI), an N3 tunnel identifier corresponding to the PDU session of the terminal device, and the like.

Operation 212: The UPF sends the data packet of the first multicast service to the RAN device.

The UPF maps the replicated data packet of the first multicast service to a first QoS flow based on a QoS-related configuration (for example, a multicast service flow template multicast SDF template) provided by the SMF, and sends the data packet to the RAN device. The RAN device serves the first terminal device, and the first terminal device is one of the members of the first multicast service.

Operation 213: The RAN device receives the data packet that is of the first multicast service and that is sent by the UPF, and sends the data packet of the first multicast service to the first terminal device.

That the RAN device receives the data packet that is of the first multicast service and that is sent by the UPF, and sends the data packet of the first multicast service to the first terminal device includes: For example, the data packet that is of the first multicast service and that is received by the RAN device carries the identifier corresponding to the first terminal device (for example, the N3 tunnel identifier corresponding to the PDU session of the first terminal device). Therefore, the RAN device may determine that the data packet of the first multicast service needs to be sent to the first terminal device. In one embodiment, the RAN device maps the data packet to an air interface radio bearer (RB) based on a first QFI carried in the data packet of the first multicast service, a QoS parameter corresponding to the first QFI, and/or a correspondence between a first QoS flow indicated by the first QFI and the RB, and sends the data packet to the first terminal device. The correspondence between the QoS flow and the RB may be preconfigured by the management device (for example, the SMF) for the RAN device, or may be determined by the RAN device based on a QoS parameter of the QoS flow and a QoS parameter of the RB.

Operation 214: The terminal device receives the data packet that is of the first multicast service and that is sent by the RAN device, and sends the data packet of the first multicast service to the second terminal device. It should be understood that, the first device sends the data packet of the first multicast service to the second terminal device is an optional action. If the first terminal device receives the first report message used by the second terminal device to request to receive the first multicast service in operation 202, the first terminal device further needs to send the data packet of the first multicast service to the second terminal device in this operation.

In an optional manner, the data packet that is of the first multicast service and that is received by the first terminal device carries the identifier of the first multicast service. The first terminal device queries the local multicast member list maintained by the first terminal device, determines that the second terminal device is a member of the first multicast service, and then sends the data packet of the first multicast service to the second terminal device.

Operation 215: The second terminal device sends a third report message to the first terminal device. The third report message is used to request to terminate the first multicast service. The identifier of the first multicast service corresponds to the first multicast service, and the third report message includes the identifier corresponding to the first multicast service.

For example, the third report message is an IGMP leave report sent by the second terminal to request to leave the first multicast service, and includes the IP address of the second terminal device and/or the IP address of the first multicast service.

In one embodiment, the first terminal device reads or listens to the third report message to learn that the second terminal device requests to terminate the first multicast service. In this case, the first terminal device records information that the second terminal device requests to terminate the first multicast service.

That the first terminal device records information that the second terminal device requests to terminate the first multicast service includes: For example, the first terminal device deletes an information entry that is of the second terminal device and that is corresponding to the identifier of the first multicast service from the local multicast member list maintained by the first terminal device, or modifies the local multicast member list maintained by the first terminal device, to invalidate the information entry that is of the second terminal device and that is corresponding to the identifier of the first multicast service is invalid. For content of the information entry that is of the second terminal device and that is corresponding to the identifier of the first multicast service, refer to descriptions in operation 203.

In one embodiment, the first terminal device sends query information to determine whether there is still another member of the first multicast service in the local area network served by the first terminal device.

That the first terminal device sends query information to determine whether there is still another member of the first multicast service includes: For example, the first terminal device sends an IGMP/MLD query message to query whether there is still another terminal device that needs to receive the first multicast service in the local area network served by the first terminal device. If the first terminal device does not receive, within a specified period of time after sending the inquiry information, a report message that a terminal device in the local area network requests to receive the first multicast service, the first terminal device may consider that no terminal device in the local area network served by the first terminal device has a requirement for the first multicast service, and in subsequent steps, send, to the access network device, a report message for requesting to exit the first multicast service.

Operation 215 is an optional operation, and is performed when the second terminal device supports actively sending an IGMP/MLD leave packet, the second terminal device is connected to the first terminal device, and the second terminal device needs to terminate the first multicast service.

Operation 216: The first terminal device sends a fourth report message to a RAN device. The fourth report message is used by the first terminal device to request to exit the first multicast service.

For example, the first terminal device is a CPE, and the fourth report message is an IGMP leave report (IGMP leave report) sent by the CPE to request to terminate the first multicast service; or the fourth report message is an IGMP leave report sent by the STB to request to exit the first multicast service, and is sent to the RAN device by using the CPE. The fourth report message carries the identifier corresponding to the first multicast service. In one embodiment, the fourth report message may further carry the identifier of the second terminal device and/or the identifier corresponding to the first terminal device.

For the identifier of the second terminal device and the identifier corresponding to the first terminal device, refer to descriptions in the foregoing steps.

That the first terminal device requests to exit the first multicast service includes: The second terminal device requests to exit the first multicast service, and the first terminal device forwards the request of the second terminal device for exiting the first multicast service, or the first terminal device is configured with an IGMP proxy capability, to serve as a proxy to request to exit the first multicast service; or the first terminal device itself requests to exit the first multicast service. For ease of description, in this embodiment of this application, the solution is mainly described by using an example in which the first terminal device is configured with the IGMP proxy capability, to serve as a proxy to request to exit the first multicast service.

Operation 217: The RAN device sends, to the management device (for example, the SMF) having the multicast service management function, a message for requesting to terminate the first multicast service.

In an optional manner, that the RAN device sends, to the SMF, a message for requesting to terminate the first multicast service includes: The RAN device receives the fourth report message sent by the first terminal device, and forwards the fourth report message to the gateway device (for example, the UPF); and after identifying that the fourth report message is a message (for example, an IGMP join report or an IGMP leave report) that is related to the multicast service and that is of the first terminal device, the UPF sends a message to the SMF, where the message includes the fourth report message.

It should be understood that, if the RAN device sends the fourth report message to the SMF by using the UPF, the SMF needs to configure a detection rule of a message related to the multicast service for the UPF. According to the detection rule configured by the SMF, after receiving the fourth report message, the UPF identifies the fourth report message as the message that is related to the multicast service and that is of the first terminal device, and forwards the fourth report message to the SMF, so that the SMF manages a multicast member. For example, the detection rule configured by the SMF is: determining, based on a format of the IGMP report message and padding content of a corresponding field, that the received data packet is the IGMP report message.

In one embodiment, that the UPF identifies the fourth report message as the message that is related to the multicast service and that is of the first terminal device includes: For example, the UPF reads a source IP address and a destination IP address of the fourth report message, and/or content of the IGMP packet. The source address is the IP address of the first terminal device, and the destination IP address is 224.0.0.2 (a special group address, indicating all multicast routers in a network segment), an IGMP type field is displayed as a "leave group message" type, and an IGMP group address field is the address of the first multicast service. In this case, the UPF may determine that the fourth report message is an IGMP report packet—an IGMP leave report, that the first terminal device requests to exit the first multicast service. Alternatively, the UPF reads a source IP address and a destination IP address of the fourth report message. The source address is the IP address of the first terminal device, and the destination IP address is 224.0.0.2. In this case, the UPF may determine that the fourth report message is an IGMP report packet—an IGMP leave report, that the first terminal device requests to exit the first multicast service.

In another optional manner, that the RAN device sends, to the SMF, a message for requesting to terminate the first multicast service includes: The RAN sends the fourth report message to the SMF by using the AMF. In this manner, the first terminal device adds the fourth report message to a non-access stratum NAS message. After receiving the NAS message, the RAN device forwards the NAS message to the AMF corresponding to the first terminal device, and then the AMF forwards, to the SMF, the fourth report message carried in the NAS message or key information in the fourth report message carried in the NAS message. A manner in which the first terminal device adds the fourth report message to the NAS message includes: For example, the first terminal device adds the fourth report message to a message container (message container) of the NAS message sent by the first terminal device. Alternatively, the NAS message sent by the first terminal device is of a specific type (for example, a type related to the multicast service request), and includes information carried in the fourth report message, for example, any one or more of the following: the identifier corresponding to the first terminal device, the identifier corresponding to the first multicast service, an indication for requesting to terminate the first multicast service, and the like.

In one embodiment, the RAN device has the multicast service management capability. In one embodiment, the RAN device may maintain the cell-level multicast member list based on the received fourth report message. For example, the RAN device is configured with an IGMP snooping function, and maintains the cell-level multicast member list shown in Table 2. The RAN device reads the fourth report message sent by the first terminal device ($UE_{13}$), where the fourth report message is an IGMP leave report that $UE_{13}$ requests to leave the first multicast service (corresponding to the program 1), and in the cell-level multicast member list maintained by the RAN device, the RAN device may delete the information entry that is of $UE_{13}$ and that is corresponding to the program 1, or set a value of the "Valid or not" column in the fourth column of the information entry that is of $UE_{13}$ and that is corresponding to the program 1 to 0, to indicate that information in this row is invalid.

Operation 218: The SMF maintains the network-level multicast member list based on the fourth report message. For understanding of the network-level multicast member list maintained by the SMF, refer to descriptions in operation 208.

That the SMF maintains the network-level multicast member list based on the fourth report message may include: For example, the SMF reads the identifier of first multicast service and the identifier corresponding to the first terminal device that are included in the fourth report message, where the fourth report message optionally further includes the identifier of the second terminal device; and the SMF updates the network-level multicast member list, that is, deletes an information entry corresponding to both the first terminal device and the first multicast service from the network-level multicast member list, or invalidates an information entry corresponding to both the first terminal device and the first multicast service. The information entry corresponding to both the first terminal device and the first multicast service includes the identifier corresponding to the first multicast service, and/or the identifier corresponding to the first terminal device, and optionally, further includes the identifier of the second terminal device.

For example, the network-level multicast member list maintained by the SMF is shown in Table 3. If the fourth report message is a message that the terminal device $UE_{21}$ requests to terminate the program 1, the SMF deletes, from the network-level multicast member list, an information entry that is of the terminal device $UE_{21}$ and that is corresponding to the address of the program 1. The information entry includes the identifier of the access network device $RAN_2$. Alternatively, the network-level multicast member list maintained by the SMF is shown in Table 4. If the fourth report message is a message that the terminal device $UE_{21}$ requests to terminate the program 1, and the access network $RAN_2$ serves $UE_{21}$, the SMF sets the "Valid or not" column in the information entry that is of the terminal device $UE_{21}$, that is in the network-level multicast member list, and that is corresponding to the address of the program 1 to 0, to indicate that the information in this row is invalid.

In one embodiment, if the SMF updates the network-level multicast member list based on the fourth report message, the SMF needs to send a network-level multicast member notification message to the UPF, so that the UPF learns that the first terminal device should be removed from the members corresponding to the first multicast service. Therefore, when receiving the data packet of the first multicast service, the UPF no longer sends the data packet to the first terminal device. The network-level multicast member notification message may include an updated network-level multicast member list, or all valid information entries corresponding to the first multicast service in the updated network-level multicast member list, or indication information used to indicate the removed first terminal device and an information entry corresponding to the first multicast service.

Operation 219: The SMF determines whether there is still a member of the first multicast service in a network served by the SMF.

That the SMF determines whether there is still a member of the first multicast service in a network served by the SMF includes: For example, the SMF reads the address of the first multicast service in the fourth report message, and checks the updated network-level multicast member list. If there is no valid information entry related to the first multicast service in the network-level multicast member list, the SMF may consider that there is no member of the first multicast service.

In one embodiment, that the SMF may further send query information to determine whether there is still a member of the first multicast service in a terminal device served by the SMF includes: For example, the SMF sends an IGMP/MLD query message to query whether there is still a terminal device that needs to receive the first multicast service or a terminal device that needs to receive any multicast service in the network served by the SMF, where the query message may be sent by the SMF to the terminal device by using the AMF and the RAN device, or sent by the SMF to the terminal device by using the UPF and the RAN device. After receiving the query message, if there is a first multicast service requirement or another multicast service requirement, the terminal device sends a report packet indicating the service requirement to the SMF. For a sending process, refer to operation 202 to operation 204. The SMF may update, based on a received report packet that is sent by any terminal device and that indicates the first multicast service requirement or any multicast service requirement, the network-level multicast member list maintained by the SMF. If the SMF does not receive, within a specified period of time after sending the query information, a report message that any terminal device requests to receive the first multicast service, the SMF may consider that there is no member of the first multicast service in the network served by the SMF.

Operation 220: The SMF sends a second notification message to the UPF. The second notification message is used to instruct the UPF to disconnect the connection that is of the first multicast service and that is established to the network device.

For example, with reference to operation 219, the SMF determines whether there is still a member of the first multicast service in the network served by the SMF. If the SMF determines that there is no member of the first multicast service, the SMF sends the second notification message to the UPF, to instruct the UPF and the network device to remove the connection related to the first multicast service.

Operation 221: The UPF sends a second request message to the network device. The second request message is used by the UPF to request the network device to disconnect the connection related to the first multicast service.

For example, the UPF may send, to the network device by using a multicast management protocol such as IGMP/MLD or a multicast routing protocol such as PIM, a request message used to leave the first multicast service (for example, send the IGMP leave report) or leave the multicast routing tree corresponding to the first multicast service (for example, the UPF sends a prune request message for leaving the multicast routing tree). In the embodiments of the present application, the network device includes, for example, a multicast router in the data network, a query node, or a multicast server.

Operation 220 and operation 221 are optional steps, and are performed when a result of operation 219 is that the SMF determines that there is no member of the first multicast service in the terminal device served by the SMF.

Operation 218 to operation 221 are processes in which the SMF instructs, based on the fourth report message, the UPF to remove the multicast connection and maintain the network-level multicast member list.

Therefore, in this embodiment of this application, the SMF processes a report message of the terminal device, maintains the network-level multicast member list, and instructs the gateway device UPF to maintain the multicast connection to the network device. The UPF receives the data packet of the multicast service from the network device, replicates the data packet of the multicast service, and sends, in a unicast mode and according to the QoS rule configured by the SMF, the data packet of the multicast service to the terminal device by using the RAN device, so that the terminal device may obtain the multicast service by using a wireless network.

Figure 8A:
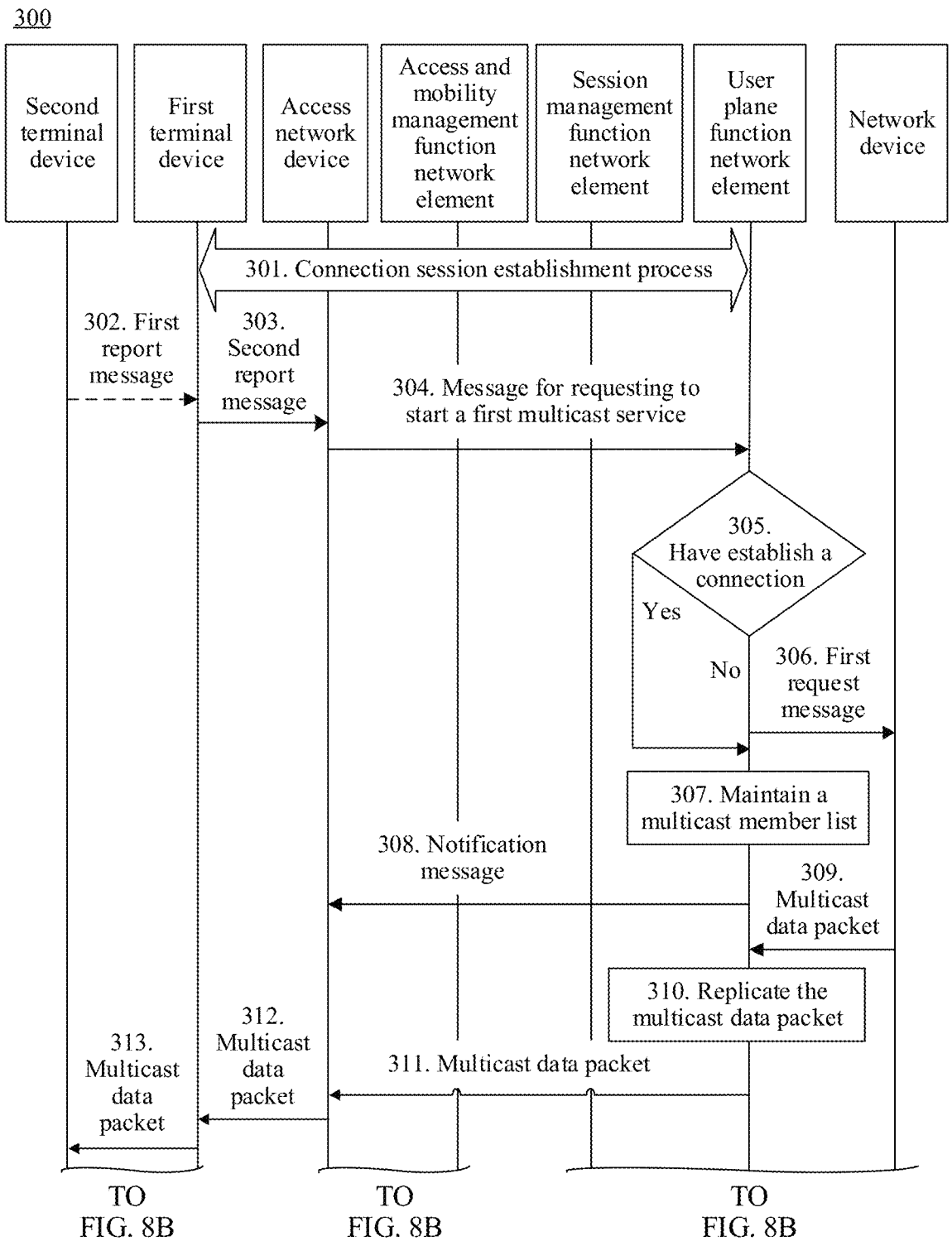
FIG. 8A and FIG. 8B are a schematic flowchart of a multicast service transmission method according to this application.
Figure 8B:
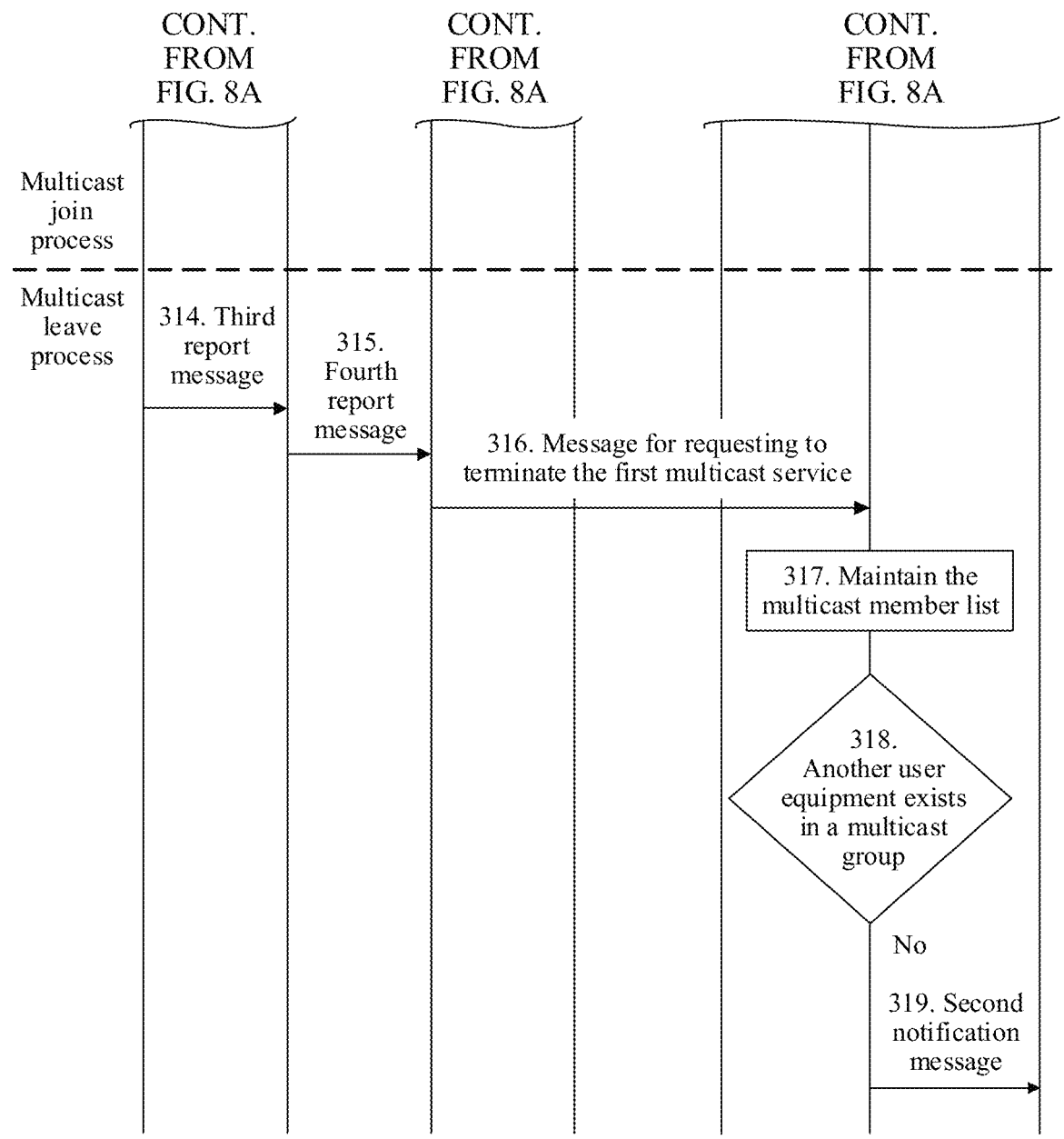

FIG. 8A and FIG. 8B are a schematic flowchart of a multicast service transmission method 300 in a 5G network architecture according to this application. In the method 300, a management device having a multicast service management function and a gateway device providing a transmission service for a multicast service of a terminal device are a same device, namely, a user plane function (UPF) module. As shown in FIG. 8A and FIG. 8B, the method 300 includes the following content.

Operation 301 to operation 303 are the same as operation 201 to operation 203 in the method 200. For understanding, refer to corresponding descriptions. Details are not described herein again.

Operation 304: The RAN device sends, to the management device (for example, the UPF in this embodiment of this application) having the multicast service management function, a message for requesting to receive the first multicast service.

In an optional manner, a process in which the RAN device sends, to the UPF, the message for requesting to receive the first multicast service includes: The RAN device receives the second report message sent by the first terminal device, and then directly sends the second report message to the UPF through an interface (for example, an N3 interface) between the RAN device and the UPF. For example, if the first terminal device sends the second report message to the RAN device by using a user plane data packet, the RAN device may directly send the user plane data packet including the second report message to the UPF through an N3 tunnel between the first terminal device and the UPF.

In another optional manner, a process in which the RAN device sends, to the UPF, the message for requesting to receive the first multicast service includes: The RAN device receives the second report message sent by the first terminal device, and then sends the second report message to the AMF through, for example, an N2 interface; and the AMF sends the second report message to the SMF through, for example, an N11 interface, and then the SMF sends the second report message to the UPF through, for example, an N4 interface. For example, when the first terminal device adds the second report message to a NAS message, the RAN device sends, to the SMF by using the AMF, the second report message carried in the NAS message, and then the SMF sends the second report message to the UPF through an N4 interface. For understanding of a manner in which the first terminal device adds the second report message to the NAS message, refer to related descriptions in operation 204 of the method 200.

It should be understood that when the UPF has the multicast service management function, the UPF may identify that the second report message is a message that the first terminal device requests to receive the first multicast service. For example, the UPF reads a source IP address and a destination IP address of the second report message, where the source address is an IP address of the first terminal device, and the destination IP address is an address of the first multicast service. In this case, the UPF may determine that the second report message is an IGMP report message— an IGMP join report, that is sent by the first terminal device and used to request to receive the first multicast service.

In one embodiment, the RAN device has a multicast service management capability. In one embodiment, the RAN device may maintain a cell-level multicast member list based on the received second report message (for example, the RAN device is configured with an IGMP proxy or IGMP snooping function, and may read the IGMP join report or IGMP leave report sent by the first terminal device, and maintain the cell-level multicast member list). The cell-level multicast member list includes an identifier of the first multicast service and/or an identifier corresponding to a terminal device (including the first terminal device) that requests the first multicast service and that is served by the RAN device, and optionally further includes the identifier of the second terminal device.

For a process in which the RAN device has the multicast service management capability, refer to a process of operation 204 in the method 200, and refer to corresponding descriptions for understanding. Details are not described herein again.

Operation 305: The UPF receives the second report message, and determines whether a connection related to the first multicast service has been established to the network device.

This includes: The UPF reads an address of the first multicast service and an identifier of the first terminal device that are in the second report message, and determines whether the UPF that provides the transmission service for the first multicast service of the first terminal device has established the connection related to the first multicast service to the network device.

In one embodiment, the UPF that provides the service for the first multicast service of the first terminal device and the UPF that receives the second report message are a same UPF or different UPFs. If the two UPFs are different UPFs, the two UPFs may exchange, through an N9 interface, corresponding response information and indication information used to instruct the UPF to establish or remove the connection related to the first multicast service to the network device. For brevity, in this embodiment of this application, an example in which the two UPFs are a same UPF is mainly used for description.

In a possible example, the UPF may check a network-level multicast member list maintained by the UPF. If the network-level multicast member list includes at least one valid information entry related to the first multicast service, the UPF may consider that the UPF has established the connection related to the first multicast service to the network device; otherwise, the UPF may consider that the UPF has not established the connection related to the first multicast service to the network device. For the network-level multicast member list and content of the valid information entry related to the first multicast service in the network-level multicast member list, refer to descriptions in operation 307.

Operation 306: The UPF sends a first request message to the network device. The first request message is used by the UPF to establish a connection related to the first multicast service to the network device.

For example, the UPF may send, to the network device by using a multicast management protocol such as IGMP/MLD or a multicast routing protocol such as PIM, a request message used to join the first multicast service (for example, send the IGMP join report) or used to join a multicast routing tree corresponding to the first multicast service (for example, send a graft request message for joining the multicast routing tree).

Operation 306 is an optional operation, and is performed when the UPF determines in operation 305 that the connection related to the first multicast has not been established to the network device.

Operation 307: The UPF maintains a network-level multicast member list.

The network-level multicast member list maintained by the UPF includes an identifier corresponding to each multicast service, and further includes an information entry related to a terminal device that needs to receive the multicast service, where the information entry corresponds to the multicast service. The terminal device that needs to receive the multicast service, for example, the first terminal device, is considered as one of a member of the multicast service. The information entry includes an identifier corresponding to the terminal device serving as the member of the multicast service. For understanding of the identifier, refer to the "identifier corresponding to the first terminal device" described in operation 203.

The network-level multicast member list maintained by the UPF may include: For example, the UPF reads the identifier of the first multicast service in the second report message and the identifier corresponding to the first terminal device, and optionally, the UPF may further read the identifier of the second terminal device in the second report message. If there is already a valid information entry corresponding to both the first terminal device and the first multicast service in the network-level multicast member list maintained by the UPF, the UPF may not need to update the network-level multicast member list. Otherwise, the UPF updates the network-level multicast member list. In one embodiment, the UPF adds the information entry corresponding to both the first terminal device and the first multicast service to the network-level multicast member list, or validates the information entry corresponding to both the first terminal device and the first multicast service. The information entry corresponding to both the first terminal device and the first multicast service includes the identifier corresponding to the first multicast service, and/or the identifier corresponding to the first terminal device, and optionally, further includes the identifier of the second terminal device.

For example, for understanding of a form of the network-level multicast member list maintained by the UPF, refer to Table 3, Table 4, and corresponding descriptions in operation 208 of the method 200. Details are not described again.

Operation 305 to operation 307 are processes in which the UPF establishes the multicast connection based on the second report message and maintains the network-level multicast member list.

In one embodiment, when receiving the second report message, the UPF may first maintain the network-level multicast member list. For details of a process of maintaining the network-level multicast member list by the UPF, refer to operation 307. After maintaining the network-level multicast member list, the UPF determines, based on the second report message, whether the UPF that provides the transmission service for the first multicast service of the first terminal device has established the connection related to the first multicast service to the network device. For this process, refer to operation 305. If the UPF determines that the UPF has not established the connection related to the first multicast service to the network device, the UPF sends the first request message to the network device, where the first request message is used by the UPF to request to establish the connection related to the first multicast service to the network device. For this process, refer to operation 306. In other words, operation 307 may be performed before steps 305 and 306. Whether the UPF first maintains the network-level multicast member list or first determines whether the UPF that provides the transmission service for the first multicast service of the first terminal device has established the connection related to the first multicast service to the network device is not limited in this application.

Operation 308: The UPF sends a notification message to the RAN device.

In one embodiment, the notification message includes a cell-level multicast member notification message. The cell-level multicast member notification message includes the identifier of the first multicast service and/or identifiers corresponding to all terminal devices that are served by the RAN device and that are in members of the first multicast service. Alternatively, the cell-level multicast member notification message includes indication information used to instruct to add the first terminal device to a member of the first multicast service, where the first terminal device is served by the RAN device.

In one embodiment, the UPF may directly send the notification message to the RAN device, or the UPF first sends the notification message to the SMF, and then the SMF sends the notification message to the RAN device by using the AMF.

In one embodiment, the UPF determines that a send mode of the data packet of the first multicast service between the gateway device and the RAN device is unicast or multicast (a unicast mode in this embodiment), and the UPF further sends second configuration information to the RAN device, where the second configuration information includes first indication information used to instruct the UPF to send the data packet of the first multicast service to the RAN device. In a possible manner, the notification message sent by the SMF to the RAN device includes the second configuration information.

In a possible manner, the first indication information is implicitly included a message sent by the UPF to the SMF, so that first indication information is included in the message sent by the SMF to the RAN device. For example, in the process of establishing a PDU session supporting the multicast service between the first terminal device and a network, if the message sent by the SMF to the RAN device by using the AMF includes a specific transmission tunnel identifier of the first terminal device, it indicates that the send mode of the data packet of the first multicast service between the UPF and the RAN device is unicast. Alternatively, if the message sent by the SMF to the RAN device by using the AMF includes a multicast transmission tunnel identifier, it indicates that the send mode of the data packet of the first multicast service between the UPF and the RAN device is multicast.

Operation 308 is an optional operation, and needs to be performed in some cases. For example, when the data packet of the multicast service is sent between the UPF and the RAN device in a multicast mode, and the RAN device does not have the multicast service management capability described in operation 304, operation 308 needs to be performed. Operation 308 may not be performed when the data packet of the multicast service is sent between the UPF and the RAN device (or the terminal device) in a unicast mode or when the RAN device has the multicast service management capability described in operation 304.

Operation 309: The network device sends a data packet of the first multicast service to the UPF.

Operation 310: The UPF receives the data packet that is of the first multicast service and that is sent by the network device, and replicates the data packet of the first multicast service.

In a possible manner, that the UPF replicates the data packet of the first multicast service includes: The UPF queries the network-level multicast member list to learn of terminal devices that are under the UPF and that are members of the first multicast service, and then replicates the data packet based on a quantity of the members of the first multicast. In one embodiment, the UPF may further add an identifier corresponding to the terminal device and/or information related to QoS guarantee to a replicated data packet. For example, network-level multicast member information maintained by the UPF is shown in Table 3. The first multicast service corresponds to a program 1, and members of the first multicast service include $UE_{11}$, $UE_{12}$, and $UE_{21}$. After receiving a data packet of the program 1, the UPF needs to replicate three copies of the data packet based on the network-level multicast member list, and send replicated data packets to $UE_{11}$, $UE_{12}$, and $UE_{21}$ respectively. In one embodiment, the UPF may add, to the replicated data packet, one or more of the following information: an identifier (for example, a qos flow identity, QFI) of a QoS flow to which the data packet of the first multicast service is mapped, an N3 tunnel identifier corresponding to the PDU session of the terminal device, and the like.

For understanding of operation 311 to operation 315, refer to descriptions of operation 212 to operation 216 in the method 200. Details are not described again in this embodiment.

Operation 316: The RAN device sends, to the management device (for example, the UPF in this embodiment) having the multicast service management function, a message for requesting to terminate the first multicast service.

In an optional manner, that the RAN device sends, to the UPF, a message for requesting to terminate the first multicast service includes: The RAN device receives the fourth report message sent by the first terminal device, and then directly forwards the fourth report message to the UPF through an interface (for example, an N3 interface) between the RAN device and the UPF. For example, if the first terminal device sends the fourth report message to the RAN device by using a user plane data packet, the RAN device may directly send the user plane data packet including the fourth report message to the UPF through an N3 tunnel between the first terminal device and the UPF.

In another optional manner, that the RAN device sends, to the UPF, a message for requesting to terminate the first multicast service includes: The RAN device receives the fourth report message sent by the first terminal device, and then sends the fourth report message to the AMF through, for example, an N2 interface; and the AMF sends the fourth report message to the SMF through, for example, an N11 interface, and then the SMF sends the fourth report message to the UPF through, for example, an N4 interface. For example, when the first terminal device adds the fourth report message to a NAS message, the RAN device sends, to the SMF by using the AMF, the fourth report message carried in the NAS message, and then the SMF sends the fourth report message to the UPF by using an N4 interface message. For understanding of a manner in which the first terminal device adds the fourth report message to the NAS message, refer to related descriptions in operation 217 of the method 200.

It should be understood that, when the UPF has the multicast service management function, the UPF may identify the fourth report message as a message that the first terminal device requests to terminate the first multicast service. For example, the UPF reads a source IP address and a destination IP address of the fourth report message, and/or content of an IGMP packet. The source address is the IP address of the first terminal device, and the destination IP address is 224.0.0.2 (a special group address, indicating all multicast routers in a network segment), an IGMP type field is displayed as a "leave group message" type, and an IGMP group address field is the address of the first multicast service. In this case, the UPF may determine that the fourth report message is an IGMP report packet—an IGMP leave report, that the first terminal device requests to exit the first multicast service. Alternatively, the UPF reads a source IP address and a destination IP address of the fourth report message. The source address is the IP address of the first terminal device, and the destination IP address is 224.0.0.2. In this case, the UPF may determine that the fourth report message is an IGMP report packet—an IGMP leave report, that the first terminal device requests to exit the first multicast service.

Operation 317: The UPF maintains the network-level multicast member list based on the fourth report message.

For understanding of content included in the network-level multicast member list maintained by the UPF, refer to descriptions in operation 307.

That the UPF maintains the network-level multicast member list based on the fourth report message may include: For example, the UPF reads the identifier of first multicast service and the identifier corresponding to the first terminal device that are included in the fourth report message, and the UPF may further read the identifier of the second terminal device in the fourth report message; and the UPF updates the network-level multicast member list, that is, deletes an information entry corresponding to both the first terminal device and the first multicast service from the network-level multicast member list, or invalidates an information entry corresponding to both the first terminal device and the first multicast service. The information entry corresponding to both the first terminal device and the first multicast service includes the identifier corresponding to the first multicast service, and/or the identifier corresponding to the first terminal device, and optionally, further includes the identifier of the second terminal device.

For example, the network-level multicast member list maintained by the UPF is shown in Table 3. If the fourth report message is a message that the terminal device $UE_{21}$ requests to terminate the program 1, the UPF deletes, from the network-level multicast member list, an information entry that is of the terminal device $UE_{21}$ and that is corresponding to the address of the program 1. The information entry includes an identifier of an access network device $RAN_2$. Alternatively, the network-level multicast member list maintained by the UPF is shown in Table 4. If the fourth report message is a message that the terminal device $UE_{21}$ requests to terminate the program 1, and an access network $RAN_2$ serves $UE_{21}$, the UPF sets the "Valid or not" column in the information entry that is of the terminal device $UE_{21}$, that is in the network-level multicast member list, and that is corresponding to the address of the program 1 to 0, to indicate that the information in this row is invalid.

In one embodiment, when the data packet of the multicast service is sent between the UPF and the RAN device in a multicast mode, and the RAN device does not have the multicast service management capability described in operation 304, if the UPF updates the network-level multicast member list, the UPF sends a cell-level multicast member notification message to the RAN device, so that the RAN device learns that the first terminal device should be removed from a member corresponding to the first multicast service. After receiving the data packet of the first multicast service, the RAN device no longer sends the data packet to the first terminal device. The cell-level multicast member notification message includes the identifier of the first multicast service and/or identifiers corresponding to all terminal devices that are served by the RAN device and that are in members of the first multicast service. Alternatively, the cell-level multicast member notification message includes indication information used to instruct to remove the first terminal device from the member of the first multicast service, where the first terminal device is served by the RAN device. The cell-level multicast member notification message may be directly sent by the UPF to the RAN device, or sent by the UPF to the SMF, and then sent by the SMF to the RAN device by using the AMF.

Operation 318: The UPF determines whether there is still a member of the first multicast service in a network served by the UPF.

That the UPF determines whether there is still a member of the first multicast service in a network served by the UPF includes: For example, the UPF reads the address of the first multicast service in the fourth report message, and checks an updated network-level multicast member list. If there is no valid information entry related to the first multicast service in the network-level multicast member list, the UPF may consider that there is no member of the first multicast service. In one embodiment, the UPF may further send query information to determine whether there is still a member of the first multicast service in the terminal device served by the UPF. This includes: For example, the UPF sends an IGMP/MLD query message to query, in the network served by the UPF, whether there is still a terminal device that needs to receive the first multicast service or a terminal device that needs to receive any multicast service. The query message may be sent by the UPF to the terminal device by using the RAN device, or sent by the UPF to the SMF and then sent to the terminal device by using the AMF and the RAN device. After receiving the query message, if the terminal device has a first multicast service requirement or another multicast service requirement, the terminal device returns a report packet indicating the service requirement to the UPF. In one embodiment, refer to operation 302 to operation 304. The UPF may update, based on the received report packet that is sent by any terminal device and that indicates the first multicast service requirement or any multicast service requirement, the network-level multicast member list maintained by the UPF. If the UPF does not receive, within a specified period of time after sending the query information, a report message that any terminal device requests to receive the first multicast service, the UPF may consider that there is no member of the first multicast service in the network served by the UPF.

Operation 319: The UPF sends a second request message to the network device. The second request message is used by the UPF to request the network device to disconnect the connection related to the first multicast.

For example, the UPF may send, to the network device by using a multicast management protocol such as IGMP/MLD or a multicast routing protocol such as PIM, a request message used to leave the first multicast service (for example, send the IGMP leave report) or leave the multicast routing tree corresponding to the first multicast service (for example, the UPF sends a prune request message for leaving the multicast routing tree). In the embodiments of the present application, the network device includes, for example, a multicast router in the data network, a query node, or a multicast server.

Operation 319 is an optional operation, and is performed when a result of operation 318 is that the UPF determines that there is no member of the first multicast service in the terminal devices served by the UPF.

Operation 317 to operation 319 are processes in which the UPF maintains the network-level multicast member list based on the fourth report message and removes the connection related to the first multicast service.

It should be understood that a difference between the method 300 and the method 200 lies in that in the method 200, a management device performing multicast service management is the SMF, but in the method 300, a management device performing multicast service management is the UPF.

Therefore, in this embodiment of this application, the UPF processes a report message of the terminal device, maintains the network-level multicast member list, and maintains the multicast connection to the network device. The UPF receives the data packet of the multicast service from the network device, replicates the data packet of the multicast service, and sends, in a unicast mode and according to a QoS rule configured by the SMF, the data packet of the multicast service to the terminal device by using the RAN device, so that the terminal device may obtain the multicast service by using a wireless network.

In this embodiment of this application, if the gateway device and the access network device send the data packet of the multicast service in a multicast manner, the gateway device and the access network device need to establish a first channel, where the first channel is used to transmit the data packet of the multicast service. The following describes in detail the establishment of the first channel between the gateway device and the access network device.

Figure 9A:
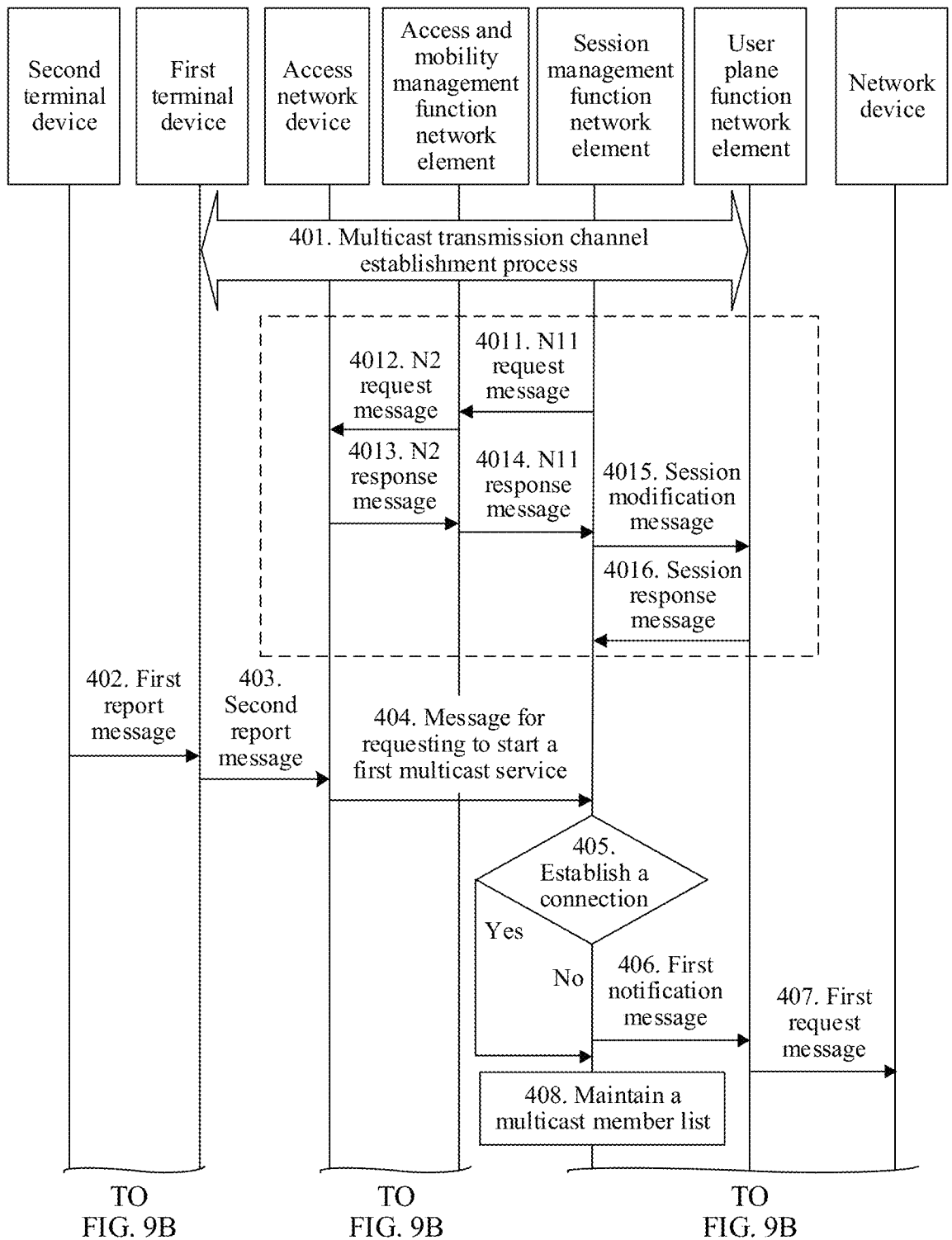
FIG. 9A and FIG. 9B are a schematic flowchart of a multicast service transmission method according to this application.
Figure 9B:
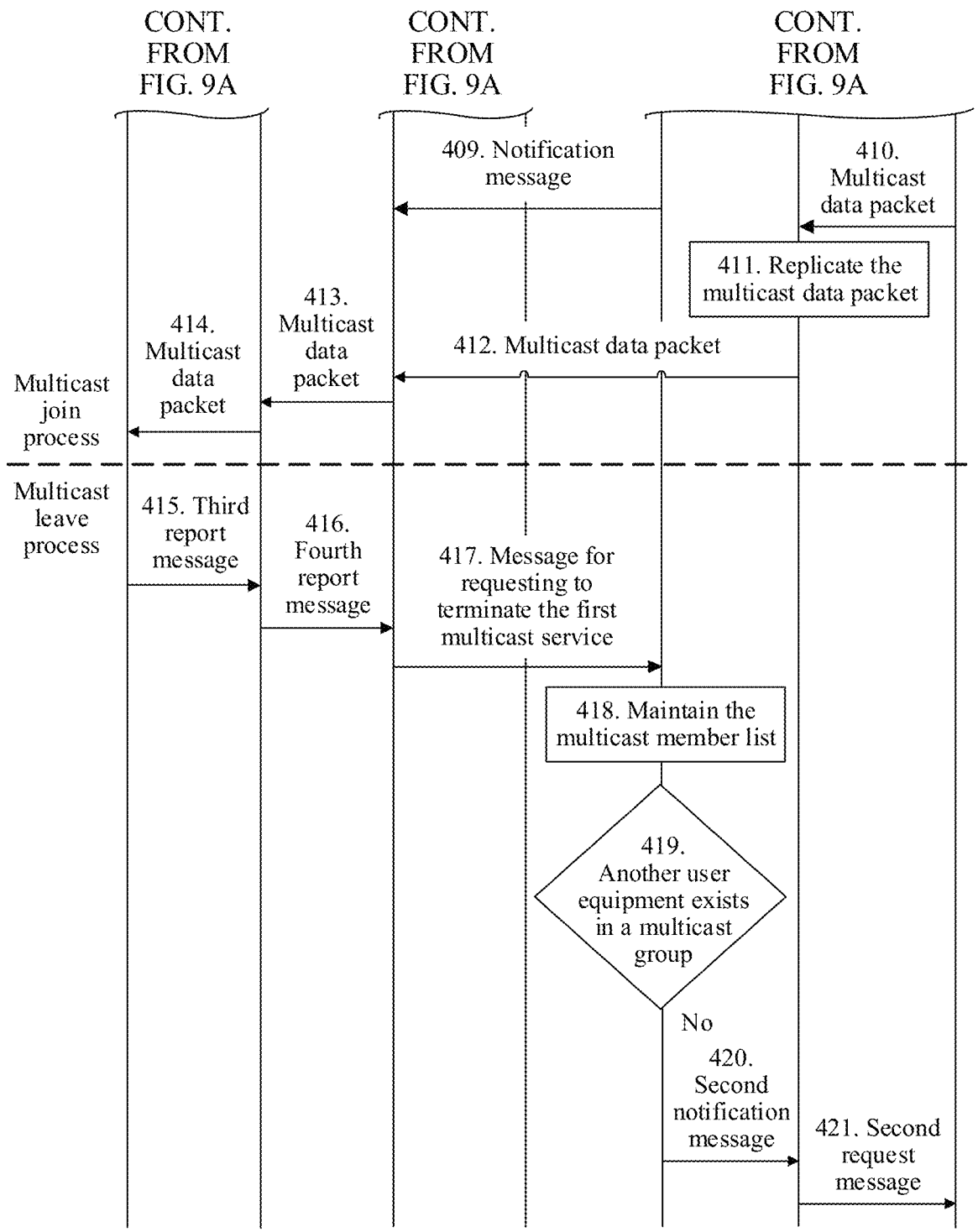

FIG. 9A and FIG. 9B are a schematic flowchart of a multicast service transmission method 400 in a 5G network architecture according to this application. In the method 400, a management device having a multicast service management function is an SMF, and a gateway device is a UPF. A data packet of a multicast service is sent between the UPF and a RAN device in a multicast mode. As shown in FIG. 9A and FIG. 9B, the method 400 includes the following content.

Operation 401: A management device (for example, an SMF/PGW/MBMS GW that supports multicast) that performs multicast session management receives a message used for triggering establishment of a multicast transmission channel, and then triggers a process of establishing the multicast transmission channel.

The multicast transmission channel means a channel (for example, a GTP-U tunnel for sending the data packet of the multicast service) that is between the gateway device and the RAN device and that is used to send the data packet of the multicast service. For example, in the 5G architecture, the gateway device is the UPF, the RAN device is a gNB, and a multicast N3 tunnel is established between the UPF and the gNB. Alternatively, in a 4G architecture, the gateway device is a PGW, the RAN device is an eNB, and a multicast S1 tunnel is established between the PGW and the eNB. Alternatively, in an MBMS architecture, the gateway device is an MBMS GW, the RAN device is an eNB, and a multicast M1 tunnel is established between the MBMS GW and the eNB.

A mode for triggering the management device that performs multicast session management to start the process of establishing the multicast transmission channel includes but is not limited to the following three modes.

In a first mode, this process is triggered by a multicast service request of a terminal device. In this case, a message for triggering establishment of the multicast transmission channel may be, for example, a report message (for example, an IGMP join report) that is sent by the terminal device based on a multicast management protocol (such as an IGMP/MLD protocol) and that is used to request to receive a first multicast service. For example, the SMF receives an IGMP join report that is sent by a first terminal device and that is used to request to receive the first multicast service, selects a UPF (multicast UPF, M-UPF) supporting multicast, and triggers establishment of a multicast N3 tunnel between the UPF and a RAN device serving the first terminal device. The IGMP join report may be sent by the first terminal device to the SMF by using the RAN device and the UPF, or may be sent by the first terminal device to the SMF by using the RAN device and an AMF. Alternatively, the message for triggering establishment of the multicast transmission channel may be, for example, a session establishment/modification request message sent by the terminal device, where the session establishment/modification request message includes multicast service indication information. For example, a session establishment/modification request message sent by a first terminal device to an AMF by using a RAN device includes multicast service indication information, indicating that the first terminal device has a multicast service requirement. The AMF sends the session establishment/modification request message of the first terminal device to an SMF. The SMF selects, based on the multicast service indication information in the request message, a UPF supporting multicast, and triggers establishment of a multicast N3 tunnel between the UPF and the RAN device serving the first terminal device. In one embodiment, the SMF may further refer to information such as an access point name APN/DNN and UE location when selecting the UPF.

In a second mode, this process is triggered by a network service configuration. In this case, in a mobile network, a multicast transmission channel needs to be pre-established based on service configuration planning, and a message for triggering establishment of the multicast transmission channel may be sent by a service management platform (for example, a BM-SC) in the mobile network to a management device (for example, an SMF/PGW/MBMS GW) that performs multicast session management, to trigger the process of starting establishment of the multicast transmission channel.

In a third mode, this process is triggered by a multicast service platform. In this case, a multicast service request of a terminal device is sent to the multicast service platform (for example, a service request sent by using an application layer protocol is invisible to a gateway device and a RAN device that are in a mobile network). The multicast service platform is located in the mobile network (for example, the multicast service platform is a BM-SC) or is outside the scope of the mobile network (for example, in a data network). The multicast service platform may send a message for requesting transmission of a multicast service to a device in the mobile network (for example, a service management device BM-SC/PCRF in the mobile network), and then the service management device in the mobile network sends, to a management device (for example, an SMF/PGW/MBMS GW) that performs multicast session management, the message for triggering establishment of the multicast transmission channel, to trigger the process of starting establishment of the multicast transmission channel.

The following steps 4011 to 4016 are the process that is of establishing the multicast transmission channel and is described by using the 5G network architecture as an example.

Operation 4011: The SMF sends, to an AMF, an N11 request message used for establishing the multicast transmission channel, where the request message includes configuration information of the multicast transmission channel, and the configuration information of the multicast transmission channel includes one or more of the following content: a multicast tunnel endpoint identity (M-TEID), a QoS parameter configuration corresponding to a multicast tunnel (including, for example, a QFI corresponding to the multicast service, and/or a corresponding 5G QoS identifier (5QI), an allocation and retention priority (ARP), a parameter such as a guaranteed flow bit rate (GFBR), an identifier corresponding to the multicast service, a multicast source address, a multicast bearer identifier, and the like.

In a possible manner, the M-TEID corresponds to one multicast service. In other words, different multicast services correspond to different multicast transmission channels. In another possible manner, the M-TEID is corresponding to a plurality of multicast services. When data packets of the multicast services are transmitted between the UPF and the RAN device, different multicast services multiplex a same multicast transmission channel.

In one embodiment, when receiving data packets of a same multicast service from one UPF, a plurality of RAN devices may use a same M-TEID. In other words, different RAN devices are configured with a same M-TEID, or different RAN devices may be configured with different M-TEIDs respectively.

Operation 4012: The AMF receives an N2 request message used for establishing the multicast transmission channel, stores information about the multicast transmission channel included in the N2 request message, and forwards, to the RAN device, the request message used for establishing the multicast transmission channel.

Operation 4013: The RAN device receives the request message used for establishing the multicast transmission channel, and returns a multicast channel acknowledgment response message or a multicast channel rejection response message to the AMF.

If the RAN device accepts the configuration information of the multicast transmission channel included in the request message, and completes configuration of the multicast transmission channel based on the configuration information, the RAN device returns the multicast channel acknowledgment response message to the AMF, to indicate to a core network device that the configuration of the multicast transmission channel of the RAN device is completed. Otherwise, the RAN device returns the multicast channel rejection response message to the AMF, to indicate to the core network device that the RAN device cannot establish the multicast transmission channel based on the configuration information of the multicast transmission channel.

In one embodiment, the RAN device may describe, in the multicast channel rejection response message, a reason why the multicast transmission channel cannot be established, for example, an M-TEID conflicts with another unicast TEID configured by the RAN device.

Operation 4014: The AMF receives the multicast channel acknowledgment response message or the multicast channel rejection response message sent by the RAN device, and forwards the multicast channel acknowledgment response message or the multicast channel rejection response message to the SMF.

Operation 4015: After the SMF receives the multicast channel acknowledgment response message, the SMF sends a session modification request to the UPF. The session modification request includes the configuration information of the multicast transmission channel. For understanding of descriptions of the configuration information of the multicast transmission channel, refer to corresponding content in operation 4011. Alternatively, the SMF receives the multicast channel rejection response message.

In an optional solution, the multicast channel fails to be established, and a procedure ends. The UPF sends the data packet of the multicast service to the terminal device in a unicast mode. For details, refer to descriptions of the method 200 or the method 300.

In another optional solution, the SMF receives the multicast channel rejection response message, and the SMF views the reason why the RAN device cannot establish the multicast transmission channel, modifies the configuration information of the multicast transmission channel, and then performs operation 4011 again.

Operation 4016: The UPF receives the session modification request sent by the SMF, stores the configuration information of the multicast transmission channel in the session modification request, completes configuration of the multicast transmission channel, and then returns a session modification response message to the SMF, to acknowledge that establishment of the multicast transmission channel is completed.

It should be noted that, in a possible manner, before operation 401, the first terminal device has established a PDU session supporting the multicast service with the mobile network, but does not support a multicast send mode between a network device and the RAN device. Alternatively, in another possible manner, operation 401 is performed in a process of establishing, by the first terminal device, a PDU session supporting multicast with the mobile network. Alternatively, in another possible manner, operation 401 is performed before the first terminal device establishes a PDU session supporting the multicast service with the mobile network. For a process in which the first terminal device establishes the PDU session supporting the multicast service with the mobile network, refer to descriptions of operation 201 in the method 200.

Operation 402: A second terminal device sends a first report message to a first terminal device. The first report message is a message that the second terminal device requests to receive a first multicast service, and the first report message includes an identifier corresponding to the first multicast service. For a description of operation 402, refer to the description of operation 202 in the method 200.

In one embodiment, the identifier corresponding to the first multicast service may be an IP address of the first multicast service, or may be indication information that is agreed in a communications system and that indicates the first multicast service, or may be an identifier of an established transmission channel of the first multicast. For example, a first multicast transmission channel is used as an identifier of the first multicast service. It should be understood that the identifier corresponding to the first multicast service is not limited in this application, and the identifier corresponding to the first multicast service may alternatively be other information.

Operation 402 is an optional operation. When the second terminal device needs to start the multicast service, operation 402 is performed.

In one embodiment, operation 402 may alternatively be performed before operation 401. The first report message sent by the second terminal device to the first terminal device may be considered as a multicast service session connection indication by the first terminal device, and is used as a trigger condition for the first terminal device to send a session establishment/modification request message to the AMF by using the RAN device in operation 401.

For understanding of operation 403 and operation 404, refer to descriptions of operation 203 and operation 204 in the method 200. Details are not described again.

In an optional manner, operation 402 to operation 404 may be performed before operation 401. That the SMF receives a message that is sent by the RAN device in operation 404 and that is used for the first terminal device to request to receive the first multicast service message, and triggers the process of starting establishment of the multicast transmission channel corresponds to the first of the three triggering modes described in operation 401. In other words, the multicast service request of the terminal device triggers the management device that performs multicast session management to start the process of establishing the multicast transmission channel.

For understanding of operation 405 to operation 407, refer to descriptions of operation 205 to operation 207 in the method 200. Details are not described again.

Operation 408: The SMF maintains a network-level multicast member list.

For understanding of operation 408, refer to the description of operation 208 in the method 200. In one embodiment, the SMF determines a send mode of a data packet of the first multicast service between the gateway device and the RAN device. In addition to sending a network-level multicast member notification message to the UPF, the SMF further sends first configuration information to the UPF. The first configuration information includes indication information used to indicate a send mode of the data packet of the first multicast service between the gateway device and the RAN device. A mode in which the SMF sends the first configuration information to the UPF includes: In a possible manner, the SMF adds the first configuration information to the network-level multicast member notification message, and sends the network-level multicast member notification message to the UPF. In another possible manner, the first configuration information and the network-level multicast member notification message are sent by the SMF to the UPF together. In still another possible manner, the first configuration information and the network-level multicast member notification message are separately sent by the SMF to the UPF.

In one embodiment, the SMF may first maintain the network-level multicast member list, and then instruct the UPF to establish a connection related to the first multicast service to the network device. In other words, operation 408 is performed before operation 405, or operation 408 is performed before operation 406.

Operation 409: The SMF sends a notification message to the RAN device.

In one embodiment, the notification message includes a cell-level multicast member notification message. The cell-level multicast member notification message includes the identifier of the first multicast service and/or identifiers corresponding to all terminal devices that are served by the RAN device and that are in members of the first multicast service. Alternatively, the cell-level multicast member notification message includes indication information used to instruct to add the first terminal device to a member of the first multicast service, where the first terminal device is served by the RAN device. The RAN device maintains a cell-level multicast member list based on the cell-level multicast member notification message. For understanding of a form and content of the cell-level multicast member list, refer to corresponding descriptions in operation 404. If the RAN device has the multicast service management capability described in operation 404, the SMF may not need to send the cell-level multicast member notification message to the RAN device. This reduces signaling overheads and saves radio resources.

In one embodiment, the SMF determines a send mode of the data packet of the first multicast service between the gateway device and the RAN device, and/or a send mode of the data packet of the multicast service between the RAN device and the terminal device. The SMF further sends second configuration information to the RAN device. The second configuration information includes first indication information used to indicate a mode in which the UPF sends the data packet of the first multicast service to the RAN device, and/or second indication information used to indicate a mode in which the RAN device sends the data packet of the first multicast service to the terminal device. In a possible manner, the notification message sent by the SMF to the RAN device includes the second configuration information.

In a possible example, the SMF may send the notification message to the RAN device by using the AMF. Alternatively, in another possible example, the SMF sends the notification message to the RAN device by using the UPF.

Operation 410: The network device sends a data packet of the first multicast service to the UPF.

Operation 411: The UPF receives the data packet that is of the first multicast service and that is sent by the network device, and replicates the data packet of the first multicast service.

That the UPF replicates the data packet of the first multicast service includes: The UPF learns, based on the network-level multicast member notification message sent by the SMF, of terminal devices that are served by the UPF and that are members of the first multicast service, and/or information about RAN devices that serve the terminal devices, and then, the UPF replicates the data packet based on a quantity of the RAN devices that serve the members of the first multicast. In one embodiment, the UPF may add, to a replicated data packet, one or more of the following information: information related to QoS guarantee, an identifier corresponding to the RAN device, the identifier corresponding to the first multicast service, and the like. For example, multicast member information maintained by the SMF is shown in Table 3. The first multicast service corresponds to a program 1, and the members of the first multicast service include $UE_{11}$, $UE_{12}$, and $UE_{21}$. A RAN device that serves $UE_{11}$ and $UE_{12}$ is $RAN_1$, and a RAN device that serves $UE_{21}$ is $RAN_2$. After receiving a data packet of the program 1, the UPF needs to replicate two copies of the data packet based on the network-level multicast member notification message sent by the SMF, and sends replicated data packets to $RAN_1$ and $RAN_2$ respectively. In one embodiment, the UPF may add, to the replicated data packet, one or more of the following information: an identifier (QoS flow identity, QFI) of a QoS flow to which the data packet of the first multicast service is mapped, an identifier of a multicast tunnel between the UPF and the RAN device (for example, an identifier M-TEID of a multicast transmission tunnel that is between the UPF and the RAN device and that corresponds to the multicast service), and the identifier corresponding to the first multicast service (for example, an identifier M-TEID 1 of the multicast transmission tunnel that is between the UPF and the RAN device and that corresponds to the first multicast service, or another identifier that can be uniquely mapped to the first multicast service).

Operation 412: The UPF sends the data packet of the first multicast service to the RAN device.

The UPF maps the replicated data packet of the first multicast service to a proper QoS flow based on a QoS-related configuration (for example, a multicast service flow template multicast SDF template) provided by the SMF, and sends the data packet to the RAN device. The RAN device serves the first terminal device, and the first terminal device is one of the members of the first multicast service.

Operation 413: The RAN device receives the data packet that is of the first multicast service and that is sent by the UPF, and sends the data packet of the first multicast service to the first terminal device.

In an optional manner, the data packet that is of the first multicast service and that is received by the RAN device carries the identifier corresponding to the first multicast service. The RAN device determines, based on the identifier, that the data packet is the data packet of the first multicast service, and learns, based on the cell-level multicast member list maintained by the RAN device, of terminal devices that are served by the RAN device and that are members of the first multicast service. If the second configuration information sent by the SMF to the RAN device in operation 409 includes second indication information used to indicate the send mode of the data packet of the first multicast service between the RAN device and the terminal device, the RAN device may determine, based on the second indication information, that a send mode of the data packet of the first multicast service through an air interface is unicast or multicast. Alternatively, the RAN device determines, based on information (for example, a quantity of terminal devices requesting the first multicast service, and/or quality information of links between the terminal devices and the RAN device) included in the cell-level multicast member list maintained by the RAN device, that a send mode of the data packet of the first multicast service through an air interface is unicast or multicast.

If the RAN device determines to send the data packet of the first multicast service to the terminal device through an air interface in a unicast mode, the RAN device replicates a plurality of copies of the received data packet of the first multicast service (for example, the RAN device performs replication based on a quantity of the members of the first multicast service in the terminal devices served by the RAN device), and then sends replicated data packets respectively to the terminal devices (including the first terminal device) serving as the members of the first multicast service; or, if the RAN device determines to send the data packet of the first multicast service to the terminal device through an air interface in a multicast mode, the RAN device may configure a uniform air interface scheduling identifier for these terminal devices, where the uniform air interface scheduling identifier corresponds to the first multicast service, and the RAN device sends, by using the uniform air interface scheduling identifier, the data packet of the first multicast service to the terminal devices (including the first terminal device) serving as the members of the first multicast service.

Operation 414 to operation 417 are the same as operation 214 to operation 217 in the method 200. For understanding, refer to corresponding descriptions. Details are not described herein again.

Operation 418: The SMF maintains the network-level multicast member list based on the fourth report message.

For understanding of the network-level multicast member list maintained by the SMF, refer to descriptions in operation 208 of the method 200.

A process that the SMF maintains the network-level multicast member list based on the fourth report message includes: For example, the SMF reads the identifier of first multicast service and the identifier corresponding to the first terminal device that are included in the fourth report message, where the fourth report message optionally further includes the identifier of the second terminal device; and the SMF updates the network-level multicast member list, that is, deletes an information entry corresponding to both the first terminal device and the first multicast service from the network-level multicast member list, or invalidates an information entry corresponding to both the first terminal device and the first multicast service. The information entry corresponding to both the first terminal device and the first multicast service includes the identifier corresponding to the first multicast service, and/or the identifier corresponding to the first terminal device, and optionally, further includes the identifier of the second terminal device.

For example, the network-level multicast member list maintained by the SMF is shown in Table 3. If the fourth report message is a message that the terminal device $UE_{21}$ requests to terminate the program 1, the SMF deletes, from the network-level multicast member list, an information entry that is of the terminal device $UE_{21}$ and that is corresponding to the address of the program 1. The information entry includes the identifier of the access network device $RAN_2$. Alternatively, the network-level multicast member list maintained by the SMF is shown in Table 4. If the fourth report message is a message that the terminal device $UE_{21}$ requests to terminate the program 1, and the access network $RAN_2$ serves $UE_{21}$, the SMF sets the "Valid or not" column in the information entry that is of the terminal device $UE_{21}$, that is in the network-level multicast member list, and that is corresponding to the address of the program 1 to 0, to indicate that the information in this row is invalid.

In one embodiment, if the SMF updates the network-level multicast member list based on the fourth report message, the SMF needs to send the network-level multicast member notification message to the UPF, so that the UPF learns that the first terminal device should be removed from the members corresponding to the first multicast service. Therefore, when receiving the data packet of the first multicast service, the UPF no longer sends the data packet to the first terminal device. The network-level multicast member notification message may include an updated network-level multicast member list, or all valid information entries corresponding to the first multicast service in the updated network-level multicast member list, or indication information used to indicate the removed first terminal device and an information entry corresponding to the first multicast service.

In one embodiment, if the SMF updates the network-level multicast member list based on the fourth report message, and the SMF determines that the send mode of the data packet of the first multicast service between the gateway device and the RAN device changes (for example, changes from the multicast mode to the unicast mode), the SMF sends the first configuration information to the UPF. For content and a send mode of the first configuration information, refer to descriptions in operation 408.

In one embodiment, when the RAN device does not have the multicast service management capability described in operation 404, if the SMF updates the network-level multicast member list based on the fourth report message, the SMF sends a cell-level multicast member notification message to the RAN device, so that the RAN device learns that the first terminal device should be removed from the members corresponding to the first multicast service. After receiving the data packet of the first multicast service, the RAN device no longer sends the data packet to the first terminal device. The cell-level multicast member notification message includes the identifier of the first multicast service and/or identifiers corresponding to all terminal devices that are served by the RAN device and that are in the members of the first multicast service. Alternatively, the cell-level multicast member notification message includes indication information used to instruct to remove the first terminal device from the member of the first multicast service, where the first terminal device is served by the RAN device. The cell-level multicast member notification message may be sent by the SMF to the RAN device by using the UPF, or sent by the SMF to the RAN device by using the AMF.

In one embodiment, if the SMF updates the network-level multicast member list based on the fourth report message, and the SMF determines that the send mode of the data packet of the first multicast service between the gateway device and the RAN device changes (for example, changes from the multicast mode to the unicast mode), or the SMF determines that the send mode of the data packet of the first multicast service between the RAN device and the terminal device changes (for example, changes from the multicast mode to the unicast mode), the SMF sends the second configuration information to the RAN device. For content and a send mode of the second configuration information, refer to descriptions in operation 409.

In one embodiment, after the SMF updates the network-level multicast member list based on the fourth report message, if there is no member of the first multicast service in the terminal devices served by the RAN device, and a multicast transmission channel (for example, the multicast N3/S1/M1 tunnel established by performing operation 4011 to operation 4016) that is used to send the data packet of the first multicast service and that is between the UPF and the RAN device corresponds only to the first multicast service (for example, a multicast transmission tunnel corresponding to the identifier M-TEID 1 and used to send the data packet of the first multicast service), the SMF instructs the RAN device and the UPF to remove the multicast transmission channel used to send the data packet of the first multicast service; or, if the multicast transmission channel that is used to send the data packet of the first multicast service and that is between the UPF and the RAN device may be used to send data packets of a plurality of multicast services, and there is no member of the multicast service in the terminal devices served by the RAN device, the SMF instructs the RAN device and the UPF to remove the multicast transmission channel used to send the data packet of the first multicast service, to release resources related to the multicast transmission channel.

That the SMF instructs the RAN device and the UPF to remove the multicast transmission channel used to send the data packet of the first multicast service includes:

The SMF sends a request message (for example, a multicast service termination request) for removing the multicast transmission channel to the UPF, where the request message includes one or more of the following information: an identifier (for example, a multicast tunnel endpoint identifier M-TEID) corresponding to the multicast transmission channel used to send the data packet of the first multicast service, the identifier corresponding to the first multicast service, a multicast bearer identifier, and the like.

The UPF receives the request message used for removing the multicast transmission channel, deletes or deactivates context information (for example, including various configuration parameters related to the multicast transmission channel) of the multicast transmission channel indicated in the request message, releases resources configured for the multicast transmission channel, and returns, to the SMF, a response message that is used to acknowledge that removal of the multicast transmission channel is completed.

The SMF sends, to the AMF, the request message used for removing the multicast transmission channel.

The AMF forwards, to the RAN device, the request message used for removing the multicast transmission channel.

The RAN device receives the request message used for removing the multicast transmission channel, deletes or deactivates context information (for example, including various configuration parameters related to the multicast transmission channel) of the multicast transmission channel indicated in the request message, releases resources configured for the multicast transmission channel, and returns, to the AMF, a response message that is used to acknowledge that removal of the multicast transmission channel is completed.

In one embodiment, the AMF may delete or deactivate the context information of the multicast transmission channel after receiving the request message that is sent by the SMF and that is used to remove the multicast transmission channel, or after receiving the corresponding message that is returned by the RAN device and that is used to acknowledge that removal of the multicast transmission channel is completed.

The AMF sends, to the SMF, the response message used to acknowledge that removal of the multicast transmission channel is completed.

For understanding of operation 419 to operation 421, refer to operation 219 to operation 221 in the method 200. Details are not described again.

Operation 418 to operation 421 are processes in which the SMF maintains the network-level multicast member list based on the fourth report message, removes the multicast transmission channel used to send the data packet of the first multicast service, and removes the first multicast connection.

A difference between the method 400 and the method 200 lies in that, in the method 200, the data packet of the multicast service is sent between the UPF and the terminal device in a unicast mode, but in the method 400, the data packet of the multicast service is sent between the UPF and the RAN device in a multicast mode, and is sent between the RAN device and the terminal device in a multicast or unicast mode.

Therefore, in this embodiment of this application, the UPF sends the data packet of the multicast service to the RAN device in a multicast mode. This saves transmission resources of a backhaul link.

Figure 10A:
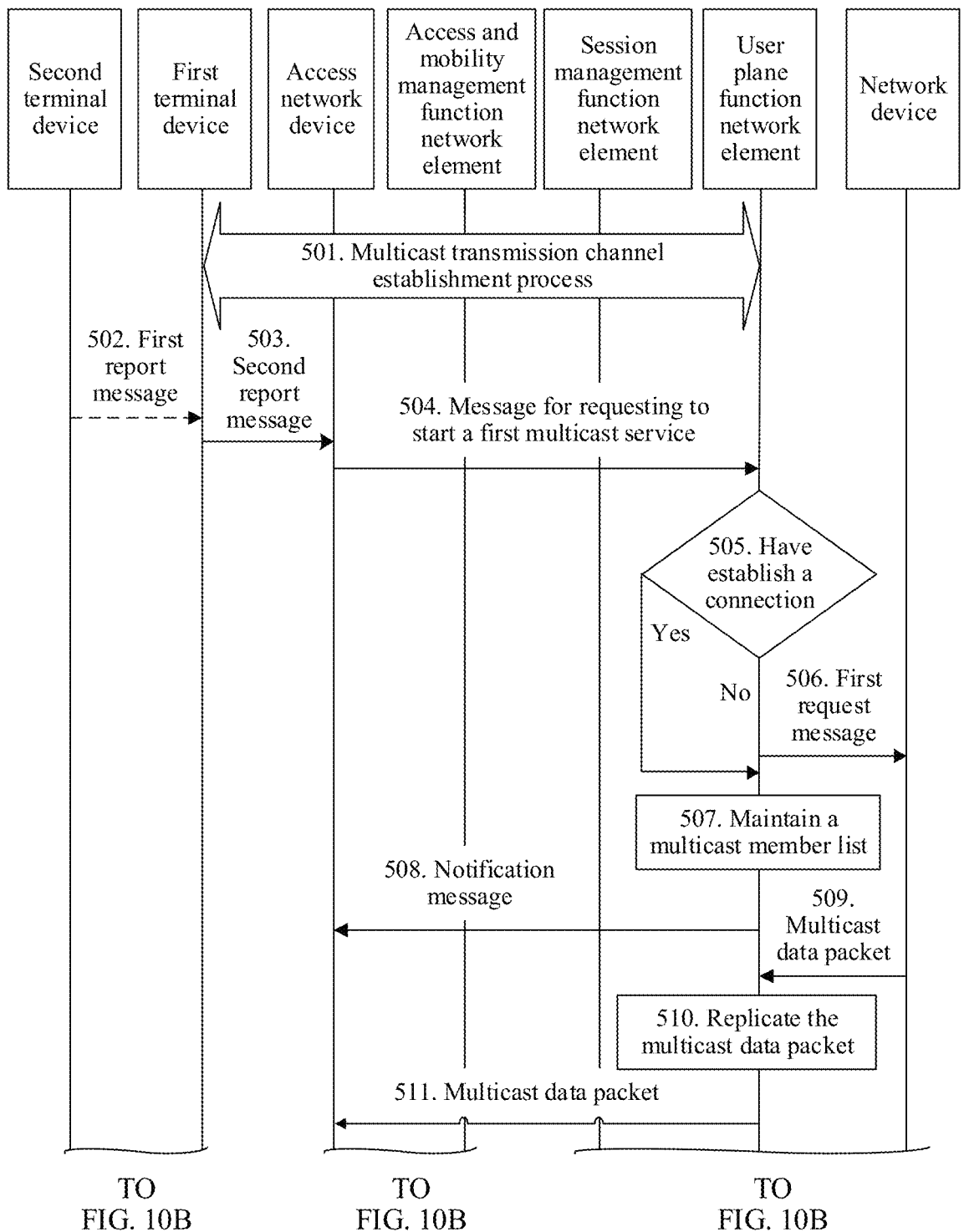
FIG. 10A and FIG. 10B are a schematic flowchart of a multicast service transmission method according to this application.
Figure 10B:
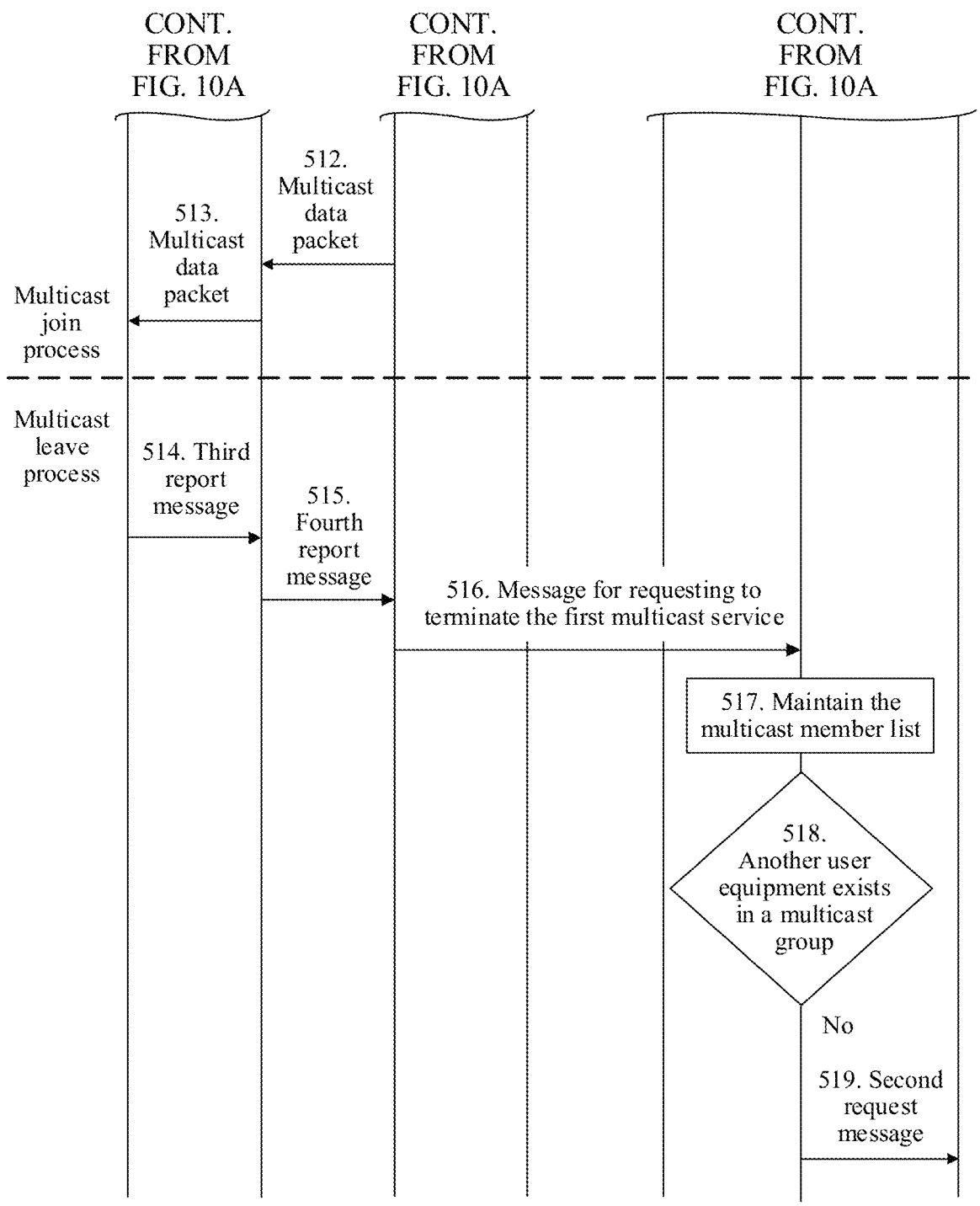

FIG. 10A and FIG. 10B are a schematic flowchart of a multicast service transmission method 500 in a 5G network architecture according to this application. In the method 500, a management device having a multicast service management function is a UPF, and a gateway device is the UPF. A data packet of a multicast service is sent between the UPF and a RAN device in a multicast mode. As shown in FIGS. 10A and 10B, the method 500 includes the following content.

Operation 501: A management device (for example, an SMF/PGW/MBMS GW that supports multicast) that performs multicast session management receives a message used for triggering establishment of a multicast transmission channel, and then triggers a process of establishing the multicast transmission channel.

For understanding of operation 501, refer to descriptions of operation 401 in the method 400. For understanding of the process of establishing the multicast transmission channel, refer to the related descriptions (refer to operation 4011 to operation 4016) in operation 401 in the method 400.

For understanding of operation 502 to operation 507, refer to descriptions of operation 302 to operation 307 in the method 300.

In an optional manner, operation 502 to operation 505 may be performed before operation 501. After receiving, in operation 505, the second message sent by the RAN device, the UPF sends the second report message to the SMF, and then triggers the process of starting establishment of the multicast transmission channel. This corresponds to the first of the three triggering modes described in operation 401. In other words, the multicast service request of the terminal device triggers the management device that performs multicast session management to start the process of establishing the multicast transmission channel.

Operation 508: The UPF sends a notification message to the RAN device.

In one embodiment, the notification message sent by the UPF to the RAN device includes a cell-level multicast member notification message. The cell-level multicast member notification message includes the identifier of the first multicast service and/or identifiers corresponding to all terminal devices that are served by the RAN device and that are in members of the first multicast service. Alternatively, the cell-level multicast member notification message includes indication information used to instruct to add the first terminal device to a member of the first multicast service, where the first terminal device is served by the RAN device. The RAN device maintains a cell-level multicast member list based on the cell-level multicast member notification message. For understanding of a form and content of the cell-level multicast member list, refer to corresponding descriptions in operation 504. If the RAN device has the multicast service management capability described in operation 504, the UPF may not need to send the cell-level multicast member notification message to the RAN device In one embodiment, the UPF determines a send mode of the data packet of the first multicast service between the gateway device and the RAN device, and/or a send mode of the data packet of the first multicast service between the RAN device and the terminal device. The UPF sends second configuration information to the RAN device. The second configuration information includes first indication information used to indicate a mode in which the UPF sends the data packet of the first multicast service to the RAN device, and/or second indication information used to indicate a mode in which the RAN device sends the data packet of the first multicast service to the terminal device. In a possible manner, the notification message sent by the UPF to the RAN device includes the second configuration information.

In a possible example, the UPF may directly send the notification message to the RAN device. Alternatively, in another possible example, the UPF first sends the notification message to the SMF, and then the SMF sends the notification message to the RAN device by using the AMF.

Operation 509: The network device sends a data packet of the first multicast service to the UPF.

Operation 510: The UPF receives the data packet that is of the first multicast service and that is sent by the network device, and replicates the data packet of the first multicast service.

That the UPF replicates the data packet of the first multicast service includes: The UPF queries a network-level multicast member list, learns of terminal devices that are served by the UPF and that are members of the first multicast service, and/or information about RAN devices that serve the terminal devices, and then, the UPF replicates the data packet based on a quantity of the RAN devices that serve the member of the first multicast. In one embodiment, the UPF may add, to a replicated data packet, one or more of the following information: information related to QoS guarantee, an identifier corresponding to the RAN device, the identifier corresponding to the first multicast service, and the like. For example, multicast member information maintained by the UPF is shown in Table 3. The first multicast service corresponds to a program 1, and the members of the first multicast service include $UE_{11}$, $UE_{12}$, and $UE_{21}$. A RAN device that serves $UE_{11}$ and $UE_{12}$ is $RAN_1$, and a RAN device that serves $UE_{21}$ is $RAN_2$. After receiving a data packet of the program 1, the UPF needs to replicate two copies of the data packet based on the network-level multicast member list, and sends replicated data packets to $RAN_1$ and $RAN_2$ respectively. In one embodiment, the UPF may add, to the replicated data packet, one or more of the following information: an identifier (QoS Flow Identity, QFI) of a QoS flow to which the data packet of the first multicast service is mapped, an identifier of a multicast tunnel between the UPF and the RAN device (for example, an identifier M-TEID of a multicast transmission tunnel that is between the UPF and the RAN device and that corresponds to the multicast service), and the identifier corresponding to the first multicast service (for example, an identifier M-TEID 1 of the multicast transmission tunnel that is between the UPF and the RAN device and that corresponds to the first multicast service, or another identifier that can be uniquely mapped to the first multicast service).

Operation 511: The UPF sends the data packet of the first multicast service to the RAN device.

The UPF maps the replicated data packet of the first multicast service to a proper QoS flow based on a QoS-related configuration (for example, a multicast service flow template multicast SDF template) provided by the SMF, and sends the data packet to the RAN device. The RAN device serves the first terminal device, and the first terminal device is one of the members of the first multicast service.

Operation 512: The RAN device receives the data packet that is of the first multicast service and that is sent by the UPF, and sends the data packet of the first multicast service to the first terminal device.

In an optional manner, the data packet that is of the first multicast service and that is received by the RAN device carries the identifier corresponding to the first multicast service. The RAN device determines, based on the identifier, that the data packet is the data packet of the first multicast service, and learns, based on the cell-level multicast member list maintained by the RAN device, of terminal devices that are served by the RAN device and that are members of the first multicast service. If the second configuration information sent by the UPF to the RAN device in operation 508 includes second indication information used to indicate the send mode of the data packet of the first multicast service between the RAN device and the terminal device, the RAN device may determine, based on the second indication information, that a send mode of the data packet of the first multicast service through an air interface is unicast or multicast. Alternatively, the RAN device determines, based on information (for example, a quantity of terminal devices requesting the first multicast service, and/or quality information of links between the terminal devices and the RAN device) included in the cell-level multicast member list maintained by the RAN device, that a send mode of the data packet of the first multicast service through an air interface is unicast or multicast.

If the RAN device determines to send the data packet of the first multicast service to the terminal device through an air interface in a unicast mode, the RAN device replicates a plurality of copies of the received data packet of the first multicast service (for example, the RAN device performs replication based on a quantity of the members of the first multicast service in the terminal devices served by the RAN device), and then sends replicated data packets respectively to the terminal devices (including the first terminal device) serving as the members of the first multicast service; or, if the RAN device determines to send the data packet of the first multicast service to the terminal device through an air interface in a multicast mode, the RAN device may configure a uniform air interface scheduling identifier for these terminal devices, where the uniform air interface scheduling identifier corresponds to the first multicast service, and the RAN device sends, by using the uniform air interface scheduling identifier, the data packet of the first multicast service to the terminal devices (including the first terminal device) serving as the members of the first multicast service.

For understanding of operation 513 to operation 516, refer to operation 313 to operation 316 in the method 300. Details are not described again in this embodiment.

Operation 517: The UPF maintains the network-level multicast member list based on the fourth report message.

For understanding that the UPF maintains the network-level multicast member list based on the fourth report message, refer to descriptions of operation 317.

In one embodiment, when the RAN device does not have the multicast service management capability described in operation 504, if the UPF updates the network-level multicast member list based on the fourth report message, the UPF sends a notification message to the RAN device, where the notification message sent by the UPF to the RAN device includes a cell-level multicast member notification message, so that the RAN device learns that the first terminal device should be removed from the members corresponding to the first multicast service. After receiving the data packet of the first multicast service, the RAN device no longer sends the data packet to the first terminal device. The cell-level multicast member notification message includes the identifier of the first multicast service and/or identifiers corresponding to all terminal devices that are served by the RAN device and that are in the members of the first multicast service. Alternatively, the cell-level multicast member notification message includes indication information used to instruct to remove the first terminal device from the member of the first multicast service, where the first terminal device is served by the RAN device. The notification message may be directly sent by the UPF to the RAN device, or sent by the UPF to the SMF, and then sent by the SMF to the RAN device by using the AMF.

In one embodiment, if the UPF updates the network-level multicast member list based on the fourth report message, and the UPF determines that the send mode of the data packet of the first multicast service between the gateway device and the RAN device changes (for example, changes from the multicast mode to the unicast mode), or the UPF determines that the send mode of the data packet of the first multicast service between the RAN device and the terminal device changes (for example, changes from the multicast mode to the unicast mode), the UPF sends the second configuration information to the RAN device. For content and a send mode of the second configuration information, refer to descriptions in operation 508.

In one embodiment, after the UPF updates the network-level multicast member list based on the fourth report message, if there is no member of the first multicast service in the terminal devices served by the RAN device, and a multicast transmission channel (for example, the multicast N3/S1/M1 tunnel established by performing operation 4011 to operation 4016) that is used to send the data packet of the first multicast service and that is between the UPF and the RAN device corresponds only to the first multicast service (for example, a multicast transmission tunnel corresponding to the identifier M-TEID 1 and used to send the data packet of the first multicast service), the UPF sends, to the SMF, a message indicating that the terminal devices served by the RAN device does not include a member of the first multicast, and the SMF instructs the RAN device and the UPF to remove the multicast transmission channel used to send the data packet of the first multicast service; or, if the multicast transmission channel that is used to send the data packet of the first multicast service and that is between the UPF and the RAN device may be used to send data packets of a plurality of multicast services, and there is no member of the multicast service in the terminal devices served by the RAN device, the UPF sends, to the SMF, a message indicating that the terminal devices served by the RAN device does not include a member of the first multicast, and the SMF instructs the RAN device and the UPF to remove the multicast transmission channel used to send the data packet of the first multicast service.

For a process in which the SMF instructs the RAN device and the UPF to remove the multicast transmission channel used to send the data packet of the first multicast service, refer to the description in operation 419 in the method 400. Details are not described again.

For understanding of operation 518 and operation 519, refer to operation 318 and operation 319 in the method 300.

Operation 519 is an optional operation, and is performed when a result of operation 518 is that the UPF determines that there is no member of the first multicast service in the terminal devices served by the UPF.

Operation 517 to operation 519 are processes in which the UPF maintains the network-level multicast member list based on the fourth report message, removes the multicast transmission channel used to send the data packet of the first multicast service, and removes the first multicast connection.

It should be understood that a difference between the method 500 and the method 400 lies in that in the method 400, a management device performing multicast service management is the SMF, but in the method 500, a management device performing multicast service management is the UPF.

A difference between the method 500 and the method 300 lies in that, in the method 300, the data packet of the multicast service is sent between the UPF and the terminal device in a unicast mode, but in the method 500, the data packet of the multicast service is sent between the UPF and the RAN device in a multicast mode, and is sent between the RAN device and the terminal device in a multicast or unicast mode.

Therefore, in this embodiment of this application, the UPF sends the data packet of the multicast service to the RAN in a multicast mode. This saves transmission resources of a backhaul link.

Figure 11A:
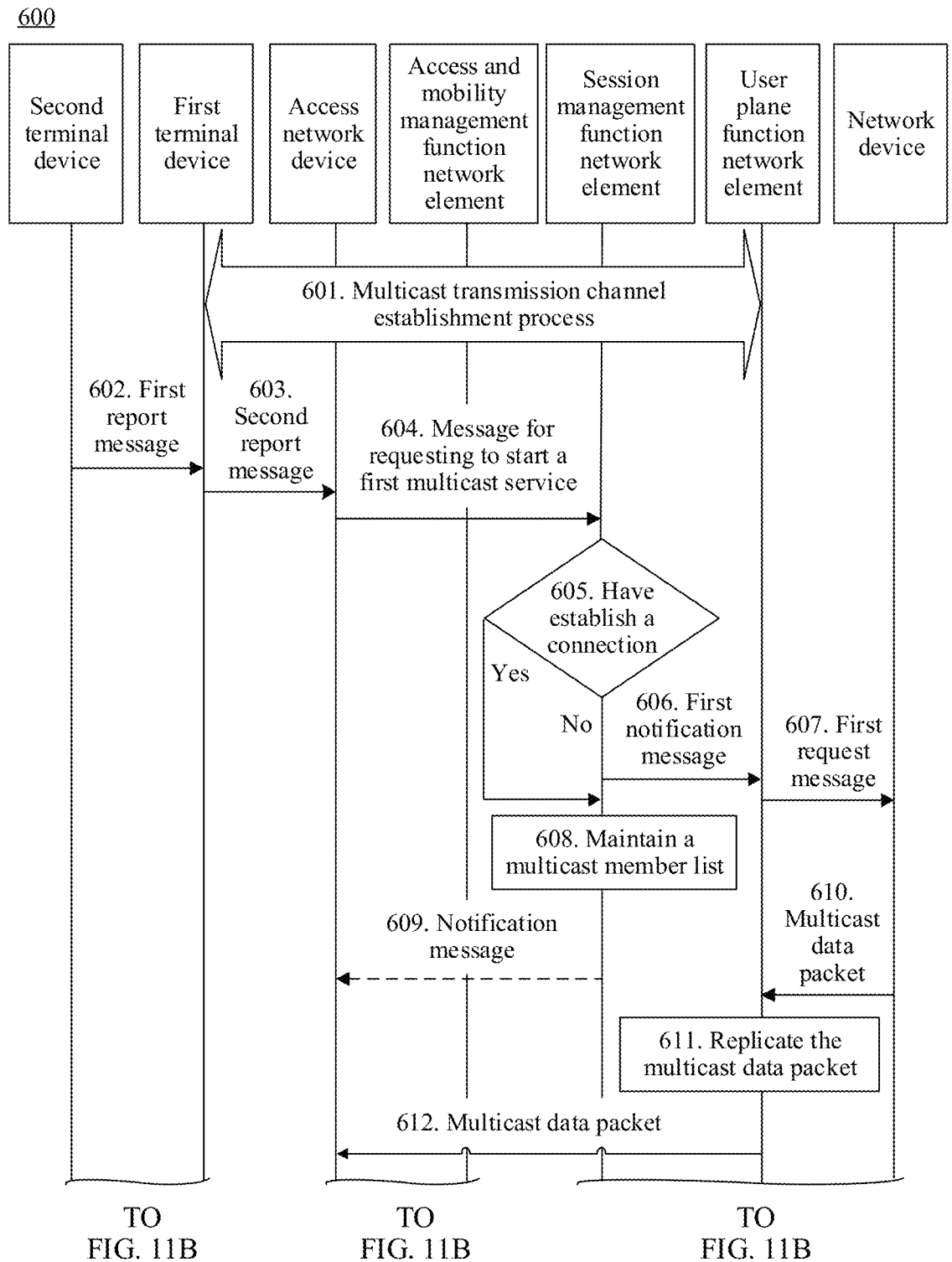
FIG. 11A and FIG. 11B are a schematic flowchart of a multicast service transmission method according to this application.
Figure 11B:
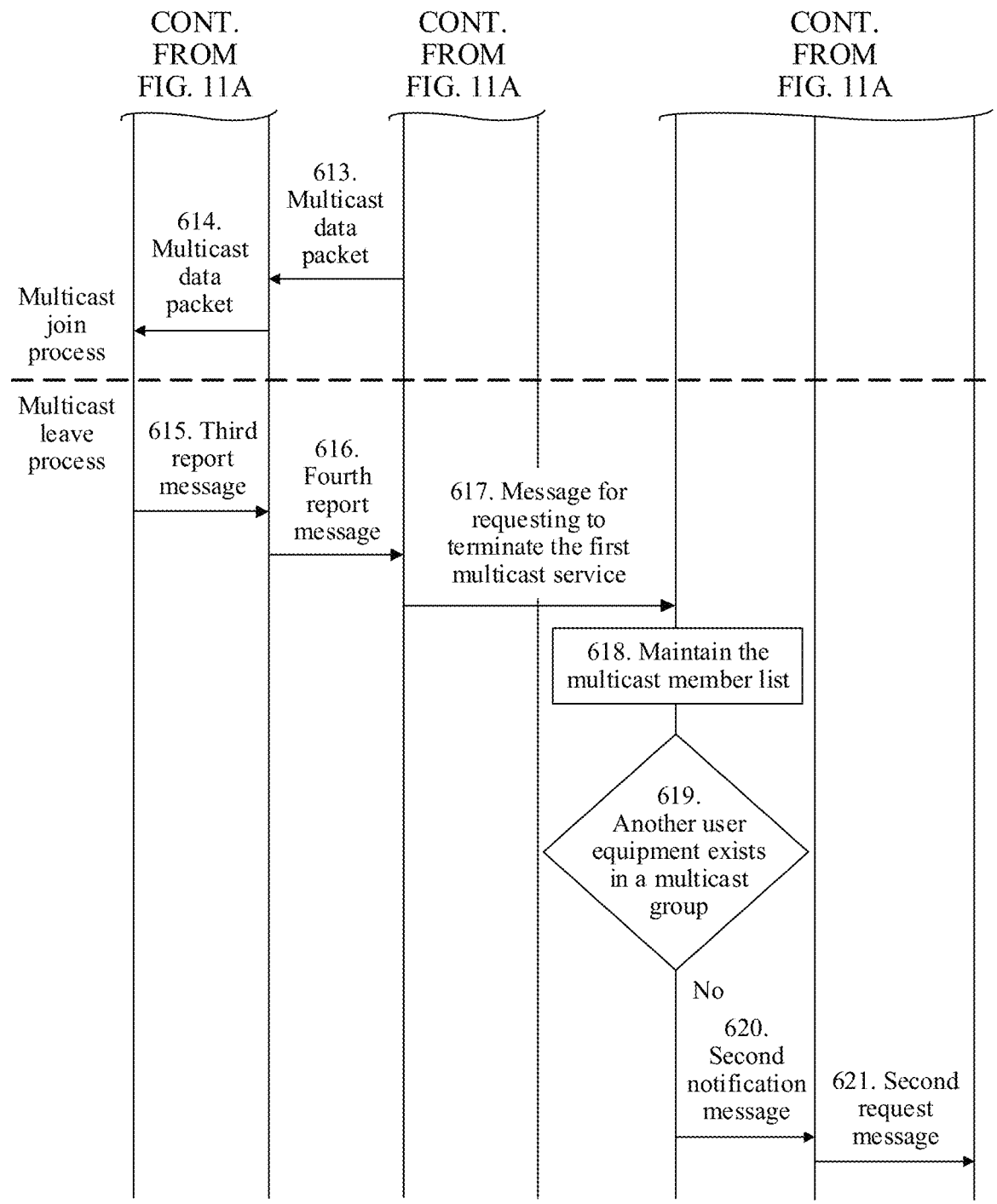

FIG. 11A and FIG. 11B are a schematic flowchart of a multicast service transmission method 600 in a 5G network architecture according to this application. In the method 600, a management device having a multicast service management function is an SMF, and a gateway device is a UPF. A data packet of a multicast service is sent between the UPF and a RAN device in a multicast mode. The RAN device has an IGMP proxy function. As shown in FIG. 11A and FIG. 11B, the method 600 includes the following content.

For understanding of operation 601 to operation 603, refer to descriptions of operation 401 to operation 403 in the method 400. Details are not described again.

Operation 604: The RAN device sends, to the SMF (the management device having the multicast service management function), a message for requesting to receive a first multicast service.

That the RAN device sends, to the SMF, a message for requesting to receive a first multicast service includes: For example, the RAN device receives the second report message sent by the first terminal device. The second report message is a message (for example, an IGMP join report) for the first terminal device to request to receive the first multicast service, and the second report message includes an identifier corresponding to the first multicast service. In this case, the RAN device checks a cell-level multicast member list maintained by the RAN device. If in the cell-level multicast member list, the identifier that is corresponding to the first multicast service and that is in the first report message is not included, or in all valid information entries of the cell-level multicast member list, no terminal device corresponds to the identifier corresponding to the first multicast service, the RAN device serves as a device requesting the first multicast service, and sends, to the SMF, the message that the RAN device requests to receive the first multicast service (for example, the RAN device sends an IGMP Join report for joining the first multicast service). The message includes the identifier corresponding to the first multicast service and an identifier of the RAN device (for example, an IP address of the RAN device). In one embodiment, the message further includes an identifier of the first terminal device or identifiers of all terminal devices (including the first terminal device) that request the first multicast service and that are served by the RAN device.

In an optional manner, that the RAN device sends, to the SMF by using the UPF, the message that the RAN device requests to receive the first multicast service includes: The RAN device sends, to the UPF, the message that the RAN device requests to receive the first multicast service; and the UPF identifies, according to a detection rule that is of a message related to the multicast service and that is configured by the SMF, that the received message is a message that is related to the multicast service and that is sent by the RAN device, and then, sends, to the SMF, the received message that the RAN device requests to receive the first multicast service. For understanding of the detection rule that is of the message related to the multicast service and that is configured by the SMF, refer to the related descriptions of operation 204 in the method 200.

In another optional manner, the RAN device sends, to the SMF by using the AMF, the message that the RAN device requests to receive the first multicast service.

In this embodiment, the RAN device has a multicast service management capability. In one embodiment, the RAN device maintains a cell-level multicast member list based on the received second report message. For example, the RAN device is configured with an IGMP proxy function, and may read the IGMP join report or IGMP leave report sent by the first terminal device, and maintain the cell-level multicast member list. The cell-level multicast member list includes an identifier of the first multicast service and/or an identifier corresponding to a terminal device (including the first terminal device) that requests the first multicast service and that is served by the RAN device, and optionally further includes the identifier of the second terminal device. That the RAN device maintains a cell-level multicast member list based on the received second report message includes: For example, the RAN device reads the received second report message and learns that the first terminal device requests to receive the first multicast service. If the cell-level multicast member list maintained by the RAN device has stored a valid information entry that is of the first terminal device and that is corresponding to the identifier of the first multicast service, the RAN device does not need to update the cell-level multicast member list; otherwise, the RAN device adds, to the cell-level multicast member list maintained by the RAN device, an information entry that is of the first terminal device and that is corresponding to the identifier of the first multicast service, or modifies the cell-level multicast member list maintained by the RAN device, to be validate the information entry that is of the first terminal device and that is corresponding to the identifier of the first multicast service. The information entry that is of the first terminal device and that is corresponding to the identifier of the first multicast service includes: the identifier corresponding to the first multicast service, and/or the identifier corresponding to the first terminal device.

In this case, the RAN device has the multicast service management capability, may read the IGMP join report or the IGMP leave report sent by the first terminal device, and maintain the cell-level multicast member list. If the cell-level multicast member list of the RAN device already includes a terminal device requesting the first multicast service, the RAN device no longer needs to send, to the SMF, the message for requesting to receive the first multicast service. This may reduce signaling overheads and save radio resources.

The RAN device may have the multicast service management capability, and the SMF may not need to send the cell-level multicast member notification message to the RAN device. This may reduce signaling overheads and save radio resources.

For example, for understanding of a form of the cell-level multicast member list maintained by the RAN device, refer to Table 2 and the related descriptions in operation 204 of the method 200.

In an optional manner, operation 602 to operation 604 may be performed before operation 601. That the SMF receives, in operation 604, the message that the RAN device requests to receive the first multicast service, and triggers the process of starting establishment of the multicast transmission channel corresponds to the first of the three triggering modes described in operation 401 of the method 400. In other words, the multicast service request of the terminal device triggers the management device that performs multicast session management to start the process of establishing the multicast transmission channel.

Operation 605: The SMF determines whether the UPF has established a connection relationship related to the first multicast service with the network device.

This includes: For example, the SMF reads the message that the RAN device requests to receive the first multicast service, and determines whether the UPF that establishes the multicast transmission channel with the RAN device has established the connection relationship related to first multicast service with the network device. For example, the SMF may check a network-level multicast member list, and if the network-level multicast member list includes at least one valid information entry related to the first multicast service, the SMF may determine that the UPF has established the connection relationship related to the first multicast service with the network device; otherwise, the SMF may determine that the UPF has not established the connection relationship related to the first multicast service with the network device. In the embodiment of the present application, the network device may be, for example, a device such as a router/gateway supporting IP multicast in a data network DN, a multicast query node, or a multicast service server. For understanding of the network-level multicast member list and content of the valid information entry related to the first multicast service in the network-level multicast member list, refer to descriptions in operation 608.

Operation 606: The SMF sends a first notification message to the UPF. The first notification message is used to instruct the UPF to establish a connection related to the first multicast service to the network device.

This includes: For example, with reference to operation 606, the SMF determines whether the UPF has established the connection relationship related to the first multicast service with the network device. If the SMF determines that the UPF has not established the connection relationship related to the first multicast service with the network device, the SMF sends the first notification message to the UPF, to instruct the UPF to establish a connection related to the first multicast service to the network device; or if the SMF determines has established the connection relationship related to the first multicast service with the network device, operation 606 and operation 607 may not need to be performed.

Operation 607: The UPF sends a first request message to the network device. The first request message is used by the UPF to request to establish a connection related to the first multicast service to the network device.

For example, the UPF may send, to the network device by using a multicast management protocol such as IGMP/MLD or a multicast routing protocol such as PIM, a request message used to join the first multicast service (for example, send an IGMP join report) or join a multicast routing tree corresponding to the first multicast service (for example, send a graft request message for joining the multicast routing tree).

Operation 608: The SMF maintains a network-level multicast member list.

The network-level multicast member list maintained by the SMF includes an identifier corresponding to each multicast service, corresponds to each multicast service, and further includes an information entry related to a RAN device that needs to receive the multicast service. In one embodiment, The network-level multicast member list further includes identifiers of all terminal devices (for example, the first terminal device) that request the first multicast service and that are served by the RAN device. For example, for understanding of the network-level multicast member list maintained by the SMF, refer to forms of Table 3 and Table 4 in operation 208 of the method 200, or refer to forms of Table 3 and Table 4 after the content in the column corresponding to the "Identifier of the terminal device" is removed.

A process in which the SMF maintains the network-level multicast member list includes: For example, the SMF reads the identifier of the first multicast service and the identifier of the RAN device that are in the message that the RAN device requests to receive the first multicast service. If the network-level multicast member list maintained by the SMF already does not include an information entry corresponding to both the RAN device and the first multicast service, the SMF updates the network-level multicast member list. In one embodiment, the SMF adds the information entry corresponding to both the RAN device and the first multicast service to the network-level multicast member list, or validates the information entry corresponding to both the RAN device and the first multicast service. If there is already a valid information entry corresponding to both the RAN device and the first multicast service in the network-level multicast member list maintained by the SMF, the SMF may not need to update the network-level multicast member list. The information entry corresponding to both the RAN device and the first multicast service includes the identifier corresponding to the first multicast service, and/or the identifier of the RAN device. In one embodiment, the information entry further includes the identifier of the first terminal device or the identifiers of all terminal devices (including the first terminal device) that request the first multicast service and that are served by the RAN device. In one embodiment, if there is already the valid information entry corresponding to both the RAN device and the first multicast service in the network-level multicast member list maintained by the SMF, and if the message that the RAN device requests to receive the first multicast service carries the identifier of the terminal device, where the identifier of the terminal device is the identifier of the first terminal device or the identifiers of all terminal devices (including the first terminal device) that request the first multicast service and that are served by the RAN device, the SMF may add the identifier of the terminal device to the valid information entry.

In one embodiment, if the SMF adds, to the network-level multicast member list, the information entry that is corresponding to both the RAN device and the first multicast service, or validates the information entry, the SMF sends a network-level multicast member notification message to the UPF, so that the UPF sends the network-level multicast member notification message to the RAN device when receiving the data packet of the first multicast service. The network-level multicast member notification message may include an updated network-level multicast member list, or all valid information entries corresponding to the first multicast service in the updated network-level multicast member list, or indication information used to indicate the added RAN device and an information entry corresponding to the first multicast service.

In one embodiment, the SMF determines a send mode of the data packet of the first multicast service between the gateway device and the RAN device. In addition to sending the network-level multicast member notification message to the UPF, the SMF further sends first configuration information to the UPF. The first configuration information includes indication information used to indicate a send mode of the data packet of the first multicast service between the gateway device and the RAN device. A mode in which the SMF sends the first configuration information to the UPF includes: In a possible manner, the SMF adds the first configuration information to the network-level multicast member notification message, and sends the network-level multicast member notification message to the UPF. In another possible manner, the first configuration information and the network-level multicast member notification message are sent by the SMF to the UPF together. In still another possible manner, the first configuration information and the network-level multicast member notification message are separately sent by the SMF to the UPF.

In one embodiment, the SMF may first maintain the network-level multicast member list, and then instruct the UPF to establish a connection related to the first multicast service to the network device. In other words, operation 608 is performed before operation 605, or operation 608 is performed before operation 606.

For understanding of operation 609 to operation 616, refer to operation 409 to operation 416 in the method 400.

Operation 617: The RAN device sends, to the SMF, a message for requesting to terminate the first multicast service.

That the RAN device sends, to the SMF, a message for requesting to terminate the first multicast service includes: For example, the RAN device receives the fourth report message sent by the first terminal device. The fourth report message is a message (for example, an IGMP leave report) for the first terminal device to request to terminate the first multicast service, and the fourth report message includes the identifier corresponding to the first multicast service. In this case, the RAN device updates a cell-level multicast member list maintained by the RAN device. In one embodiment, the RAN device deletes an information entry corresponding to both the first terminal device and the first multicast service from the cell-level multicast member list, or invalidates the information entry. If in all valid information entries of an updated cell-level multicast member list, no terminal device corresponds to the identifier corresponding to the first multicast service, the RAN device serves as the device requesting the first multicast service, and sends, to the SMF, the message that the RAN device requests to terminate the first multicast service (for example, the RAN device sends an IGMP leave report for terminating the first multicast service). The message includes the identifier corresponding to the first multicast service and the identifier of the RAN device (for example, the IP address of the RAN device). In one embodiment, the message further includes the identifier of the first terminal device.

In an optional manner, that the RAN device sends, to the SMF by using the UPF, the message that the RAN device requests to terminate the first multicast service includes: The RAN device sends, to the UPF, the message that the RAN device requests to terminate the first multicast service; and the UPF identifies, according to a detection rule that is of a message related to the multicast service and that is configured by the SMF, that the received message is a message that is related to the multicast service and that is sent by the RAN device, and then, sends, to the SMF, the received message that the RAN device requests to receive the first multicast service. For understanding of the detection rule that is of the message related to the multicast service and that is configured by the SMF, refer to the related descriptions of operation 217 in the method 200.

In another optional manner, the RAN device sends, to the SMF by using the AMF, the message that the RAN device requests to receive the first multicast service.

Operation 618: The SMF maintains a network-level multicast member list.

For understanding of content of the network-level multicast member list maintained by the SMF, refer to descriptions in operation 608.

A process in which the SMF maintains a network-level multicast member list includes: For example, the SMF reads the identifier of the first multicast service and the identifier of the RAN device that are in the message sent by the RAN device for requesting to terminate the first multicast service. The SMF updates the network-level multicast member list. In one embodiment, the SMF deletes, from the network-level multicast member list, the information entry corresponding to both the RAN device and the first multicast service, or invalidates the information entry corresponding to both the RAN device and the first multicast service. The information entry corresponding to both the RAN device and the first multicast service includes the identifier corresponding to the first multicast service, and/or the identifier of the RAN device, and optionally, further includes the identifier of the first terminal device.

In one embodiment, if the SMF deletes, from the network-level multicast member list, the information entry corresponding to both the RAN device and the first multicast service, or invalidates the information entry, the SMF sends a network-level multicast member notification message to the UPF, so that the UPF no longer sends the network-level multicast member notification message to the RAN device when receiving the data packet of the first multicast service. The network-level multicast member notification message may include an updated network-level multicast member list, or all valid information entries corresponding to the first multicast service in the updated network-level multicast member list, or indication information used to indicate the removed RAN device and an information entry corresponding to the first multicast service.

In one embodiment, after the SMF updates the network-level multicast member list, if the SMF determines that the send mode of the data packet of the first multicast service between the gateway device and the RAN device changes (for example, changes from the multicast mode to the unicast mode), the SMF sends the first configuration information to the UPF. For content and a send mode of the first configuration information, refer to descriptions in operation 408 of the method 400.

In one embodiment, after the SMF updates the network-level multicast member list, if the SMF determines that the send mode of the data packet of the first multicast service between the gateway device and the RAN device changes (for example, changes from the multicast mode to the unicast mode), or the SMF determines that the send mode of the data packet of the first multicast service between the RAN device and the terminal device changes (for example, changes from the multicast mode to the unicast mode), the SMF further sends the second configuration information to the RAN device. For content and a send mode of the second configuration information, refer to descriptions in operation 409 of the method 400.

In one embodiment, after the SMF updates the network-level multicast member list, if there is no member of the first multicast service in the terminal devices served by the RAN device, and a multicast transmission channel (for example, the multicast N3/S1/M1 tunnel established in operation 601) that is used to send the data packet of the first multicast service and that is between the UPF and the RAN device corresponds only to the first multicast service (for example, a multicast transmission tunnel corresponding to the identifier M-TEID 1 and used to send the data packet of the first multicast service), the SMF instructs the RAN device and the UPF to remove the multicast transmission channel used to send the data packet of the first multicast service; or, if the multicast transmission channel that is used to send the data packet of the first multicast service and that is between the UPF and the RAN device may be used to send data packets of a plurality of multicast services, and there is no member of the multicast service in the terminal devices served by the RAN device, the SMF instructs the RAN device and the UPF to remove the multicast transmission channel used to send the data packet of the first multicast service, to release resources related to the multicast transmission channel.

For understanding of related descriptions of instructing, by the SMF, the RAN device and the UPF to remove the multicast transmission channel used to send the data packet of the first multicast service, refer to related descriptions in operation 418.

Operation 619: The SMF determines whether there is still a member of the first multicast service in a network served by the SMF.

That the SMF determines whether there is still a member of the first multicast service in a network served by the SM includes: For example, the SMF reads the identifier of the first multicast service in the message sent by the RAN device for requesting to terminate the first multicast service, and checks the updated network-level multicast member list. If there is no valid information entry related to the first multicast service in the network-level multicast member list, the SMF may consider that there is no member of the first multicast service. In one embodiment, the SMF may further send query information to determine whether there is still a member of the first multicast service in a terminal device served by the SMF. This includes: For example, the SMF sends an IGMP/MLD query message to query whether there is still a terminal device that needs to receive the first multicast service or a terminal device that needs to receive any multicast service in a network served by the SMF. The query message may be sent by the SMF to the RAN device by using the AMF, or may be sent by the SMF to the RAN device by using the UPF. After receiving the query message, the RAN device loops up the cell-level multicast member list maintained by the RAN device, and determines information about a member of the first multicast service or any multicast service. If the cell-level multicast member list still includes a valid information entry related to the first multicast service or any multicast service, the RAN device sends, to the SMF, a message indicating that the RAN device requests to receive the first multicast service or any multicast service. In one embodiment, before looking up the cell-level multicast member list maintained by the RAN device, the RAN device sends a query message to the terminal device served by the RAN device. The query message is used to query whether the terminal device further needs to receive the first multicast service or any multicast service. After the terminal device served by the RAN device (for example, the first terminal device) receives the query message, if the first terminal device has a first multicast service requirement or another multicast service requirement, or a second terminal device served by the first terminal device has a first multicast service requirement or another multicast service requirement, the first terminal device sends, to the RAN device, a report message (an IGMP join report) indicating the service requirement, the RAN device updates, based on the report message, the cell-level multicast member list maintained by the RAN device.

For understanding of a process in which, in response to the query message of the SMF, the terminal device sends the report message for requesting the multicast service to the RAN device and the RAN device sends the message for requesting the multicast service to the SMF, refer to descriptions in operation 602 to operation 604. The SMF may update, based on a received message that is sent by any RAN device and that indicates the first multicast service requirement or any multicast service requirement, the network-level multicast member list maintained by the SMF. If the SMF does not receive, within a specified period of time after sending the query information, a report message that any RAN device requests to receive the first multicast service, the SMF may consider that there is no member of the first multicast service in the network served by the SMF.

For understanding of operation 620 and operation 621, refer to descriptions of operation 220 and operation 221 in the method 200. Details are not described again.

Operation 620 and operation 621 are optional steps, and are performed when a result of operation 619 is that the SMF determines that there is no member of the first multicast service in the network served by the SMF.

Therefore, in this embodiment, the UPF sends data packet of the multicast service to the RAN in a multicast mode. This saves transmission resources of a backhaul link. In addition, the RAN device is configured with the IGMP proxy function and has the multicast service management capability, and may serve as a proxy of the terminal device served by the RAN device to send a request message related to the multicast service to the management device having the multicast service management function. This reduces signaling transmission on the backhaul link.

Figure 12A:
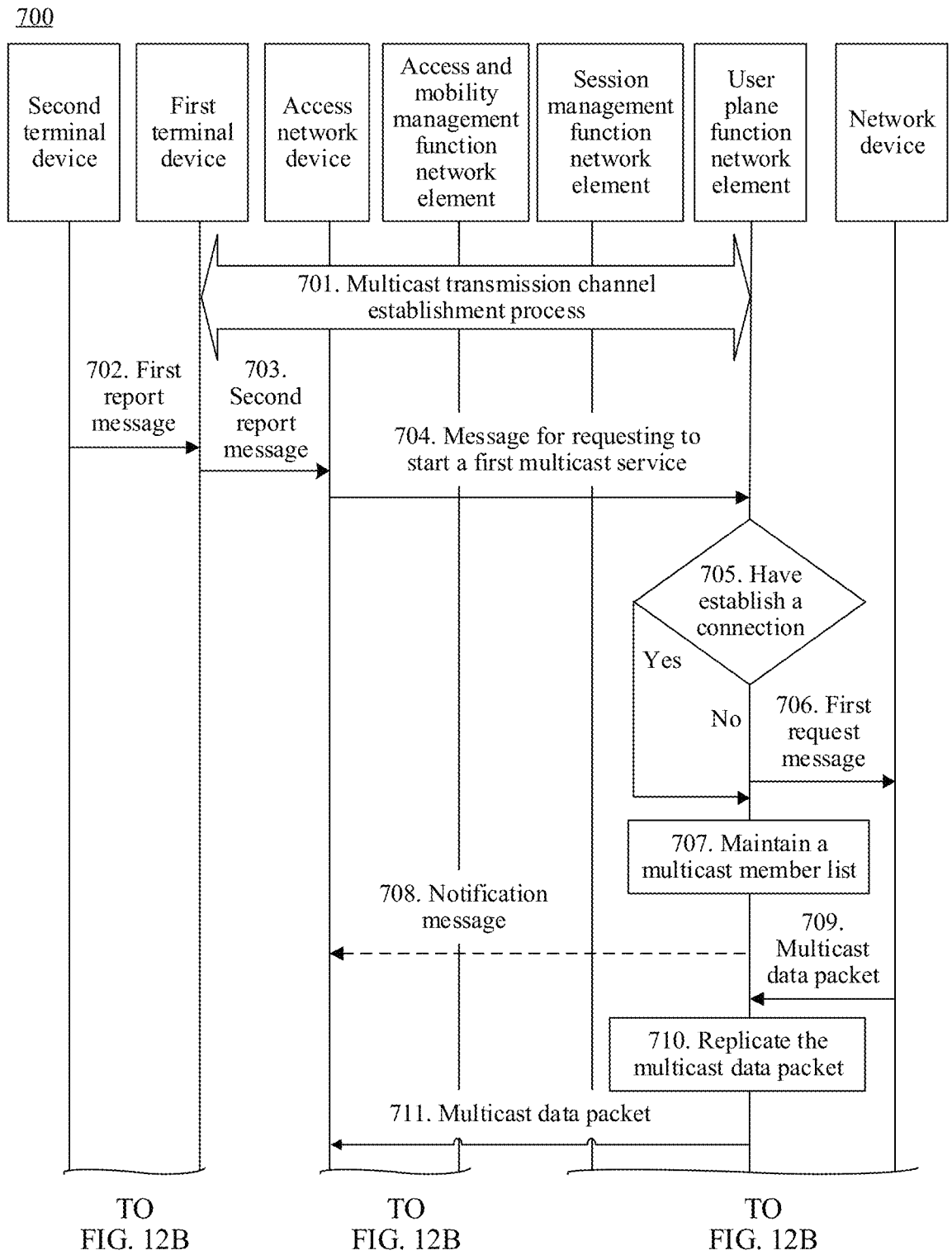
FIG. 12A and FIG. 12B are a schematic flowchart of a multicast service transmission method according to this application.
Figure 12B:
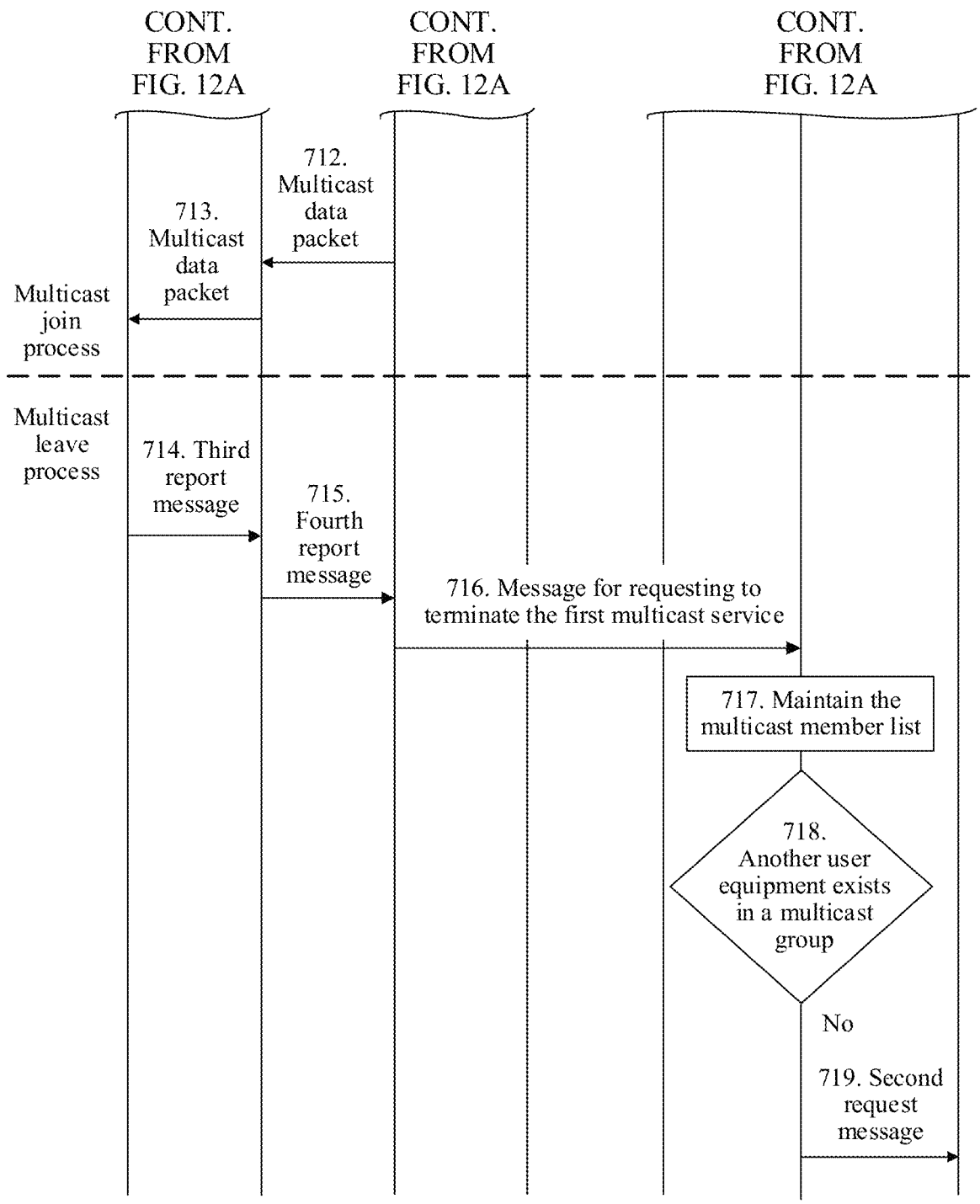

FIG. 12A and FIG. 12B is a schematic flowchart of a multicast service transmission method 700 in a 5G network architecture according to this application. In the method 700, a management device having a multicast service management function is a UPF, and a gateway device is the UPF. A data packet of a multicast service is sent between the UPF and a RAN device in a multicast mode. The RAN device has an IGMP proxy function. As shown in FIG. 12A and FIG. 12B, the method 700 includes the following content.

For understanding of operation 701 to operation 703, refer to descriptions of operation 601 to operation 603 in the method 600. Details are not described again.

Operation 704: The RAN device sends, to the UPF (the management device having the multicast service management function), a message for requesting to receive a first multicast service.

That the RAN device sends, to the UPF, a message for requesting to receive a first multicast service includes: For example, the RAN device receives the second report message sent by the first terminal device. The second report message is a message (for example, an IGMP join report) for the first terminal device to request to receive the first multicast service, and the second report message includes an identifier corresponding to the first multicast service. In this case, the RAN device checks a cell-level multicast member list maintained by the RAN device. If in the cell-level multicast member list, the identifier that is corresponding to the first multicast service and that is in the first report message is not included, or in all valid information entries of the cell-level multicast member list, no terminal device corresponds to the identifier corresponding to the first multicast service, the RAN device serves as a device requesting the first multicast service, and sends, to the UPF, the message that the RAN device requests to receive the first multicast service (for example, the RAN device sends an IGMP Join report for joining the first multicast service). The message includes the identifier corresponding to the first multicast service and an identifier of the RAN device (for example, an IP address of the RAN device). In one embodiment, the message further includes an identifier of the first terminal device or identifiers of all terminal devices (including the first terminal device) that request the first multicast service and that are served by the RAN device.

In an optional manner, a process in which the RAN device sends, to the UPF, the message that the RAN device requests to receive the first multicast service includes: The RAN device directly sends, to the UPF through an interface (for example, an N3 interface) between the RAN device and the UPF, the message that the RAN device requests to receive the first multicast service. For example, the RAN device may directly send, to the UPF through an N3 tunnel between the first terminal device and the UPF or through another transmission channel (for example, a multicast N3 tunnel or a dedicated transmission tunnel used for transmitting a request message related to the multicast service) between the RAN device and the UPF, the message that the RAN device requests to receive the first multicast service.

In another optional manner, a process in which the RAN device sends, to the UPF, the message that the RAN device requests to receive the first multicast service includes: The RAN device sends, to the AMF through, for example, an N2 interface, the message that the RAN device requests to receive the first multicast service; and the AMF sends, to the SMF through, for example, an N11 interface, the message that the RAN device requests to receive the first multicast service, and then, the SMF sends, to the UPF through, for example, an N4 interface, the message that the RAN device requests to receive the first multicast service.

It should be understood that when the UPF has the multicast service management function, the UPF may identify the request message related to the multicast service. For example, based on a source IP address and a destination IP address of the message that the RAN device requests to receive the first multicast service, where the source address is an IP address of the RAN device, and the destination IP address is an address of the first multicast service, the UPF may determine that the message is an IGMP report message—an IGMP join report, that is used to request to receive the first multicast service and that is sent by the RAN device.

In this embodiment, the RAN device has a multicast service management capability. In one embodiment, the RAN device maintains a cell-level multicast member list based on the received second report message. For example, the RAN device is configured with an IGMP proxy function, and may read the IGMP join report or IGMP leave report sent by the first terminal device, and maintain the cell-level multicast member list. The cell-level multicast member list includes an identifier of the first multicast service and/or an identifier corresponding to a terminal device (including the first terminal device) that requests the first multicast service and that is served by the RAN device, and optionally further includes the identifier of the second terminal device. That the RAN device maintains a cell-level multicast member list based on the received second report message includes: For example, the RAN device reads the received second report message and learns that the first terminal device requests to receive the first multicast service. If the cell-level multicast member list maintained by the RAN device has stored a valid information entry that is of the first terminal device and that is corresponding to the identifier of the first multicast service, the RAN device does not need to update the cell-level multicast member list; otherwise, the RAN device adds, to the cell-level multicast member list maintained by the RAN device, an information entry that is of the first terminal device and that is corresponding to the identifier of the first multicast service, or modifies the cell-level multicast member list maintained by the RAN device, to be validate the information entry that is of the first terminal device and that is corresponding to the identifier of the first multicast service. The information entry that is of the first terminal device and that is corresponding to the identifier of the first multicast service includes: the identifier corresponding to the first multicast service, and/or the identifier corresponding to the first terminal device.

In this case, the RAN device has the multicast service management capability, may read the IGMP join report or the IGMP leave report sent by the first terminal device, and maintain the cell-level multicast member list. If the cell-level multicast member list of the RAN device already includes a terminal device requesting the first multicast service, the RAN device no longer needs to send, to the SMF, the message for requesting to receive the first multicast service. This may reduce signaling overheads and save radio resources.

The RAN device may have the multicast service management capability, and the SMF may not need to send the cell-level multicast member notification message to the RAN device. This may reduce signaling overheads and save radio resources.

For example, for understanding of a form of the cell-level multicast member list maintained by the RAN device, refer to Table 2 and the related descriptions in operation 204 of the method 200.

In an optional manner, operation 702 to operation 704 may be performed before operation 701. That the UPF receives, in operation 704, the message that the RAN device requests to receive the first multicast service, and sends a request message (for example, the UPF forwards, to the SMF, the message that the RAN device requests to receive the first multicast service, or the UPF sends a multicast transmission channel establishment request message to the SMF) to trigger the process of starting establishment of the multicast transmission channel corresponds to the first of the three triggering modes described in operation 401 of the method 400. In other words, the multicast service request of the terminal device triggers the management device that performs multicast session management to start the process of establishing the multicast transmission channel.

Operation 705: The UPF determines whether a connection related to the first multicast service has been established to the network device.

This includes: For example, the UPF reads the message that the RAN device requests to receive the first multicast service, and determines whether the UPF has established a connection relationship related to first multicast service with the network device. In a possible example, the UPF may check a network-level multicast member list, and if the network-level multicast member list includes at least one valid information entry related to the first multicast service, the UPF may determine that the UPF has established the connection relationship related to the first multicast service with the network device; otherwise, the UPF may determine that the UPF has not established the connection relationship related to the first multicast service with the network device. In the embodiment of the present application, the network device may be, for example, a device such as a router/ gateway supporting IP multicast in a data network DN, a multicast query node, or a multicast service server. For understanding of the network-level multicast member list and content of the valid information entry related to the first multicast service in the network-level multicast member list, refer to descriptions in operation 707.

Operation 706: The UPF sends a first request message to the network device. The first request message is used by the UPF to establish a connection related to the first multicast service to the network device.

For example, the UPF may send, to the network device by using a multicast management protocol such as IGMP/MLD or a multicast routing protocol such as protocol independent multicast (PIM), a request message used to join the first multicast service (for example, send IGMP join) or used to join a multicast routing tree corresponding to the first multicast service (for example, send a graft request message for joining the multicast routing tree).

Operation 706 is an optional operation, and is performed when the UPF determines in operation 705 that the connection related to the first multicast has not been established to the network device.

Operation 707: The UPF maintains a network-level multicast member list.

The network-level multicast member list maintained by the UPF includes an identifier corresponding to each multicast service, corresponds to each multicast service, and further includes an information entry related to a RAN device that needs to receive the multicast service. In one embodiment, The network-level multicast member list further includes identifiers of all terminal devices (for example, the first terminal device) that request the first multicast service and that are served by the RAN device. For example, for understanding of the network-level multicast member list maintained by the UPF, refer to forms of Table 3 and Table 4 in operation 208 of the method 200, or refer to forms of Table 3 and Table 4 after the content in the column corresponding to the "Identifier of the terminal device" is removed.

A process in which the UPF maintains the network-level multicast member list includes: For example, the UPF reads the identifier of the first multicast service and the identifier of the RAN device that are in the message that the RAN device requests to receive the first multicast service. If there is no information entry corresponding to both the RAN device and the first multicast service in the network-level multicast member list maintained by the UPF, the UPF updates the network-level multicast member list. In one embodiment, the UPF adds an information entry corresponding to both the RAN device and the first multicast service to the network-level multicast member list, or validates an information entry corresponding to both the RAN device and the first multicast service. If there is already a valid information entry corresponding to both the RAN device and the first multicast service in the network-level multicast member list maintained by the UPF, the UPF may not need to update the network-level multicast member list. The information entry corresponding to both the RAN device and the first multicast service includes the identifier corresponding to the first multicast service, and/or the identifier of the RAN device. In one embodiment, the information entry further includes the identifier of the first terminal device or the identifiers of all terminal devices (including the first terminal device) that request the first multicast service and that are served by the RAN device.

In one embodiment, if there is already the valid information entry corresponding to both the RAN device and the first multicast service in the network-level multicast member list maintained by the UPF, and if the message that the RAN device requests to receive the first multicast service carries the identifier of the terminal device, where the identifier of the terminal device is the identifier of the first terminal device or the identifiers of all terminal devices (including the first terminal device) that request the first multicast service and that are served by the RAN device, the UPF may add the identifier of the terminal device to the valid information entry.

In one embodiment, the UPF may first maintain the network-level multicast member list, and then establish a connection related to the first multicast service to the network device. In other words, operation 707 is performed before operation 705, or operation 707 is performed before operation 706.

For understanding of operation 708 to operation 715, refer to operation 508 to operation 515 in the method 500.

Operation 716: The RAN device sends, to the UPF, a message for requesting to terminate the first multicast service.

That the RAN device sends, to the UPF, a message for requesting to terminate the first multicast service includes: For example, the RAN device receives the fourth report message sent by the first terminal device. The fourth report message is a message (for example, an IGMP leave report) for the first terminal device to request to terminate the first multicast service, and the fourth report message includes the identifier corresponding to the first multicast service. In this case, the RAN device updates a cell-level multicast member list maintained by the RAN device. In one embodiment, the RAN device deletes an information entry corresponding to both the first terminal device and the first multicast service from the cell-level multicast member list, or invalidates the information entry. If in all valid information entries of an updated cell-level multicast member list, no terminal device corresponds to the identifier corresponding to the first multicast service, the RAN device serves as the device requesting the first multicast service, and sends, to the UPF, the message that the RAN device requests to terminate the first multicast service (for example, the RAN device sends an IGMP leave report for terminating the first multicast service). The message includes the identifier corresponding to the first multicast service and the identifier of the RAN device (for example, the IP address of the RAN device). In one embodiment, the message further includes the identifier of the first terminal device.

In an optional manner, that the RAN device sends, to the UPF, the message that the RAN device requests to terminate the first multicast service includes: The RAN device directly sends, to the UPF through an interface (for example, an N3 interface) between the RAN device and the UPF, the message that the RAN device requests to terminate the first multicast service. For example, the RAN device may directly send, to the UPF through an N3 tunnel between the first terminal device and the UPF or through another transmission channel (for example, a multicast N3 tunnel or a dedicated transmission tunnel used for transmitting a request message related to the multicast service) between the RAN device and the UPF, the message that the RAN device requests to terminate the first multicast service.

In another optional manner, that the RAN device sends, to the UPF, the message that the RAN device requests to terminate the first multicast service includes: The RAN device sends, to the AMF through, for example, an N2 interface, the message that the RAN device requests to terminate the first multicast service; and the AMF sends, to the SMF through, for example, an N11 interface, the message that the RAN device requests to terminate the first multicast service, and then, the SMF sends, to the UPF through, for example, an N4 interface, the message that the RAN device requests to terminate the first multicast service.

Operation 717: The UPF maintains a network-level multicast member list.

For understanding of content of the network-level multicast member list maintained by the UPF, refer to descriptions in operation 517 of the method 500.

A process in which the UPF maintains a network-level multicast member list includes: For example, the UPF reads the identifier of the first multicast service and the identifier of the RAN device that are in the message sent by the RAN device for requesting to terminate the first multicast service. The UPF updates the network-level multicast member list. In one embodiment, the UPF deletes, from the network-level multicast member list, the information entry corresponding to both the RAN device and the first multicast service, or invalidates the information entry corresponding to both the RAN device and the first multicast service. The information entry corresponding to both the RAN device and the first multicast service includes the identifier corresponding to the first multicast service, and/or the identifier of the RAN device, and optionally, further includes the identifier of the first terminal device.

In one embodiment, if the UPF updates the network-level multicast member list based on the message for requesting to terminate the first multicast service, and the UPF determines that the send mode of the data packet of the first multicast service between the gateway device and the RAN device changes (for example, changes from the multicast mode to the unicast mode), or the UPF determines that the send mode of the data packet of the first multicast service between the RAN device and the terminal device changes (for example, changes from the multicast mode to the unicast mode), the UPF sends the second configuration information to the RAN device. For content and a send mode of the second configuration information, refer to descriptions in operation 508.

In one embodiment, after the UPF updates the network-level multicast member list based on the message for requesting to terminate the first multicast service, if there is no member of the first multicast service in the terminal devices served by the RAN device, and a multicast transmission channel (for example, the multicast N3/S1/M1 tunnel established by performing operation 4011 to operation 4016) that is used to send the data packet of the first multicast service and that is between the UPF and the RAN device corresponds only to the first multicast service (for example, a multicast transmission tunnel corresponding to the identifier M-TEID 1 and used to send the data packet of the first multicast service), the UPF sends, to the SMF, a message indicating that the RAN device does not include a member of the first multicast, and the SMF instructs the RAN device and the UPF to remove the multicast transmission channel used to send the data packet of the first multicast service; or, if the multicast transmission channel that is used to send the data packet of the first multicast service and that is between the UPF and the RAN device may be used to send data packets of a plurality of multicast services, and there is no member of any multicast service in the terminal devices served by the RAN device, the UPF sends, to the SMF, a message indicating that the RAN device does not include a member of any multicast, and the SMF instructs the RAN device and the UPF to remove the multicast transmission channel used to send the data packet of the first multicast service.

For a process in which the SMF instructs the RAN device and the UPF to remove the multicast transmission channel used to send the data packet of the first multicast service, refer to the description in operation 517 in the method 500. Details are not described again.

Operation 718: The UPF determines whether there is still a member of the first multicast service in a network served by the UPF.

That the UPF determines whether there is still a member of the first multicast service in a network served by the UPF includes: For example, the UPF reads the identifier of the first multicast service in the message sent by the RAN device for requesting to terminate the first multicast service, and checks the updated network-level multicast member list. If there is no valid information entry related to the first multicast service in the network-level multicast member list, the UPF may consider that there is no member of the first multicast service.

In one embodiment, the UPF may further send query information to determine whether there is still a member of the first multicast service in a terminal device served by the UPF. This includes: For example, the UPF sends an IGMP/MLD query message to query whether there is still a terminal device that needs to receive the first multicast service or a terminal device that needs to receive any multicast service in the network served by the UPF. The query message may be directly sent by the UPF to the RAN device, or sent by the UPF to the SMF and then sent by the AMF to the RAN device. After receiving the query message, the RAN device looks up the cell-level multicast member list maintained by the RAN device, and determines information about a member of the first multicast service or any multicast service. If there is still a valid information entry related to the first multicast service or any multicast service in the cell-level multicast member list, the RAN device sends, to the UPF, a message indicating that the RAN device requests to receive the first multicast service or any multicast service.

In one embodiment, before looking up the cell-level multicast member list maintained by the RAN device, the RAN device sends a query message to the terminal device served by the RAN device. The query message is used to query whether the terminal device further needs to receive the first multicast service or any multicast service. After the terminal device served by the RAN device (for example, the first terminal device) receives the query message, if the first terminal device has a first multicast service requirement or another multicast service requirement, or a second terminal device served by the first terminal device has a first multicast service requirement or another multicast service requirement, the first terminal device sends, to the RAN device, a report message (an IGMP join report) indicating the service requirement, and the RAN device updates, based on the report message, the cell-level multicast member list maintained by the RAN device.

For understanding of a process in which, in response to the query message of the UPF, the terminal device sends the report message for requesting the multicast service to the RAN device and the RAN device sends the message for requesting the multicast service to the UPF, refer to descriptions in operation 702 to operation 704. The UPF may update, based on a received message that is sent by any RAN device and that indicates the first multicast service requirement or any multicast service requirement, the network-level multicast member list maintained by the SMF. If the UPF does not receive, within a specified period of time after sending the query information, a report message that any RAN device requests to receive the first multicast service, the UPF may consider that there is no member of the first multicast service in the network served by the UPF.

For understanding of operation 719, refer to descriptions of operation 519 in the method 500. Details are not described again.

Operation 719 is an optional operation, and is performed when a result of operation 718 is that the UPF determines that there is no member of the first multicast service in the network served by the UPF.

It should be understood that a difference between the method 700 and the method 600 lies in that in the method 600, a management device performing multicast service management in a mobile core network is the SMF, but in the method 700, a management device performing multicast service management in a mobile core network is the UPF.

Therefore, in this embodiment, the UPF sends the data packet of the multicast service to the RAN in a multicast mode. This saves transmission resources of a backhaul link. In addition, the RAN device is configured with the IGMP proxy function, has the multicast service management capability, and can read the IGMP join report or the IGMP leave report sent by the first terminal device, maintain the cell-level multicast member list (the UPF does not need to send the cell-level multicast member notification message to the RAN device), and serve as a proxy of the terminal device served by the UPF to send the request message related to the multicast service. This may reduce signaling overheads and save transmission resources.

Figure 13A:
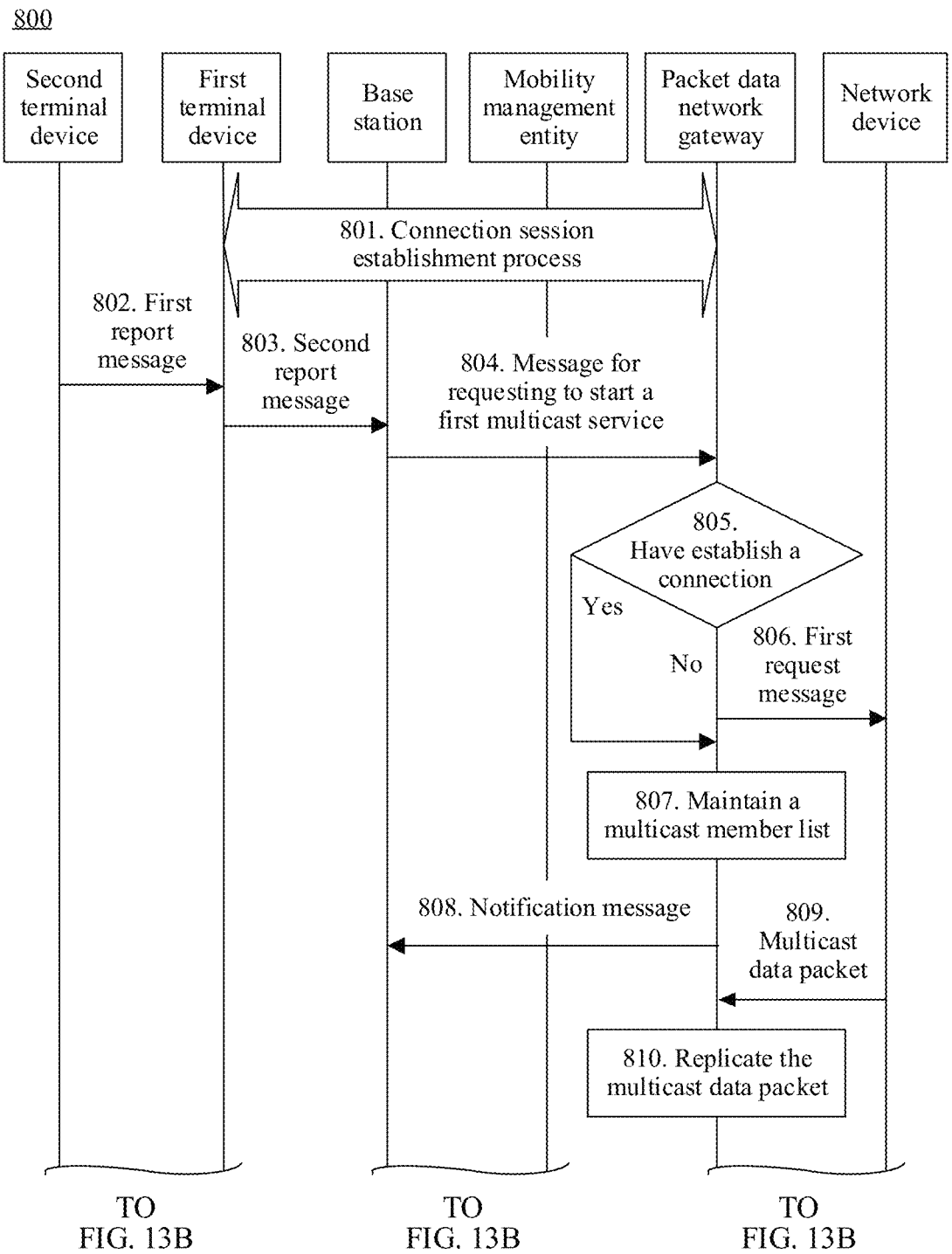
FIG. 13A and FIG. 13B are a schematic flowchart of a multicast service transmission method according to this application.
Figure 13B:
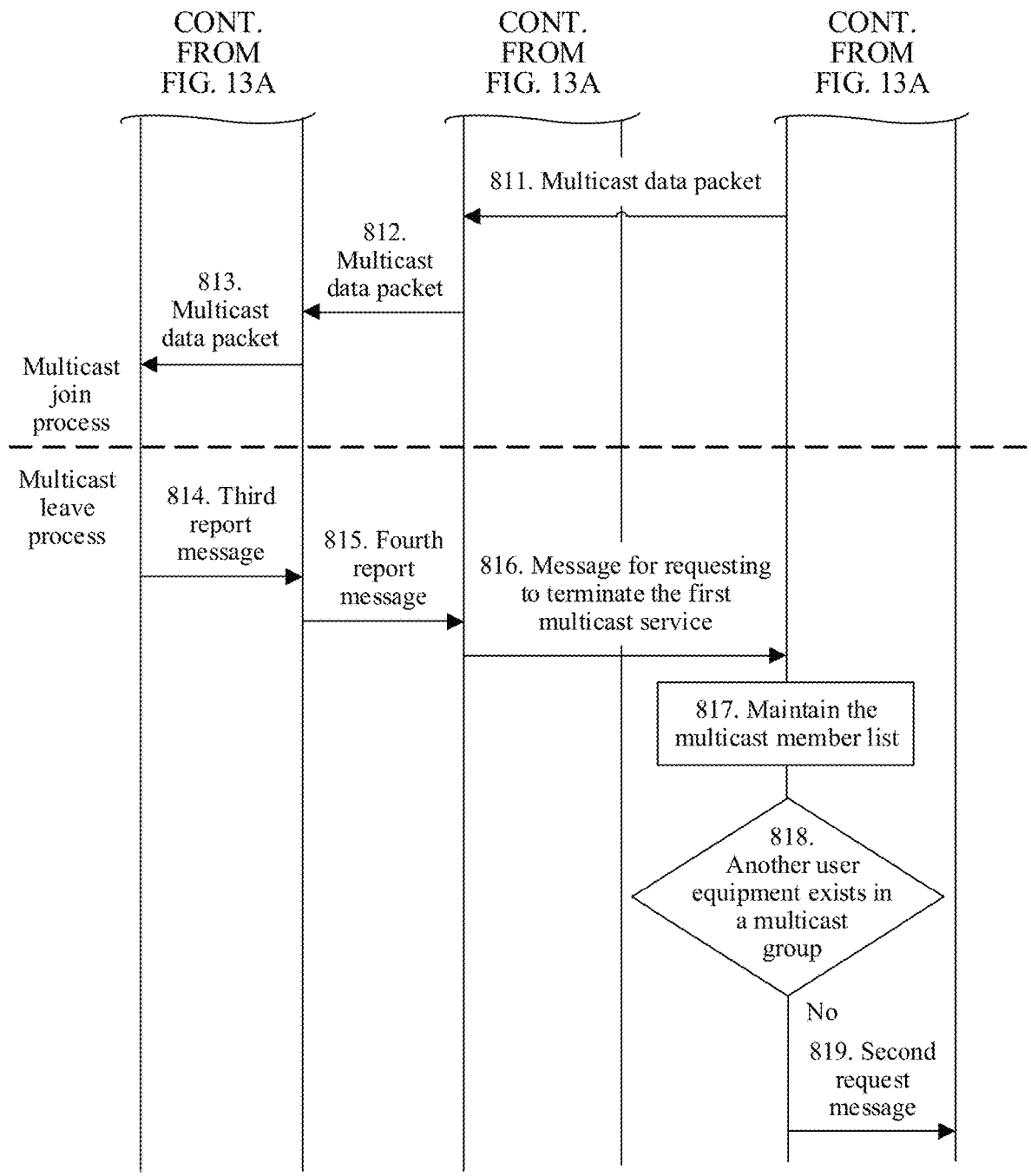

FIG. 13A and FIG. 13B are a schematic flowchart of a multicast service transmission method 800 in a 4G network architecture according to this application. In the method 800, a gateway device and a management device having a multicast service management function are a same device, namely, a PGW. A data packet of a multicast service is sent between the PGW and a terminal device in a unicast mode.

In this embodiment of this application, optionally, in an MBMS/eMBMS network architecture, the gateway device and the management device having the multicast service management function may alternatively be an MBMS GW. For steps of the method, refer to the method 800. During understanding, the PGW in the method 800 is replaced with the MBMS GW. In one embodiment, if an MCE exists in the MBMS/eMBMS network architecture, signaling (for example, including a message related to establishment of a multicast transmission channel) sent between a RAN device and an MME will be transmitted by using the MCE.

As shown in FIG. 13A and FIG. 13B, the method 800 includes the following content.

Operation 801: A first terminal device sends a session establishment/modification request message to a mobility management entity (MME) by using a RAN device such as an evolved NodeB eNB, to trigger a process of establishing or modifying a packet data network (PDN) connection.

In one embodiment, the connection establishment/modification request message includes indication information. The indication information is used to indicate that a PDN connection requested by the first terminal device needs to support a multicast service. The first terminal device may be a device such as a customer premises equipment CPE, a home gateway, or a mobile phone.

In one embodiment, the indication information is an explicit indication. For example, in the session establishment/modification request message, an indication bit is set. When the indication bit is 1, it indicates that the PDN connection that is requested to be established includes the multicast service. When the indication bit is 0, it indicates that the PDN connection that is requested to be established does not include the multicast service.

In one embodiment, the indication information may alternatively be an implicit indication. For example, according to a pre-agreement, an identifier such as a specific access point name (APN), data network name (DNN), network slice identifier (Slice ID), or slice type is used to indicate that the PDN connection that is request to be established needs to support a multicast service. For example, when it is agreed that the APN/DNN is an IPTV, or the slice ID indicates a network slice corresponding to a wireless broadband (WBB)/(Wireless To The x, WTTx), it indicates that the PDN connection requested to be established/modified needs to support a multicast service.

In the process of establishing the PDN connection supporting the multicast service, the MME needs to select a PGW supporting the multicast service, for example, a multicast PGW (multicast PGW, m-PGW), based on the multicast service indication information in the connection establishment/modification request of the first terminal device. Correspondingly, the PGW also needs to establish, based on indication information explicitly or implicitly included in a message that is sent by the MME and that includes a PDN connection establishment/modification request message of the first terminal device, an IP-CAN session with a policy control and charging rules function (PCRF) that supports the multicast service. If dynamic policy and charging control (PCC) is configured, the PGW obtains PCC rules from the PCRF, or the PGW obtains PCC rules according to a static PCC rule.

In the process of establishing the PDN connection supporting the multicast service, the PGW may provide, based on content included in the obtained PCC rules, a configuration function related to the multicast service. This includes: For example, the PGW obtains a QoS parameter corresponding to a bearer related to the multicast service, and configures a traffic flow template (TFT). The traffic flow template includes a TFT of the multicast service, and the TFT includes at least one group of packet filtering rules for the data packet of the multicast service. The PGW may instruct the PGW to map the data packet of the multicast service to a proper bearer (for example, an evolved packet system bearer EPS bearer) for sending. The PGW provides QoS profile information for the RAN device (for example, the eNB). The QoS profile information includes a QoS parameter configuration that is required by the RAN device and that is related to the multicast service, for example, a bearer related to the multicast service and a corresponding QoS parameter. The PGW may send the QoS profile information to the RAN device (through an S1 interface) by using the MME.

That a first terminal device sends a session establishment/modification request message to an MME by using a RAN device may be triggered by a multicast service session connection indication. This includes the following manners.

A second terminal device sends a first report message to the first terminal device. The first terminal device considers the first report message as the multicast service session connection indication. The first report message may be a message that the second terminal device requests to receive the multicast service, an access request, or the like. For example, the second terminal device is an STB, the first terminal device is a CPE, and the first report message sent by the STB to the CPE is an access request, an address allocation request (for example, DHCP discover), or a multicast service request (for example, an IGMP report message). After receiving the first report message, the CPE considers the first report message as the multicast service session connection indication, and sends the session establishment/modification request message to the MME by using the eNB, to trigger the process of establishing or modifying the PDN connection.

Alternatively, the first terminal device obtains the multicast service session connection indication based on a service request of an application layer. For example, the first terminal device supports the multicast service. If the service request of the application layer of the first terminal device corresponds to the multicast service, the first terminal device considers the service request of the application layer as the multicast service session connection indication, and sends the session establishment/modification request message to the MME by using the eNB, to trigger the process of establishing or modifying the PDN connection.

Alternatively, the first terminal device obtains the multicast service session connection indication based on service-related information in preconfigured information. For example, the first terminal device is a CPE, and the service-related information may be statically configured in the CPE, or the CPE obtains management/operation configuration information from a TR-069 server, where the management/operation configuration information includes the service-related information. If the service-related information indicates that a service supported by the CPE includes the multicast service (for example, a DNN/APN related to the IPTV exists in configuration information of the CPE), the CPE may consider the service-related information as the multicast service session connection indication, and send the session establishment/modification request message to the MME by using the RAN device, to trigger the process of establishing or modifying the PDN connection.

In one embodiment, the second terminal device may include a terminal device that can support the multicast service, for example, a set-top box STB, an internet television set, a mobile phone, and a computer.

In this embodiment of the present application, a plurality of different terminal devices (including the second terminal device) may be connected to the first terminal device, and then connected to a mobile network by using the first terminal device. Connections are established between the first terminal device and the plurality of different terminal devices, to form a local area network served by the first terminal device.

For understanding of operation 802, refer to descriptions of operation 202 in the method 200.

It should be noted that operation 802 is an optional operation. When the second terminal device has a multicast service requirement, operation 802 is performed.

In one embodiment, operation 802 may alternatively be performed before operation 801. In one embodiment, the first report message sent by the second terminal device to the first terminal device may be considered as the multicast service session connection indication by the first terminal device, and is used as a trigger condition for the first terminal device to send the session establishment/modification request message to the MME by using the RAN device in operation 801.

Operation 803: The first terminal device sends a second report message to the RAN device. The second report message is used by the first terminal device to request to receive the first multicast service. For understanding of details, refer to operation 203 in the method 200.

Operation 804: The RAN device sends, to the management device (for example, the PGW in this embodiment of this application) having the multicast service management function, a message for requesting to receive the first multicast service.

In an optional manner, that the RAN device sends, to the PGW, a message for requesting to receive the first multicast service includes: The RAN device receives the second report message sent by the first terminal device, and then directly sends the second report message to the PGW by using, for example, an EPS bearer corresponding to the first terminal device.

In another optional manner, the RAN device may send the second report message to the MME by using the PGW. In this manner, the first terminal device adds the second report message to a non-access stratum NAS message and sends the NAS message to the RAN device. After receiving the NAS message, the RAN device forwards the NAS message to an MME corresponding to the first terminal device, and then the MME forwards, to the PGW, the second report message carried in the NAS message or key information in the second report message carried in the NAS message. For understanding of a manner in which the first terminal device adds the second report message to the NAS message, refer to related descriptions in operation 204 of the method 200.

In one embodiment, the RAN device has a multicast service management capability. In one embodiment, the RAN device may maintain a cell-level multicast member list based on the received second report message (for example, the RAN device is configured with an IGMP proxy or IGMP snooping function, and can read an IGMP join report or IGMP leave report sent by the first terminal device and maintain the cell-level multicast member list). The cell-level multicast member list includes an identifier of the first multicast service and/or an identifier corresponding to a terminal device (including the first terminal device) that requests the first multicast service and that is served by the RAN device, and optionally further includes the identifier of the second terminal device.

For example, for understanding of a form of the cell-level multicast member list maintained by the RAN device, refer to related descriptions in operation 204 of the method 200. Details are not described herein again.

Operation 805: The PGW determines, based on the second report message, whether a connection related to the first multicast service has been established to the network device.

This includes: The PGW reads an address of the first multicast service and an identifier of the first terminal device that are in the second report message, and determines whether the PGW that provides the transmission service for the first multicast service of the first terminal device has established the connection related to the first multicast service to the network device.

In a possible example, the PGW may check a network-level multicast member list maintained by the PGW. If the network-level multicast member list includes at least one valid information entry related to the first multicast service, the PGW may consider that the PGW has established the connection related to the first multicast service to the network device; otherwise, the PGW may consider that the PGW has not established the connection related to the first multicast service to the network device. For the network-level multicast member list and/or content of the valid information entry related to the first multicast service in the network-level multicast member list, refer to descriptions in operation 807.

In the embodiment of the present application, the network device may be, for example, a device such as a router/gateway supporting IP multicast in a data network DN, a multicast query node, or a multicast service server.

Operation 806: The PGW sends a first request message to the network device. The first request message is used by the PGW to establish a connection related to the first multicast service to the network device.

For example, the PGW may send, to the network device by using a multicast management protocol such as IGMP/MLD or a multicast routing protocol such as PIM, a request message used to join the first multicast service (for example, send IGMP join) or used to join a multicast routing tree corresponding to the first multicast service (for example, send a graft request message for joining the multicast routing tree).

Operation 806 is an optional operation, and is performed when the PGW determines in operation 805 that the connection related to the first multicast has not been established to the network device.

Operation 807: The PGW maintains a network-level multicast member list.

The network-level multicast member list maintained by the PGW includes an identifier corresponding to each multicast service, and further includes an information entry related to a terminal device that needs to receive the multicast service, where the information entry corresponds to the multicast service. The terminal device that needs to receive the multicast service, for example, the first terminal device, is considered as one of a member of the multicast service. The information entry includes an identifier corresponding to the terminal device serving as the member of the multicast service. For understanding of the identifier, refer to the "identifier corresponding to the first terminal device" described in operation 203.

The network-level multicast member list maintained by the PGW may include: For example, the PGW reads the identifier of the first multicast service in the second report message and the identifier corresponding to the first terminal device, and optionally, the PGW may further read the identifier of the second terminal device in the second report message. If there is already a valid information entry corresponding to both the first terminal device and the first multicast service in the network-level multicast member list maintained by the PGW, the PGW may not need to update the network-level multicast member list. Otherwise, the PGW updates the network-level multicast member list. In one embodiment, the PGW adds the information entry corresponding to both the first terminal device and the first multicast service to the network-level multicast member list, or validates the information entry corresponding to both the first terminal device and the first multicast service. The information entry corresponding to both the first terminal device and the first multicast service includes the identifier corresponding to the first multicast service, and/or the identifier corresponding to the first terminal device, and optionally, further includes the identifier of the second terminal device.

For understanding of a form of the network-level multicast member list maintained by the PGW, refer to the corresponding descriptions of Table 3 and Table 4 in the method 200. It should be noted that, during understanding, the SMF is replaced with the PGW in this embodiment of this application.

Operation 805 to operation 807 are processes in which the PGW establishes the multicast connection based on the second report message and maintains the network-level multicast member list.

In one embodiment, when receiving the second report message, the PGW may first maintain the network-level multicast member list. For details of a process of maintaining the network-level multicast member list by the PGW, refer to operation 807. After maintaining the network-level multicast member list, the PGW determines, based on the second report message, whether the PGW that provides the transmission service for the first multicast service of the first terminal device has established the connection related to the first multicast service to the network device. For this process, refer to operation 805. If the PGW determines that the PGW has not established the connection related to the first multicast service to the network device, the PGW sends the first request message to the network device, where the first request message is used by the PGW to request to establish the connection related to the first multicast service to the network device. For this process, refer to operation 806. In other words, operation 807 may be performed before steps 805 and 806. Whether the PGW first maintains the network-level multicast member list or first determines whether the PGW that provides the transmission service for the first multicast service of the first terminal device has established the connection related to the first multicast service to the network device is not limited in this application.

Operation 808: The PGW sends a cell-level multicast member notification message to the RAN device.

The cell-level multicast member notification message includes the identifier of the first multicast service and/or identifiers corresponding to all terminal devices that are served by the RAN device and that are in the members of the first multicast service. Alternatively, the cell-level multicast member notification message includes indication information used to instruct to add the first terminal device to the members of the first multicast service, where the first terminal device is served by the RAN device.

In a possible example, the PGW may send the cell-level multicast member notification message to the RAN device by using the MME. Alternatively, in another possible example, the PGW sends the cell-level multicast member notification message directly to the RAN device or sends the cell-level multicast member notification message to the RAN device by using the SGW.

Operation 808 is an optional operation. For example, when the data packet of the multicast service is sent between the PGW and the RAN device in a multicast mode, and the RAN device does not have the multicast service management capability described in operation 804, operation 808 is performed. Operation 808 may not be performed when the data packet of the multicast service is sent between the PGW and the RAN device (or the terminal device) in a unicast mode or when the RAN device has the multicast service management capability described in operation 804.

Operation 809: The network device sends a data packet of the first multicast service to the PGW.

Operation 810: The PGW receives the data packet that is of the first multicast service and that is sent by the network device, and replicates the data packet of the first multicast service.

In an optional manner, that the PGW replicates the data packet of the first multicast service includes: The PGW queries the network-level multicast member list, learns of terminal devices that are served by the PGW and that are members of the first multicast service, and then replicates the data packet based on a quantity of the members of the first multicast.

In one embodiment, the PGW may further add an identifier corresponding to a terminal device and/or information related to QoS guarantee to a replicated data packet. For example, network-level multicast member information maintained by the PGW is shown in Table 3. The first multicast service corresponds to a program 1, and members of the first multicast service include $UE_{11}$, $UE_{12}$, and $UE_{21}$. After receiving a data packet of the program 1, the PGW replicates three copies of the data packet, and sends replicated data packets to $UE_{11}$, $UE_{12}$, and $UE_{21}$ respectively. In one embodiment, the PGW may add, to the replicated data packet, a GTP tunnel identifier corresponding to the EPS bearer of the terminal device and the like.

Operation 811: The PGW sends the data packet of the first multicast service to the RAN device.

The PGW maps the replicated data packet of the first multicast service to the EPS bearer of the first terminal device based on a QoS-related configuration (for example, a multicast service flow template TFT), and sends the data packet to the RAN device. The RAN device serves the first terminal device, and the first terminal device is one of the members of the first multicast service.

Operation 812: The RAN device receives the data packet that is of the first multicast service and that is sent by the PGW, and sends the data packet of the first multicast service to the first terminal device.

That the RAN device receives the data packet that is of the first multicast service and that is sent by the PGW, and sends the data packet of the first multicast service to the first terminal device includes: For example, the data packet that is of the first multicast service and that is received by the RAN device carries the identifier corresponding to the first terminal device (for example, the GTP tunnel identifier corresponding to the EPS bearer of the first terminal device). Therefore, the RAN device may determine that the data packet of the first multicast service needs to be sent to the first terminal device. In one embodiment, the RAN device determines the EPS bearer based on the GTP tunnel identifier carried in the data packet of the first multicast service, and/or maps the data packet to an air interface radio bearer RB based on a correspondence between the EPS bearer and the RB, and sends the data packet to the first terminal device. The correspondence between the EPS bearer and the RB is determined by the RAN device based on bearer configuration information sent by the management device.

For understanding of operation 813 to operation 815, refer to operation 214 to operation 216 in the method 200. Details are not described again.

Operation 816: The RAN device sends, to the management device (for example, the PGW in this embodiment of this application) having the multicast service management function, a message for requesting to terminate the first multicast service.

In an optional manner, that the RAN device sends, to the PGW, a message for requesting to terminate the first multicast service includes: The RAN device receives the fourth report message sent by the first terminal device, and then directly sends the fourth report message to the PGW by using, for example, an EPS bearer corresponding to the first terminal device.

In another optional manner, the RAN device may send the fourth report message to the MME by using the PGW. In this manner, the first terminal device adds the fourth report message to a non-access stratum NAS message and sends the NAS message to the RAN device. After receiving the NAS message, the RAN device forwards the NAS message to an MME corresponding to the first terminal device, and then the MME forwards, to the PGW, the fourth report message carried in the NAS message or key information in the fourth report message carried in the NAS message. For understanding of a manner in which the first terminal device adds the fourth report message to the NAS message, refer to related descriptions in operation 217 of the method 200.

In one embodiment, the RAN device has the multicast service management capability. In one embodiment, the RAN device may maintain the cell-level multicast member list based on the received fourth report message. For example, the RAN device is configured with the IGMP snooping function or the IGMP proxy function, and maintains the cell-level multicast member list shown in Table 2. The RAN device reads the fourth report message sent by the first terminal device ($UE_{13}$), where the fourth report message is an IGMP leave report that $UE_{13}$ requests to leave the first multicast service (corresponding to the program 1), and in the cell-level multicast member list maintained by the RAN device, the RAN device may delete the information entry that is of $UE_{13}$ and that is corresponding to the program 1, or set a value of the "Valid or not" column in the fourth column of the information entry that is of $UE_{13}$ and that is corresponding to the program 1 to 0, to indicate that information in this row is invalid.

Operation 817: The PGW maintains the network-level multicast member list based on the fourth report message.

For understanding of a form of the network-level multicast member list maintained by the PGW, refer to descriptions in operation 807.

That the PGW maintains the network-level multicast member list based on the fourth report message may include: For example, the PGW reads the identifier of first multicast service and the identifier corresponding to the first terminal device that are included in the fourth report message, where the fourth report message optionally further includes the identifier of the second terminal device; and the PGW updates the network-level multicast member list, that is, deletes an information entry corresponding to both the first terminal device and the first multicast service from the network-level multicast member list, or invalidates an information entry corresponding to both the first terminal device and the first multicast service. The information entry corresponding to both the first terminal device and the first multicast service includes the identifier corresponding to the first multicast service, and/or the identifier corresponding to the first terminal device, and optionally, further includes the identifier of the second terminal device.

For example, the network-level multicast member list maintained by the PGW is shown in Table 3. If the fourth report message is a message that the terminal device $UE_{21}$ requests to terminate the program 1, the PGW deletes, from the network-level multicast member list, an information entry that is of the terminal device $UE_{21}$ and that is corresponding to the address of the program 1. The information entry includes an identifier of an access network device $RAN_2$. Alternatively, the network-level multicast member list maintained by the PGW is shown in Table 4. If the fourth report message is a message that the terminal device $UE_{21}$ requests to terminate the program 1, and an access network $RAN_2$ serves $UE_{21}$, the PGW sets the "Valid or not" column in the information entry that is of the terminal device $UE_{21}$, that is in the network-level multicast member list, and that is corresponding to the address of the program 1 to 0, to indicate that the information in this row is invalid.

Operation 818: The PGW determines whether there is still a member of the first multicast service in a network served by the PGW.

That the PGW determines whether there is still a member of the first multicast service in a network served by the PGW includes: For example, the PGW reads the address of the first multicast service in the fourth report message, and checks the updated network-level multicast member list. If there is no valid information entry related to the first multicast service in the network-level multicast member list, the PGW may consider that there is no member of the first multicast service.

In one embodiment, that the PGW may further send query information to determine whether there is still a member of the first multicast service in the terminal device served by the PGW includes: For example, the PGW sends an IGMP/MLD query message to query whether there is still a terminal device that needs to receive the first multicast service or a terminal device that needs to receive any multicast service in the network served by the PGW, where the query message may be sent by the PGW to the terminal device by using the MME and the RAN device, or sent by the PGW to the terminal device by using the RAN device. After receiving the query message, if there is a first multicast service requirement or another multicast service requirement, the terminal device sends a report packet indicating the service requirement to the PGW. For a sending process, refer to operation 802 to operation 804. The PGW may update, based on a received report packet that is sent by any terminal device and that indicates the first multicast service requirement or any multicast service requirement, the network-level multicast member list maintained by the PGW. If the PGW does not receive, within a specified period of time after sending the query information, a report message that any terminal device requests to receive the first multicast service, the PGW may consider that there is no member of the first multicast service in the network served by the PGW.

Operation 819: The PGW sends a second request message to the network device. The second request message is used by the PGW to request the network device to disconnect the connection related to the first multicast.

For example, the PGW may send, to the network device by using a multicast management protocol such as IGMP/MLD or a multicast routing protocol such as PIM, a request message used to leave the first multicast service (for example, send the IGMP leave report) or leave the multicast routing tree corresponding to the first multicast service (for example, the PGW sends a prune request message for leaving the multicast routing tree). In the embodiments of the present application, the network device includes, for example, a multicast router in the data network, a query node, or a multicast server.

Operation 819 is an optional operation, and is performed when a result of operation 818 is that the PGW determines that there is no member of the first multicast service in the terminal devices served by the PGW.

Operation 817 to operation 819 are processes in which the PGW instructs, based on the fourth report message, the PGW to remove the multicast connection and maintain the network-level multicast member list.

It should be understood that a difference between the method 800 and the method 200 or the method 300 lies in that architectures of application scenarios are different. The method 200 is applied to a 5G scenario, and the method 800 is applied to a 4G scenario. A management device that performs multicast service management in a mobile core network is a PGW. For a process of some steps in the method 800, refer to corresponding steps in the method 200 or the method 300.

Therefore, in this embodiment of this application, the PGW processes a report message of the terminal device, maintains the network-level multicast member list, and instructs the gateway device PGW to maintain the multicast connection to the network device. The PGW receives the data packet of the multicast service from the network device, replicates the data packet of the multicast service, and sends, in a unicast mode and according to the QoS rule configured by the PGW, the data packet of the multicast service to the terminal device by using the RAN device, so that the terminal device may obtain the multicast service by using a wireless network.

Figure 14A:
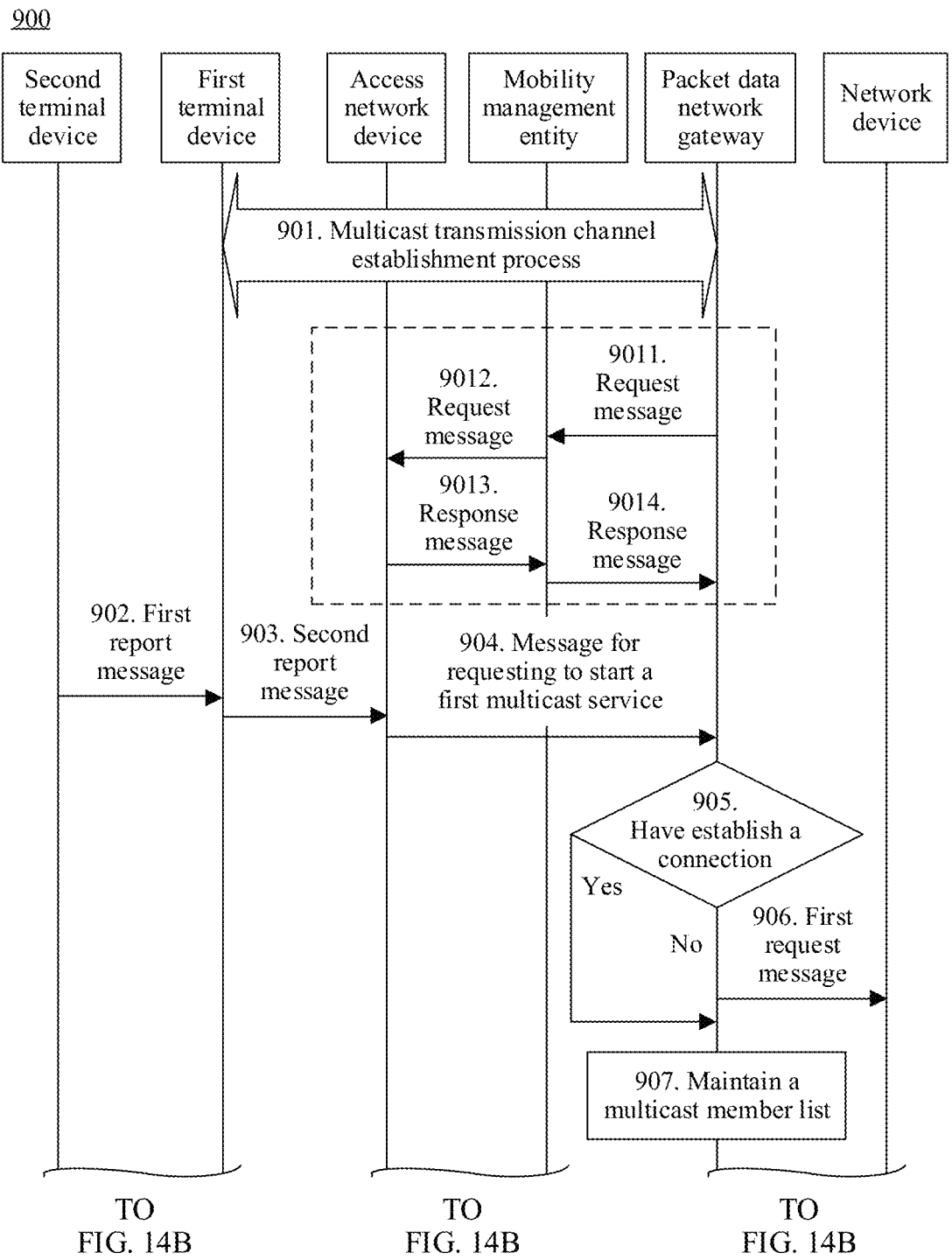
FIG. 14A and FIG. 14B are a schematic flowchart of a multicast service transmission method according to this application.
Figure 14B:
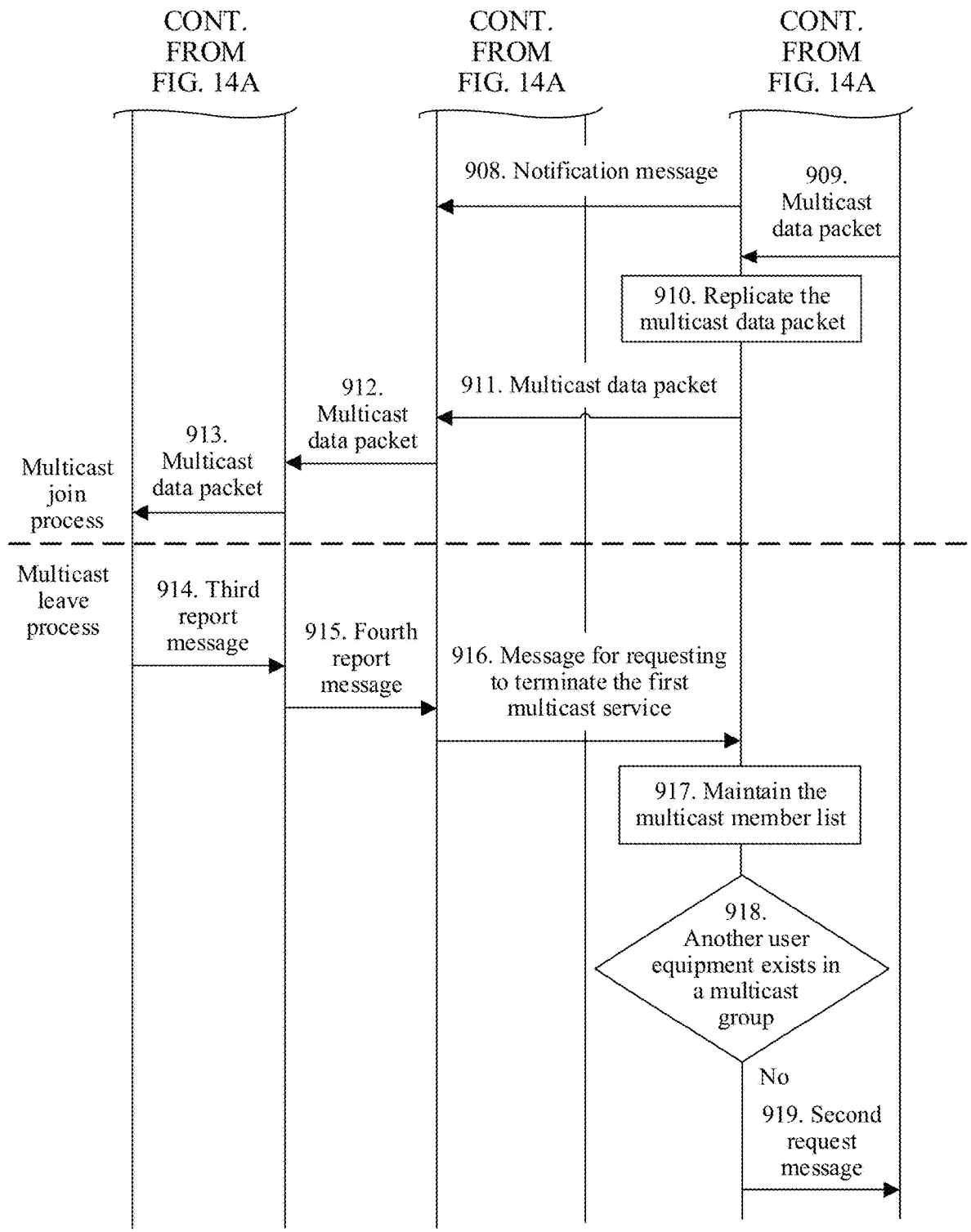

FIG. 14A and FIG. 14B is a schematic flowchart of a multicast service transmission method 900 in a 4G network architecture according to this application. In the method 900, a gateway device and a management device having a multicast service management function are a same PGW. A data packet of a multicast service is sent between the PGW and a RAN device in a multicast mode.

In one embodiment, in this embodiment of this application, in an MBMS/eMBMS network architecture, the gateway device and the management device having the multicast service management function may alternatively be an MBMS GW. For ease of description, in this embodiment of this application, the solution is described by using an example in which the management device and the gateway device are the PGW. For steps and the method in the MBMS/eMBMS network architecture, refer to this embodiment of this application. During understanding, the PGW in the method 900 is replaced with the MBMS GW. In one embodiment, if an MCE exists in the MBMS/eMBMS network architecture, signaling (for example, including a message related to establishment of a multicast transmission channel) sent between a RAN device and an MME will be transmitted by using the MCE.

As shown in FIG. 14A and FIG. 14B, the method 900 includes the following content.

Operation 901: A management device (for example, a PGW/MBMS GW that supports multicast) that performs multicast session management receives a message used for triggering establishment of a multicast transmission channel, and then triggers a process of establishing the multicast transmission channel.

The multicast transmission channel means a channel (for example, a GTP-U tunnel for sending a data packet of a multicast service) that is between the gateway device and the RAN device and that is used to send the data packet of the multicast service. In the 4G architecture, a multicast S1 tunnel is established between the PGW and the RAN device. Alternatively, in the MBMS architecture, a multicast M1 tunnel is established between the MBMS GW and the RAN device.

A mode for triggering the management device that performs multicast session management to start the process of establishing the multicast transmission channel includes but is not limited to the following three modes.

In a first mode, this process is triggered by a multicast service request of a terminal device. In this case, a message for triggering establishment of the multicast transmission channel may be, for example, a report message (for example, an IGMP join report) that is sent by the terminal device based on a multicast management protocol (such as an IGMP/MLD protocol) and that is used to request to receive a first multicast service. For example, when receiving an IGMP join report that is sent by a first terminal device and that is used to request to receive the first multicast service, the PGW establishes a multicast S1 tunnel between the PGW and a RAN device serving the first terminal device. The IGMP join report may be sent by the first terminal device to the PGW by using the RAN device and the MME, or may be sent by the first terminal device to the PGW by directly using the RAN device. Alternatively, the message for triggering establishment of the multicast transmission channel may be, for example, a session establishment/modification request message sent by the terminal device, where the session establishment/modification request message includes multicast service indication information. For example, the session establishment/modification request message sent by the first terminal device to the MME by using the RAN device includes multicast service indication information, indicating that the first terminal device has a multicast service requirement. The MME sends the session establishment/modification request message of the first terminal device to the PGW. The PGW establishes, based on the multicast service indication information in the request message, a multicast S1 tunnel between the PGW and a RAN device serving the first terminal device.

In a second mode, this process is triggered by a network service configuration. In this case, in a mobile network, a multicast transmission channel needs to be pre-established based on service configuration planning, and a message for triggering establishment of the multicast transmission channel may be sent by a service management platform (for example, a BM-SC) in the mobile network to a management device (for example, a PGW/MBMS GW) that performs multicast session management, to trigger the process of starting establishment of the multicast transmission channel.

In a third mode, this process is triggered by a multicast service platform. In this case, a multicast service request of a terminal device is sent to the multicast service platform (for example, a service request sent by using an application layer protocol is invisible to a gateway device and a RAN device that are in a mobile network). The multicast service platform is located in the mobile network (for example, the multicast service platform is a BM-SC) or is outside the scope of the mobile network (for example, in a data network). The multicast service platform may send a message for requesting transmission of a multicast service to a device in the mobile network (for example, a service management device BM-SC/PCRF in the mobile network), and then the service management device in the mobile network sends, to a management device (for example, a PGW/MBMS GW) that performs multicast session management, the message for triggering establishment of the multicast transmission channel, to trigger the process of starting establishment of the multicast transmission channel.

The following steps 9011 to 9014 are the process that is of establishing the multicast transmission channel and is described by using the 4G network architecture as an example.

Operation 9011: The PGW sends, to the MME, a request message used for establishing the multicast transmission channel, where the request message includes configuration information of the multicast transmission channel, and the configuration information of the multicast transmission channel includes one or more of the following content: a multicast tunnel endpoint identity M-TEID, a QoS parameter configuration corresponding to a multicast tunnel (including parameters such as a QFI class identifier (QCI) corresponding to the multicast service, an allocation and retention priority (ARP), and a guaranteed bit rate (GBR), and a maximum bit rate (MBR)), an identifier corresponding to the multicast service, a multicast source address, a multicast bearer identifier, and the like.

In a possible manner, the M-TEID corresponds to one multicast service. In other words, different multicast services correspond to different multicast transmission channels. In another possible manner, the M-TEID is corresponding to a plurality of multicast services. When data packets of the multicast services are transmitted between the PGW and the RAN device, different multicast services multiplex a same multicast transmission channel.

In one embodiment, when receiving data packets of a same multicast service from one PGW, a plurality of RAN devices may use a same M-TEID. In other words, different RAN devices are configured with a same M-TEID, or different RAN devices may be configured with different M-TEIDs respectively.

Operation 9012: The MME receives the request message used for establishing the multicast transmission channel, stores information about the multicast transmission channel included in the request message, and forwards, to the RAN device, the request message used for establishing the multicast transmission channel.

Operation 9013: The RAN device receives the request message used for establishing the multicast transmission channel, and if the RAN device accepts the configuration information of the multicast transmission channel included in the request message, and completes configuration of the multicast transmission channel based on the configuration information, the RAN device returns the multicast channel acknowledgment response message to the MME, to indicate to a core network device that the configuration of the multicast transmission channel of the RAN device is completed. Otherwise, the RAN device returns the multicast channel rejection response message to the MME, to indicate to the core network device that the RAN device cannot establish the multicast transmission channel based on the configuration information of the multicast transmission channel.

In one embodiment, the RAN device may describe, in the multicast channel rejection response message, a reason why the multicast transmission channel cannot be established, for example, an M-TEID conflicts with another unicast TEID configured by the RAN device.

Operation 9014: The MME receives the multicast channel acknowledgment response message or the multicast channel rejection response message sent by the RAN device, and forwards the multicast channel acknowledgment response message or the multicast channel rejection response message to the PGW.

The PGW receives the multicast channel acknowledgment response message. The multicast channel acknowledgment response message includes the configuration information of the multicast transmission channel. For understanding of descriptions of the configuration information of the multicast transmission channel, refer to corresponding content in operation 9011. The PGW completes configuration of the multicast transmission channel based on the configuration information of the multicast transmission channel. Alternatively, the PGW receives the multicast channel rejection response message.

In an optional solution, the multicast channel fails to be established, and a procedure ends. The PGW sends the data packet of the multicast service to the terminal device in a unicast mode. Refer to related descriptions of the method 800 in the embodiments of the present application.

In another optional solution, the PGW receives the multicast channel rejection response message, and the PGW views the reason why the RAN device cannot establish the multicast transmission channel, modifies the configuration information of the multicast transmission channel, and then performs operation 9011 again.

It should be noted that, in a possible manner, before operation 901, the first terminal device has established a PDN connection supporting the multicast service with the mobile network, but does not support a multicast send mode between a network device and the RAN device. Alternatively, in another possible manner, operation 901 is performed in a process of establishing, by the first terminal device, a PDN connection supporting multicast with the mobile network. Alternatively, in another possible manner, operation 901 is performed before the first terminal device establishes a PDN connection supporting the multicast service with the mobile network. For a process in which the first terminal device establishes the PDN connection supporting the multicast service with the mobile network, refer to descriptions of operation 801 in the method 800.

For understanding of operation 902 to operation 904, refer to descriptions of operation 802 to operation 804 in the method 800. Details are not described again.

In an optional manner, operation 902 to operation 904 may be performed before operation 901. That the PGW receives, in operation 904, the message that the RAN device requests to receive the first multicast service, and triggers the process of starting establishment of the multicast transmission channel corresponds to the first of the three triggering modes described in operation 901 of the method 900. In other words, the multicast service request of the terminal device triggers the management device that performs multicast session management to start the process of establishing the multicast transmission channel.

Operation 905: The PGW determines whether a connection related to the first multicast service has been established to the network device.

This includes: The PGW reads an address of the first multicast service and an identifier of the first terminal device that are in the second report message, and determines whether the PGW that provides the transmission service for the first multicast service of the first terminal device has established the connection related to the first multicast service to the network device.

For understanding of operation 905, refer to descriptions of operation 805 in the method 800. Details are not described again.

Operation 906: The PGW sends a first request message to the network device. The first request message is used by the PGW to establish a connection related to the first multicast service to the network device.

For example, the PGW may send, to the network device by using a multicast management protocol such as IGMP/MLD or a multicast routing protocol such as PIM, a request message used to join the first multicast service (for example, send IGMP join) or used to join a multicast routing tree corresponding to the first multicast service (for example, send a graft request message for joining the multicast routing tree).

Operation 906 is an optional operation, and is performed when the PGW determines in operation 905 that the connection related to the first multicast has not been established to the network device.

In another optional manner, for the MBMS/eMBMS architecture, in operation 906, the MBMS GW may further send the first request message to the BM-SC, where the first request message is used to request the BM-SC to establish the connection related to the first multicast service to the network device, or is used to request the BM-SC to receive the data packet of the first multicast service.

Operation 907: The PGW maintains a network-level multicast member list.

For understanding of operation 907, refer to descriptions of operation 807 in the method 800. Details are not described again.

Operation 905 to operation 907 are processes in which the PGW establishes the multicast connection and maintains the network-level multicast member list.

In one embodiment, the PGW may first maintain the network-level multicast member list, and then establish the connection related to the first multicast service to the network device. In other words, operation 907 is performed before operation 905, or operation 907 is performed before operation 906. Whether the PGW first maintains the network-level multicast member list or first determines whether the PGW has established the connection related to the first multicast service to the network device is not limited in this application.

Operation 908: The PGW sends a notification message to the RAN device.

The notification message sent by the PGW to the RAN device includes a cell-level multicast member notification message. The cell-level multicast member notification message includes the identifier of the first multicast service and/or identifiers corresponding to all terminal devices that are served by the RAN device and that are in members of the first multicast service. Alternatively, the cell-level multicast member notification message includes indication information used to instruct to add the first terminal device to a member of the first multicast service, where the first terminal device is served by the RAN device. The RAN device maintains a cell-level multicast member list based on the cell-level multicast member notification message. For understanding of a form and content of the cell-level multicast member list, refer to corresponding descriptions in operation 904. If the RAN device has the multicast service management capability described in operation 904, the PGW may not need to send the cell-level multicast member notification message to the RAN device. This reduces signaling overheads and saves radio resources.

In one embodiment, the PGW determines a send mode of the data packet of the first multicast service between the terminal device and the RAN device. The PGW further sends second configuration information to the RAN device. The second configuration information includes first indication information used to indicate a send mode of the data packet of the first multicast service between the gateway device and the RAN device, and/or second indication information used to indicate a mode in which the RAN device sends the data packet of the first multicast service to the terminal device. In a possible manner, the notification message sent by the PGW to the RAN device includes the second configuration information.

In a possible example, the PGW may send the notification message to the RAN device by using the MME. Alternatively, in another possible example, the PGW sends the cell-level multicast member notification message directly to the RAN device or sends the cell-level multicast member notification message to the RAN device by using the SGW.

Operation 908 is an optional operation. For example, when the data packet of the multicast service is sent between the PGW and the RAN device in a multicast mode, and the RAN device does not have the multicast service management capability described in operation 903, operation 908 is performed. Operation 908 may not be performed when the data packet of the multicast service is sent between the PGW and the RAN device (or the terminal device) in a unicast mode or when the RAN device has the multicast service management capability described in operation 903.

Operation 909: The network device sends a data packet of the first multicast service to the PGW.

Operation 910: The PGW receives the data packet that is of the first multicast service and that is sent by the network device, and replicates the data packet of the first multicast service.

That the PGW replicates the data packet of the first multicast service includes: The PGW queries the network-level multicast member list, learns of terminal devices that are served by the PGW and that are members of the first multicast service, and/or information about RAN devices that serve the terminal devices, and then replicates the data packet based on a quantity of the RAN devices that serve the members of the first multicast. In one embodiment, the PGW may add, to a replicated data packet, one or more of the following information: information related to QoS guarantee, an identifier corresponding to the RAN device, an identifier corresponding to the first multicast service, and the like. For example, multicast member information maintained by the PGW is shown in Table 3. The first multicast service corresponds to a program 1, and the members of the first multicast service include $UE_{11}$, $UE_{12}$, and $UE_{21}$. A RAN' device serves $UE_{11}$ and $UE_{12}$, and a $RAN_2$ device serves $UE_{21}$. After receiving a data packet of the program 1, the PGW needs to replicate two copies of the data packet based on the quantity of the RAN device serving the members of the first multicast, and sends replicated data packets to the RAN' device and the $RAN_2$ device respectively. In one embodiment, the PGW may add, to the replicated data packet, one or more of the following information: an identifier of a bearer to which the data packet of the first multicast service is mapped, an identifier of a multicast tunnel between the PGW and the RAN device (for example, an identifier M-TEID of a multicast transmission tunnel that is between the PGW and the RAN device and that corresponds to the multicast service), and the identifier corresponding to the first multicast service (for example, an identifier M-TEID 1 of the multicast transmission tunnel that is between the PGW and the RAN device and that corresponds to the first multicast service, or another identifier that can be uniquely mapped to the first multicast service).

Operation 911: The PGW sends the data packet of the first multicast service to the RAN device.

The replicated data packet of the first multicast service is mapped to a proper bearer (for example, a multicast bearer) based on a QoS-related configuration (for example, a multicast traffic flow template TFT), and is sent to the RAN device through a multicast transmission tunnel between the PGW and the RAN device. The RAN device serves the first terminal device, and the first terminal device is one of the members of the first multicast service.

Operation 912: The RAN device receives the data packet that is of the first multicast service and that is sent by the PGW, and sends the data packet of the first multicast service to the first terminal device.

In an optional manner, the data packet that is of the first multicast service and that is received by the RAN device carries the identifier (for example, the M-TEID 1, an IP address of the first multicast service, or another identifier that can be uniquely mapped to the first multicast service) corresponding to the first multicast service. The RAN device determines, based on the identifier, that the data packet is the data packet of the first multicast service, and learns, based on the cell-level multicast member list maintained by the RAN device, of terminal devices that are served by the RAN device and that are members of the first multicast service.

If the notification message sent by the PGW to the RAN device in operation 908 includes second indication information used to indicate the send mode of the data packet of the first multicast service between the RAN device and the terminal device, the RAN device may determine, based on the second indication information, that a send mode of the data packet of the first multicast service through an air interface is unicast or multicast. Alternatively, the RAN device determines, based on information (for example, a quantity of terminal devices requesting the first multicast service, and/or quality information of links between the terminal devices and the RAN device) included in the cell-level multicast member list maintained by the RAN device, that a send mode of the data packet of the first multicast service through an air interface is unicast or multicast.

If the RAN device determines to send the data packet of the first multicast service to the terminal device through an air interface in a unicast mode, the RAN device replicates a plurality of copies of the received data packet of the first multicast service (for example, the RAN device performs replication based on a quantity of the members of the first multicast service in the terminal devices served by the RAN device), and then sends replicated data packets respectively to the terminal devices (including the first terminal device) serving as the members of the first multicast service; or, if the RAN device determines to send the data packet of the first multicast service to the terminal device through an air interface in a multicast mode, the RAN device may configure a uniform air interface scheduling identifier for these terminal devices, where the uniform air interface scheduling identifier corresponds to the first multicast service, and the RAN device sends, by using the uniform air interface scheduling identifier, the data packet of the first multicast service to the terminal devices (including the first terminal device) serving as the members of the first multicast service.

Operation 913 to operation 915 are the same as operation 813 to operation 815 in the method 800. For understanding, refer to corresponding descriptions. Details are not described herein again.

Operation 916: The RAN device sends, to the management device (for example, the PGW in this embodiment of this application) having the multicast service management function, a message for requesting to terminate the first multicast service.

In an optional manner, that the RAN device sends, to the PGW, a message for requesting to terminate the first multicast service includes: The RAN device receives the fourth report message sent by the first terminal device, and then directly sends the fourth report message to the PGW by using, for example, an EPS bearer corresponding to the first terminal device.

In another optional manner, the RAN device may send the fourth report message to the MME by using the PGW. In this manner, the first terminal device adds the fourth report message to a NAS message and sends the NAS message to the RAN device. After receiving the NAS message, the RAN device forwards the NAS message to an MME corresponding to the first terminal device, and then the MME forwards, to the PGW, the fourth report message carried in the NAS message or key information in the fourth report message carried in the NAS message. For understanding of a manner in which the first terminal device adds the fourth report message to the NAS message, refer to related descriptions in operation 217 of the method 200.

In one embodiment, the RAN device has the multicast service management capability. In one embodiment, the RAN device may maintain the cell-level multicast member list based on the received fourth report message. For example, an eNB is configured with an IGMP snooping function or an IGMP proxy function, and maintains the cell-level multicast member list shown in Table 2. The RAN device reads the fourth report message sent by the first terminal device ($UE_{13}$), where the fourth report message is an IGMP leave report that $UE_{13}$ requests to leave the first multicast service (corresponding to the program 1), and in the cell-level multicast member list maintained by the RAN device, the RAN device may delete the information entry that is of $UE_{13}$ and that is corresponding to the program 1, or set a value of the "Valid or not" column in the fourth column of the information entry that is of $UE_{13}$ and that is corresponding to the program 1 to 0, to indicate that information in this row is invalid.

Operation 917: The PGW maintains the network-level multicast member list based on the fourth report message.

That the PGW maintains the network-level multicast member list based on the fourth report message may include: For example, the PGW reads the identifier of first multicast service and the identifier corresponding to the first terminal device that are included in the fourth report message, where the fourth report message optionally further includes the identifier of the second terminal device; and the PGW updates the network-level multicast member list, that is, deletes an information entry corresponding to both the first terminal device and the first multicast service from the network-level multicast member list, or invalidates an information entry corresponding to both the first terminal device and the first multicast service. The information entry corresponding to both the first terminal device and the first multicast service includes the identifier corresponding to the first multicast service, and/or the identifier corresponding to the first terminal device, and optionally, further includes the identifier of the second terminal device.

For understanding of a form of the network-level multicast member list maintained by the PGW, refer to the corresponding descriptions of the network-level multicast member list maintained by the management device in operation 208 of the method 200. It should be noted that, during understanding, the management device is changed from the SMF to the PGW in this embodiment of this application.

In one embodiment, if the RAN device does not have the multicast service management capability described in operation 916, the PGW updates the network-level multicast member list based on the fourth report message, for example, deletes the information entry corresponding to both the first terminal device and the first multicast service from the multicast member list. The PGW may send a cell-level multicast member notification message to the RAN device, so that the RAN device learns that the first terminal device should be removed from the members corresponding to the first multicast service. After receiving the data packet of the first multicast service, the RAN device no longer sends the data packet to the first terminal device. For content and a send mode of the cell-level multicast member notification message sent by the PGW to the RAN device, refer to descriptions in operation 908.

In one embodiment, if the PGW updates the network-level multicast member list based on the fourth report message, and the PGW determines that the send mode of the data packet of the first multicast service between the PGW and the RAN device changes (for example, changes from the multicast mode to the unicast mode), or the PGW determines that the send mode of the data packet of the first multicast service between the RAN device and the terminal device changes (for example, changes from the multicast mode to the unicast mode), the PGW sends the second configuration information to the RAN device. For content and a send mode of the second configuration information, refer to descriptions in operation 908.

In one embodiment, after the PGW updates the network-level multicast member list based on the fourth report message, if there is no member of the first multicast service in the terminal devices served by the RAN device, and a multicast transmission channel (for example, the multicast S1/M1 tunnel established by performing operation 9011 to operation 9014) that is used to send the data packet of the first multicast service and that is between the PGW and the RAN device corresponds only to the first multicast service (for example, a multicast transmission tunnel corresponding to the identifier M-TEID 1 and used to send the data packet of the first multicast service), the PGW instructs the RAN device and the UPF to remove the multicast transmission channel used to send the data packet of the first multicast service; or, if the multicast transmission channel that is used to send the data packet of the first multicast service and that is between the PGW and the RAN device may be used to send data packets of a plurality of multicast services, and there is no member of the multicast service in the terminal devices served by the RAN device, the PGW instructs the RAN device to remove the multicast transmission channel used to send the data packet of the first multicast service, to release resources related to the multicast transmission channel.

That the PGW instructs the RAN device to remove the multicast transmission channel used to send the data packet of the first multicast service includes:

The PGW sends a request message (for example, a multicast service termination request) for removing the multicast transmission channel to the MME, where the request message includes one or more of the following information: an identifier (for example, a multicast tunnel endpoint identifier M-TEID) corresponding to the multicast transmission channel used to send the data packet of the first multicast service, the identifier corresponding to the multicast service, a multicast bearer identifier, and the like.

The MME receives the request message used for removing the multicast transmission channel, and forwards, to the RAN device, the request message used for removing the multicast transmission channel.

The RAN device receives the request message used for removing the multicast transmission channel, deletes or deactivates context information (for example, including various configuration parameters related to the multicast transmission channel) of the multicast transmission channel indicated in the request message, releases resources configured for the multicast transmission channel, and returns, to the MME, a response message that is used to acknowledge that removal of the multicast transmission channel is completed.

In one embodiment, the MME may delete or deactivate the context information of the multicast transmission channel after receiving the request message that is sent by the PGW and that is used to remove the multicast transmission channel, or after receiving the corresponding message that is sent by the RAN device and that is used to acknowledge that removal of the multicast transmission channel is completed.

The MME sends, to the PGW, the response message used to acknowledge that removal of the multicast transmission channel is completed.

Operation 918: The PGW determines whether there is still a member of the first multicast service in a network served by the PGW.

That the PGW determines whether there is still a member of the first multicast service in a network served by the PGW includes: For example, the PGW reads the address of the first multicast service in the fourth report message, checks the updated network-level multicast member list, and if there is no valid information entry related to the first multicast service in the network-level multicast member list, considers that there is no member of the first multicast service.

In one embodiment, that the PGW may further send query information to determine whether there is still a member of the first multicast service in the terminal devices served by the PGW includes: For example, the PGW sends an IGMP/MLD query message to query whether there is still a terminal device that needs to receive the first multicast service or a terminal device that needs to receive any multicast service in the network served by the PGW, where the query message may be sent by the PGW to the terminal device by using the MME and the RAN device, or sent by the PGW to the terminal device by using the RAN device. After receiving the query message, if there is a first multicast service requirement or another multicast service requirement, the terminal device sends a report packet indicating the service requirement to the PGW. For a sending process, refer to operation 902 to operation 904. The PGW may update, based on a received report packet that is sent by any terminal device and that indicates the first multicast service requirement or any multicast service requirement, the network-level multicast member list maintained by the PGW. If the PGW does not receive, within a specified period of time after sending the query message, a report message that any terminal device requests to receive the first multicast service, the PGW may consider that there is no member of the first multicast service in the network served by the PGW.

Operation 919: The PGW sends a second request message to the network device. The second request message is used by the PGW to request the network device to disconnect the connection related to the first multicast.

For example, the PGW may send, to the network device by using a multicast management protocol such as IGMP/MLD or a multicast routing protocol such as PIM, a request message used to leave the first multicast service (for example, send the IGMP leave report) or leave the multicast routing tree corresponding to the first multicast service (for example, the PGW sends a prune request message for leaving the multicast routing tree). In the embodiments of the present application, the network device includes, for example, a multicast router in the data network, a query node, or a multicast server.

In another optional manner, for the MBMS/eMBMS network architecture, in operation 919, the MBMS GW may further send the second request message to the BM-SC, where the second request message is used to request the BM-SC to disconnect the connection related to the first multicast service to the network device, or is used to request the BM-SC to cancel receiving the data packet of the first multicast service.

Operation 919 is an optional operation, and is performed when a result of operation 918 is that the PGW determines that there is no member of the first multicast service in the network served by the PGW.

Operation 917 to operation 919 are processes in which the PGW maintains the network-level multicast member list and removes the multicast connection.

It should be understood that a difference between the method 900 and the method 400 or the method 500 lies in that network architectures of application scenarios are different. The method 400 or the method 500 is applied to a 5G network architecture, and the method 900 is applied to a 4G network architecture or an MBMS/eMBMS architecture. A difference between the method 800 and the method 900 lies in that, in the method 800, the data packet of the multicast service is transmitted between the PGW and the terminal device in a unicast mode, and in the method 900, the data packet of the multicast service is transmitted between the PGW and the RAN device in a multicast mode. For processes of some steps in the method 900, refer to corresponding steps in the method 800.

Therefore, in this embodiment of this application, the PGW processes a report message that the terminal device requests to start or terminate the multicast service, maintains the network-level multicast member list, and maintains the multicast connection to the network device. The PGW receives the data packet of the multicast service from the network device, replicates the data packet of the multicast service, and sends, in a multicast mode and according to a configured QoS rule, the data packet of the multicast service to the RAN device, and then the RAN device sends the data packet to the terminal device in a unicast mode or a multicast mode, so that the terminal device may obtain the multicast service by using a wireless network. This saves transmission resources of a backhaul link.

Figure 15A:
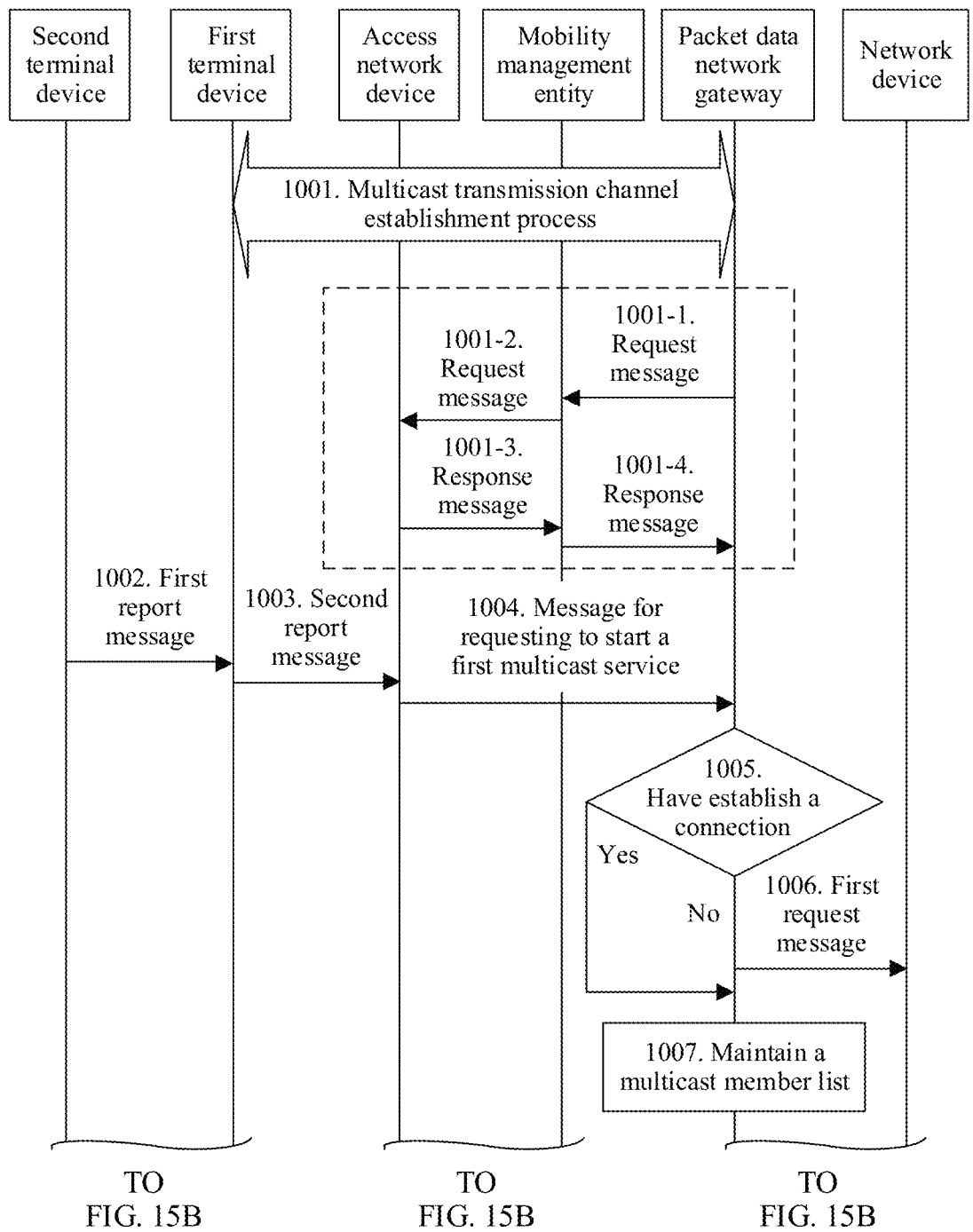
FIG. 15A and FIG. 15B are a schematic flowchart of a multicast service transmission method according to this application.
Figure 15B:
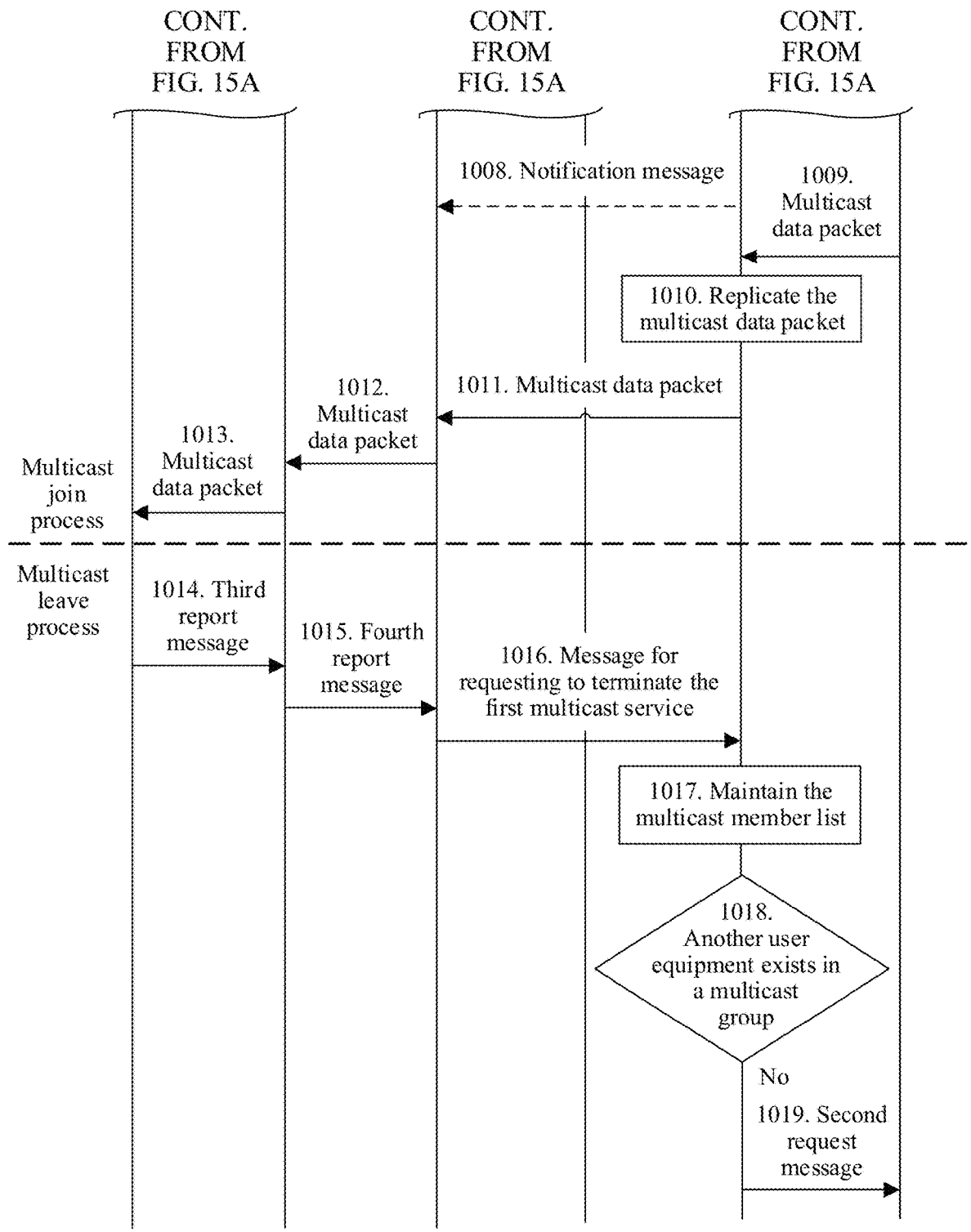

FIG. 15A and FIG. 15B is a schematic flowchart of a multicast service transmission method 1000 in a 4G network architecture according to this application. In the method 1000, a gateway device and a management device having a multicast service management function are a PGW. A data packet of a multicast service is sent between the PGW and a RAN device in a multicast mode. The RAN device has an IGMP proxy function.

In one embodiment, in this embodiment of this application, in an MBMS/eMBMS network architecture, the gateway device and the management device having the multicast service management function may alternatively be an MBMS GW. For ease of description, in this embodiment of this application, the solution is described by using an example in which the management device and the gateway device are the PGW. For steps and the method in the MBMS/eMBMS network architecture, refer to this embodiment of this application. During understanding, the PGW in the method 1000 is replaced with the MBMS GW. In one embodiment, if an MCE exists, signaling (for example, including a message related to establishment of a multicast transmission channel) sent between a RAN device and an MME will be transmitted by using the MCE.

As shown in FIG. 15A and FIG. 15B, the method 1000 includes the following content.

For understanding of operation 1001 to operation 1003, refer to descriptions of operation 901 to operation 903 in the method 900. Details are not described herein again.

Operation 1004: The RAN device sends, to the management device (for example, the PGW in this embodiment of this application) having the multicast service management function, a message for requesting to receive the first multicast service.

That the RAN device sends, to the PGW, a message for requesting to receive a first multicast service includes: The RAN device receives the second report message sent by the first terminal device. The second report message is a message (for example, an IGMP join report) for the first terminal device to request to receive the first multicast service, and the second report message includes an identifier corresponding to the first multicast service. In this case, the RAN device checks a cell-level multicast member list maintained by the RAN device. If in the cell-level multicast member list, the identifier that is corresponding to the first multicast service and that is in the first report message is not included, or in all valid information entries of the cell-level multicast member list, no terminal device corresponds to the identifier corresponding to the first multicast service, the RAN device serves as a device requesting the first multicast service, and sends, to the PGW, the message that the RAN device requests to receive the first multicast service (for example, the RAN device sends an IGMP join report for joining the first multicast service). The message includes the identifier corresponding to the first multicast service and an identifier of the RAN device (for example, an IP address of the RAN device). In one embodiment, the message further includes an identifier of the first terminal device or identifiers of all terminal devices (including the first terminal device) that request the first multicast service and that are served by the RAN device.

In an optional manner, a process in which the RAN device sends, to the PGW, the message that the RAN device requests to receive the first multicast service includes: The RAN device directly sends, to the PGW, the message that the RAN device requests to receive the first multicast service. For example, the RAN device may send, to the PGW and by directly using an EPS bearer between the first terminal device and the PGW or through another transmission channel (for example, a multicast S1 tunnel or a dedicated transmission tunnel for transmitting a request message related to the multicast service) between the RAN device and the PGW, the message that the RAN device requests to receive the first multicast service.

In another optional manner, a process in which the RAN device sends, to the PGW, the message that the RAN device requests to receive the first multicast service includes: The RAN device first sends, to the MME, the message that the RAN device requests to receive the first multicast service; and then the MME sends, to the PGW, the message that the RAN device requests to receive the first multicast service.

In this embodiment, the RAN device has the multicast service management capability. In one embodiment, the RAN device maintains the cell-level multicast member list based on the received second report message. For example, the RAN device is configured with the IGMP proxy function, and can read an IGMP join report or IGMP leave report sent by the first terminal device, and maintain the cell-level multicast member list. The cell-level multicast member list includes an identifier of the first multicast service and/or an identifier corresponding to a terminal device (including the first terminal device) that requests the first multicast service and that is served by the RAN device, and optionally further includes the identifier of the second terminal device. That the RAN device maintains a cell-level multicast member list based on the received second report message includes: For example, the RAN device reads the received second report message and learns that the first terminal device requests to receive the first multicast service. If the cell-level multicast member list maintained by the RAN device has stored a valid information entry that is of the first terminal device and that is corresponding to the identifier of the first multicast service, the RAN device does not need to update the cell-level multicast member list; otherwise, the RAN device adds, to the cell-level multicast member list maintained by the RAN device, an information entry that is of the first terminal device and that is corresponding to the identifier of the first multicast service, or modifies the cell-level multicast member list maintained by the RAN device, to be validate the information entry that is of the first terminal device and that is corresponding to the identifier of the first multicast service. The information entry that is of the first terminal device and that is corresponding to the identifier of the first multicast service includes: the identifier corresponding to the first multicast service, and/or the identifier corresponding to the first terminal device.

For example, for understanding of a form of the cell-level multicast member list maintained by the RAN device, refer to related descriptions in operation 204 of the method 200.

In an optional manner, operation 1002 to operation 1004 may be performed before operation 1001. That the PGW receives, in operation 1004, the message that the RAN device requests to receive the first multicast service, and triggers the process of starting establishment of the multicast transmission channel corresponds to the first of the three triggering modes described in operation 1001 of the method 1000. In other words, the multicast service request of the terminal device triggers the management device that performs multicast session management to start the process of establishing the multicast transmission channel.

Operation 1005: The PGW determines whether a connection related to the first multicast service has been established to the network device.

This includes: For example, the PGW reads the message that the RAN device requests to receive the first multicast service, and determines whether the PGW has established a connection relationship related to first multicast service with the network device. For example, the PGW may check a network-level multicast member list, and if the network-level multicast member list includes at least one valid information entry related to the first multicast service, the PGW may determine that the PGW has established the connection relationship related to the first multicast service with the network device; otherwise, the PGW may determine that the PGW has not established the connection relationship related to the first multicast service with the network device. In the embodiment of the present application, the network device may be, for example, a device such as a router/gateway supporting IP multicast in a data network DN, a multicast query node, or a multicast service server.

Operation 1006: The PGW sends a first request message to the network device. The first request message is used by the PGW to establish a connection related to the first multicast service to the network device.

For example, the PGW may send, to the network device by using a multicast management protocol such as IGMP/MLD or a multicast routing protocol such as PIM, a request message used to join the first multicast service (for example, send IGMP join) or used to join a multicast routing tree corresponding to the first multicast service (for example, send a graft request message for joining the multicast routing tree).

Operation 1006 is an optional operation, and is performed when the PGW determines in operation 1005 that the connection related to the first multicast has not been established to the network device.

In another optional manner, for the MBMS/eMBMS architecture, in operation 1006, the MBMS GW may further send the first request message to the BM-SC, where the first request message is used to request the BM-SC to establish the connection related to the first multicast service to the network device, or is used to request the BM-SC to receive the data packet of the first multicast service.

Operation 1007: The PGW maintains a network-level multicast member list.

The network-level multicast member list maintained by the PGW includes an identifier corresponding to each multicast service, corresponds to each multicast service, and further includes an information entry related to a RAN device that needs to receive the multicast service. In one embodiment, the network-level multicast member list further includes identifiers of all terminal devices (for example, the first terminal device) that request the first multicast service and that are served by the RAN device. For example, for understanding of the network-level multicast member list maintained by the PGW, refer to forms of Table 3 and Table 4 in operation 208 of the method 200, or refer to forms of Table 3 and Table 4 after the content in the column corresponding to the "Identifier of the terminal device" is removed.

A process in which the PGW maintains the network-level multicast member list includes: For example, the PGW reads the identifier of the first multicast service and the identifier of the RAN device that are in the message that the RAN device requests to receive the first multicast service. If there is no information entry corresponding to both the RAN device and the first multicast service in the network-level multicast member list maintained by the PGW, the PGW updates the network-level multicast member list. In one embodiment, the PGW adds an information entry corresponding to both the RAN device and the first multicast service to the network-level multicast member list, or validates an information entry corresponding to both the RAN device and the first multicast service. If there is already a valid information entry corresponding to both the RAN device and the first multicast service in the network-level multicast member list maintained by the PGW, the PGW may not need to update the network-level multicast member list. The information entry corresponding to both the RAN device and the first multicast service includes the identifier corresponding to the first multicast service, and/or the identifier of the RAN device. In one embodiment, the information entry further includes the identifier of the first terminal device or the identifiers of all terminal devices (including the first terminal device) that request the first multicast service and that are served by the RAN device.

In one embodiment, if there is already the valid information entry corresponding to both the RAN device and the first multicast service in the network-level multicast member list maintained by the PGW, and if the message that the RAN device requests to receive the first multicast service carries the identifier of the terminal device, where the identifier of the terminal device is the identifier of the first terminal device or the identifiers of all terminal devices (including the first terminal device) that request the first multicast service and that are served by the RAN device, the PGW may add the identifier of the terminal device to the valid information entry.

Operation 1005 to operation 1007 are processes in which the PGW establishes the multicast connection and maintains the network-level multicast member list.

In one embodiment, the PGW may first maintain the network-level multicast member list, and then establish the connection related to the first multicast service to the network device. In other words, operation 1007 is performed before operation 1005, or operation 1007 is performed before operation 1006. Whether the PGW first maintains the network-level multicast member list or first determines whether the PGW has established the connection related to the first multicast service to the network device is not limited in this application.

Operation 1008: The PGW sends a notification message to the RAN device.

The notification message sent by the PGW to the RAN device includes second configuration information. The second configuration information includes first indication information used to indicate a mode in which the PGW sends the data packet of the first multicast service to the RAN device, and/or second indication information used to indicate a mode in which the RAN device sends the data packet of the first multicast service to the terminal device.

In a possible example, the PGW may send the notification message to the RAN device by using the MME. Alternatively, in another possible example, the PGW directly sends the notification message to the RAN device or sends the notification message to the RAN device by using an SGW.

Operation 1009: The network device sends a data packet of the first multicast service to the PGW.

Operation 1010: The PGW receives the data packet that is of the first multicast service and that is sent by the network device, and replicates the data packet of the first multicast service.

That the PGW replicates the data packet of the first multicast service includes: The PGW queries a network-level multicast member list, learns of terminal devices that are served by the PGW and that are members of the first multicast service, and/or information about RAN devices that serve the terminal devices, and then, the PGW replicates the data packet based on a quantity of the RAN devices that serve the members of the first multicast. In one embodiment, the PGW may add, to a replicated data packet, one or more of the following information: information related to QoS guarantee, an identifier corresponding to the RAN device, the identifier corresponding to the first multicast service, and the like.

For example, multicast member information maintained by the PGW is shown in Table 3. The first multicast service corresponds to a program 1, and the members of the first multicast service include $UE_{11}$, $UE_{12}$, and $UE_{21}$. A $RAN_1$ device serves $UE_{11}$ and $UE_{12}$, and a $RAN_2$ device serves $UE_{21}$. After receiving a data packet of the program 1, the PGW needs to replicate two copies of the data packet based on the quantity of the RAN device serving the members of the first multicast, and sends replicated data packets to the $RAN_1$ device and the $RAN_2$ device respectively. In one embodiment, the PGW may add, to the replicated data packet, one or more of the following information: an identifier of a bearer to which the data packet of the first multicast service is mapped, an identifier of a multicast tunnel between the PGW and the RAN device (for example, an identifier M-TEID of a multicast transmission tunnel that is between the PGW and the RAN device and that corresponds to the multicast service), and the identifier corresponding to the first multicast service (for example, an identifier M-TEID 1 of the multicast transmission tunnel that is between the PGW and the RAN device and that corresponds to the first multicast service, or another identifier that can be uniquely mapped to the first multicast service).

Operation 1011: The PGW sends the data packet of the first multicast service to the RAN device.

The replicated data packet of the first multicast service is mapped to a proper bearer based on a QoS-related configuration (for example, a multicast service flow template TFT), and is sent to the RAN device. The RAN device serves the first terminal device, and the first terminal device is one of the members of the first multicast service.

Operation 1012: The RAN device receives the data packet that is of the first multicast service and that is sent by the PGW, and sends the data packet of the first multicast service to the first terminal device.

In an optional manner, the data packet that is of the first multicast service and that is received by the RAN device carries the identifier (for example, the M-TEID 1 or an IP address of the first multicast service) corresponding to the first multicast service. The RAN device determines, based on the identifier, that the data packet is the data packet of the first multicast service, and learns, based on the cell-level multicast member list maintained by the RAN device, of terminal devices that are served by the RAN device and that are members of the first multicast service.

If the second configuration information sent by the PGW to the RAN device in operation 1008 includes second indication information used to indicate the send mode of the data packet of the first multicast service between the RAN device and the terminal device, the RAN device may determine, based on the second indication information, that a send mode of the data packet of the first multicast service through an air interface is unicast or multicast. Alternatively, the RAN device determines, based on information (for example, a quantity of terminal devices requesting the first multicast service, and/or quality information of links between the terminal devices and the RAN device) included in the cell-level multicast member list maintained by the RAN device, that a send mode of the data packet of the first multicast service through an air interface is unicast or multicast.

If the RAN device determines to send the data packet of the first multicast service to the terminal device through an air interface in a unicast mode, the RAN device replicates a plurality of copies of the received data packet of the first multicast service (for example, the RAN device performs replication based on a quantity of the members of the first multicast service in the terminal devices served by the RAN device), and then sends replicated data packets respectively to the terminal devices (including the first terminal device) serving as the members of the first multicast service; or, if the RAN device determines to send the data packet of the first multicast service to the terminal device through an air interface in a multicast mode, the RAN device may configure a uniform air interface scheduling identifier for these terminal devices, where the uniform air interface scheduling identifier corresponds to the first multicast service, and the RAN device sends, by using the uniform air interface scheduling identifier, the data packet of the first multicast service to the terminal devices (including the first terminal device) serving as the members of the first multicast service.

Operation 1013 to operation 1015 are the same as operation 913 to operation 915 in the method 900. For understanding, refer to corresponding descriptions. Details are not described herein again.

Operation 1016: The RAN device sends, to the management device (for example, the PGW in this embodiment of this application) having the multicast service management function, a message for requesting to terminate the first multicast service.

That the RAN device sends, to the UPF, a message for requesting to terminate the first multicast service includes: For example, the RAN device receives the fourth report message sent by the first terminal device. The fourth report message is a message (for example, an IGMP leave report) for the first terminal device to request to terminate the first multicast service, and the fourth report message includes the identifier corresponding to the first multicast service. In this case, the RAN device updates a cell-level multicast member list maintained by the RAN device. In one embodiment, the RAN device deletes an information entry corresponding to both the first terminal device and the first multicast service from the cell-level multicast member list, or invalidates the information entry. If in all valid information entries of an updated cell-level multicast member list, no terminal device corresponds to the identifier corresponding to the first multicast service, the RAN device serves as the device requesting the first multicast service, and sends, to the PGW, the message that the RAN device requests to terminate the first multicast service (for example, the RAN device sends an IGMP leave report for terminating the first multicast service). The message includes the identifier corresponding to the first multicast service and the identifier of the RAN device (for example, the IP address of the RAN device). In one embodiment, the message further includes the identifier of the first terminal device.

In an optional manner, a process in which the RAN device sends, to the PGW, the message that the RAN device requests to terminate the first multicast service includes: The RAN device directly sends, to the PGW, the message that the RAN device requests to terminate the first multicast service. For example, the RAN device may send, to the PGW and by directly using an EPS bearer between the first terminal device and the PGW or through another transmission channel (for example, a multicast S1 tunnel or a dedicated transmission tunnel for transmitting a request message related to the multicast service) between the RAN device and the PGW, the message that the RAN device requests to terminate the first multicast service.

In another optional manner, a process in which the RAN device sends, to the PGW, the message that the RAN device requests to terminate the first multicast service includes: The RAN device first sends, to the MME, the message that the RAN device requests to terminate the first multicast service; and then the MME sends, to the PGW, the message that the RAN device requests to terminate the first multicast service.

Operation 1017: The PGW maintains a network-level multicast member list.

A process in which the PGW maintains a network-level multicast member list includes: For example, the PGW reads the identifier of the first multicast service and the identifier of the RAN device that are in the message sent by the RAN device for requesting to terminate the first multicast service. The PGW updates the network-level multicast member list. In one embodiment, the PGW deletes, from the network-level multicast member list, the information entry corresponding to both the RAN device and the first multicast service, or invalidates the information entry corresponding to both the RAN device and the first multicast service. The information entry corresponding to both the RAN device and the first multicast service includes the identifier corresponding to the first multicast service, and/or the identifier of the RAN device, and optionally, further includes the identifier of the first terminal device.

In one embodiment, if the PGW updates the network-level multicast member list based on the message for requesting to terminate the first multicast service, and the PGW determines that the send mode of the data packet of the first multicast service between the PGW and the RAN device changes (for example, changes from the multicast mode to the unicast mode), or the PGW determines that the send mode of the data packet of the first multicast service between the RAN device and the terminal device changes (for example, changes from the multicast mode to the unicast mode), the PGW sends the second configuration information to the RAN device. For content and a send mode of the second configuration information, refer to descriptions in operation 1008.

In one embodiment, after the PGW updates the network-level multicast member list, if there is no member of the first multicast service in the terminal devices served by the RAN device, and a multicast transmission channel (for example, the multicast S1/M1 tunnel established by performing operation 9011 to operation 9014) that is used to send the data packet of the first multicast service and that is between the PGW and the RAN device corresponds only to the first multicast service (for example, a multicast transmission tunnel corresponding to the identifier M-TEID 1 and used to send the data packet of the first multicast service), the PGW instructs the RAN device and the UPF to remove the multicast transmission channel used to send the data packet of the first multicast service; or, if the multicast transmission channel that is used to send the data packet of the first multicast service and that is between the PGW and the RAN device may be used to send data packets of a plurality of multicast services, and there is no member of the multicast service in the terminal devices served by the RAN device, the PGW instructs the RAN device to remove the multicast transmission channel used to send the data packet of the first multicast service, to release resources related to the multicast transmission channel.

For understanding of a process in which the PGW instructs the RAN device to remove the multicast transmission channel used to send the data packet of the first multicast service, refer to corresponding descriptions in operation 917 of the method 900. Details are not described again.

Operation 1018: The PGW determines whether there is still a member of the first multicast service in a network served by the PGW.

That the PGW determines whether there is still a member of the first multicast service in a network served by the PGW includes: For example, the PGW reads the identifier of the first multicast service in the message sent by the RAN device for requesting to terminate the first multicast service, and checks the updated network-level multicast member list. If there is no valid information entry related to the first multicast service in the network-level multicast member list, the PGW may consider that there is no member of the first multicast service.

In one embodiment, the PGW may further send query information to determine whether there is still a member of the first multicast service in a terminal device served by the SMF. This includes: For example, the PGW sends an IGMP/MLD query message to query whether there is still a terminal device that needs to receive the first multicast service or a terminal device that needs to receive any multicast service in a network served by the SMF. The query message may be directly sent by the PGW to the RAN device or sent by the PGW to the RAN device by using the SGW, or may be sent by the PGW to the RAN device by using the MME. After receiving the query message, the RAN device loops up the cell-level multicast member list maintained by the RAN device, and determines information about a member of the first multicast service or any multicast service. If the cell-level multicast member list still includes a valid information entry related to the first multicast service or any multicast service, the RAN device sends, to the PGW, a message indicating that the RAN device requests to receive the first multicast service or any multicast service. In one embodiment, before looking up the cell-level multicast member list maintained by the RAN device, the RAN device sends a query message to the terminal device served by the RAN device. The query message is used to query whether the terminal device further needs to receive the first multicast service or any multicast service. After the terminal device served by the RAN device (for example, the first terminal device) receives the query message, if the first terminal device has a first multicast service requirement or another multicast service requirement, or a second terminal device served by the first terminal device has a first multicast service requirement or another multicast service requirement, the first terminal device sends, to the RAN device, a report message (an IGMP join report) indicating the service requirement, the RAN device updates, based on the report message, the cell-level multicast member list maintained by the RAN device.

For understanding of a process in which, in response to the query message of the PGW, the terminal device sends the report message for requesting the multicast service to the RAN device and the RAN device sends the message for requesting the multicast service to the PGW, refer to descriptions in operation 1002 to operation 1004. The PGW may update, based on a received message that is sent by any RAN device and that indicates the first multicast service requirement or any multicast service requirement, the network-level multicast member list maintained by the PGW. If the PGW does not receive, within a specified period of time after sending the query information, a report message that any RAN device requests to receive the first multicast service, the PGW may consider that there is no member of the first multicast service in the network served by the PGW.

Operation 1019: The PGW sends a second request message to the network device. The second request message is used by the PGW to request the network device to disconnect the connection related to the first multicast.

For example, the PGW may send, to the network device by using a multicast management protocol such as IGMP/MLD or a multicast routing protocol such as PIM, a request message used to leave the first multicast service (for example, send the IGMP leave report) or leave the multicast routing tree corresponding to the first multicast service (for example, the PGW sends a prune request message for leaving the multicast routing tree). In the embodiments of the present application, the network device includes, for example, a multicast router in the data network, a query node, or a multicast server.

In another optional manner, for the MBMS/eMBMS network architecture, in operation 1019, the MBMS GW may further send the second request message to the BM-SC, where the second request message is used to request the BM-SC to disconnect the connection related to the first multicast service to the network device, or is used to request the BM-SC to cancel receiving the data packet of the first multicast service.

Operation 1019 is an optional operation, and is performed when a result of operation 1018 is that the PGW determines that there is no member of the first multicast service in the network served by the PGW.

Operation 1017 to operation 1019 are processes in which the PGW establishes the network-level multicast member list and removes the multicast connection.

It should be understood that a difference between the method 1000 and the method 600 or the method 700 lies in that network architectures of application scenarios are different. The method 600 or the method 700 is applied to a 5G network architecture, and the method 1000 is applied to a 4G network architecture or an MBMS/eMBMS architecture. A difference between the method 1000 and the method 900 lies in that, in the method 1000, the RAN device has the IGMP proxy capability, and may serve as a proxy of the terminal device to send a message related to a multicast service request to the management device managing the multicast service in a mobile core network. For processes of some operations in the method 1000, refer to corresponding steps in the method 900.

Therefore, in this embodiment of this application, the PGW maintains the network-level multicast member list, and maintains the multicast connection to the network device. The PGW receives the data packet of the multicast service from the network device, replicates the data packet of the multicast service, and sends, in a multicast mode and according to a configured QoS rule, the data packet of the multicast service to the RAN device, and then the RAN device sends the data packet to the terminal device in a unicast mode or a multicast mode, so that the terminal device may obtain the multicast service by using a wireless network. This saves transmission resources of a backhaul link. The RAN device is configured with the IGMP proxy function and has the multicast service management capability. The RAN device may serve as a proxy of the terminal device served by the RAN device to send the request message related to the multicast service to the management device having the multicast service management function. This reduces signaling transmission of the backhaul link.

In this embodiment of this application, if a local breakout network architecture is considered, a gateway device and a management device having a multicast service management function may alternatively be an LGW. For understanding of this architecture, refer to the method 900 or the method 1000. During understanding, the PGW described in the method is replaced with the LGW.

Figure 16:
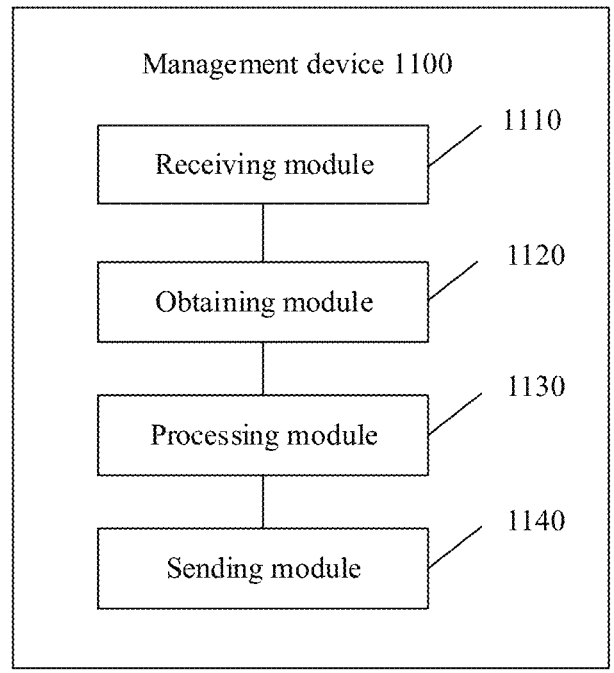
FIG. 16 is a schematic block diagram of a management device according to this application.

FIG. 16 is a schematic block diagram of a management device 1100 according to this application. As shown in FIG. 16, the management device 1100 includes:

a receiving module 1110, an obtaining module 1120, a processing module 1130, and a sending module 1140.

The receiving module 1110 is configured to receive a first message. The first message includes any one or more of the following: an identifier corresponding to a first multicast service, an indication for requesting to receive or terminate the first multicast service, an identifier corresponding to a terminal device requesting to receive or terminate the first multicast service, and an identifier corresponding to an access network device serving the terminal device.

The obtaining module 1120 is configured to obtain a quality of service parameter of the first multicast service.

The processing module 1130 is configured to update a multicast member list. The multicast member list includes any one or more of the following: an identifier corresponding to a multicast service whose connection has been established, an identifier corresponding to a terminal device requesting to receive the multicast service whose connection has been established, and/or an identifier of an access network device serving the terminal device.

The processing module 1130 is further configured to determine a mode in which a gateway device sends a data packet of the first multicast service to the access network device. The mode in which the gateway device sends a data packet of the first multicast service to the access network device includes: The gateway device sends the data packet of the first multicast service to the access network device in a multicast mode, or the gateway device sends the data packet of the first multicast service to the access network device in a unicast mode.

The sending module 1140 is configured to: instruct the gateway device to send the data packet of the first multicast service to the terminal device or the access network device, or instruct the gateway device to stop sending the data packet of the first multicast service to the terminal device or the access network device.

The sending module 1140 is configured to instruct the gateway device to establish a connection related to the first multicast service to a network device.

The sending module 1140 is configured to send a network-level multicast member notification message to the gateway device. The network-level multicast member notification message includes an identifier corresponding to an added or deleted terminal device that is served by the gateway device and that is in a member of the first multicast service, and/or the identifier corresponding to the first multicast service.

The sending module 1140 is configured to send a fourth message to the gateway device. The fourth message includes any one or more of the following: first configuration information including first indication information, indication information for adding or deleting a multicast member, the identifier corresponding to the added or deleted terminal device that is served by the gateway device and that is in the member of the first multicast service, an identifier corresponding to an access network device serving the terminal device, the identifier corresponding to the first multicast service. The first indication information is indication information used to indicate a send mode of the data packet of the first multicast service between the gateway device and the access network device.

The sending module 1140 is configured to send a third message to the access network device. The third message includes any one or more of the following: an indication for adding or deleting a multicast member, the identifier corresponding to the added or deleted terminal device that is served by the access network device and that is in the member of the first multicast service, and the identifier corresponding to the first multicast service. The member of the first multicast service includes the terminal device requesting to receive the first multicast service.

The sending module 1140 is configured to send a second message. The second message is used to query whether there is a device requesting to receive the first multicast service in a network served by the management device. The second message includes the identifier corresponding to the first multicast service, and the device includes a terminal device and an access network device. Alternatively, the second message is used to query whether there is a device requesting to receive any multicast service in a network served by the management device, and the device includes a terminal device and an access network device.

The sending module 1140 is further configured to send second configuration information to the access network device. The second configuration information includes any one or more of the following information: the first indication information used to indicate a mode in which the gateway device sends the data packet of the first multicast service to the access network device, and second indication information used to indicate a mode in which the access network device sends the data packet of the first multicast service to the terminal device.

In one embodiment, the management device 1100 may correspond to the SMF in the method 200, the UPF in the method 300, the SMF in the method 400, the UPF in the method 500, the SMF in the method 600, the UPF in the method 700, the PGW in the method 800, the PGW in the method 900, and the PGW or MBMS GW in the method 1000.

In one embodiment, the receiving module 1110, the obtaining module 1120, the processing module 1130, and the sending module 1140 are configured to perform operations of the management device corresponding to any one of the multicast service transmission method 200 to method 1000 in this application. For brevity, details are not described herein again.

Figure 17:
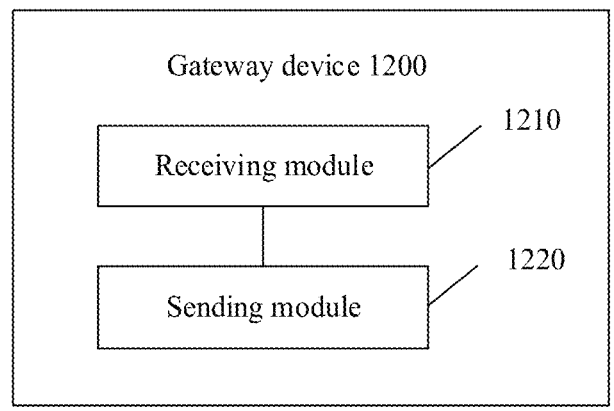
FIG. 17 is a schematic block diagram of a gateway device according to this application.

FIG. 17 is a schematic block diagram of a gateway device 1200 according to this application. As shown in FIG. 17, the gateway device 1200 includes:

a receiving module 1210 and a sending module 1220.

The receiving module 1210 is configured to receive a data packet that is of a first multicast service and that is sent by a network device.

The receiving module 1210 is further configured to: receive a message that a management device instructs the gateway device to establish a connection related to the first multicast service to a network device, or receive a message that a management device instructs the gateway device to disconnect a multicast connection related to the first multicast service to a network device.

The sending module 1220 is configured to send the data packet of the first multicast service to an access network device. That the gateway device sends the data packet of the first multicast service to the access network device includes: The gateway device sends the data packet of the first multicast service to the access network device in a multicast mode, or the gateway device sends the data packet of the first multicast service to the access network device in a unicast mode.

The sending module 1220 is further configured to: send the data packet of the first multicast service to the access network device through a first channel, where the first channel is a channel for transmitting the data packet of the first multicast service; or send the data packet of the first multicast service to the access network device through a second channel, where the second channel is a channel for transmitting data packets of a plurality of different multicast services.

In one embodiment, the gateway device 1200 may correspond to the UPF in the method 200, the UPF in the method 300, the UPF in the method 400, the UPF in the method 500, the UPF in the method 600, the UPF in the method 700, the PGW in the method 800, the PGW in the method 900, and the PGW or MBMS GW in the method 1000.

In one embodiment, the receiving module 1210 and the sending module 1220 are configured to perform operations of the gateway device corresponding to any one of the multicast service transmission method 200 to method 1000 in this application. For brevity, details are not described herein again.

Figure 18:
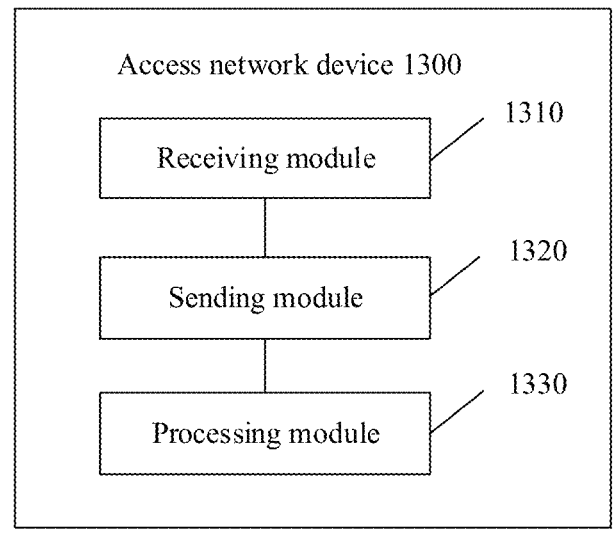
FIG. 18 is a schematic block diagram of an access network device according to this application.

FIG. 18 is a schematic block diagram of an access network device 1300 according to this application. As shown in FIG. 18, the access network device 1200 includes:

a receiving module 1310, a sending module 1320, and a processing module 1330.

The receiving module 1310 is configured to receive a data packet that is of a first multicast service and that is from a gateway device.

The sending module 1320 is configured to send the data packet of the first multicast service to a terminal device. That the access network device sends the data packet of the first multicast service to the terminal device includes: The access network device sends the data packet of the first multicast service to the terminal device in a multicast mode, or the access network device sends the data packet of the first multicast service to the terminal device in a unicast mode.

The receiving module 1310 is further configured to: receive a third message from a management device, where the third message includes any one or more of the following: an instruction for adding or deleting a multicast member, an identifier corresponding to an added or deleted terminal device, and an identifier corresponding to the first multicast service; or receive a fifth message from the terminal device, where the fifth message is a message used by the terminal device to request to receive or terminate the first multicast service, and the fifth message includes any one or more of the following: an identifier corresponding to the first multicast service and an identifier corresponding to the terminal device.

The processing module 1330 is configured to update a multicast member list. The multicast member list includes: an identifier corresponding to a multicast service whose connection has been established, and/or an identifier corresponding to a terminal device requesting to receive the multicast service whose connection has been established.

The receiving module 1310, the sending module 1320, and the processing module 1330 are configured to perform operations of the access network device corresponding to any one of the multicast service transmission method 200 to method 1000 in this application. For brevity, details are not described herein again.

Figure 19:
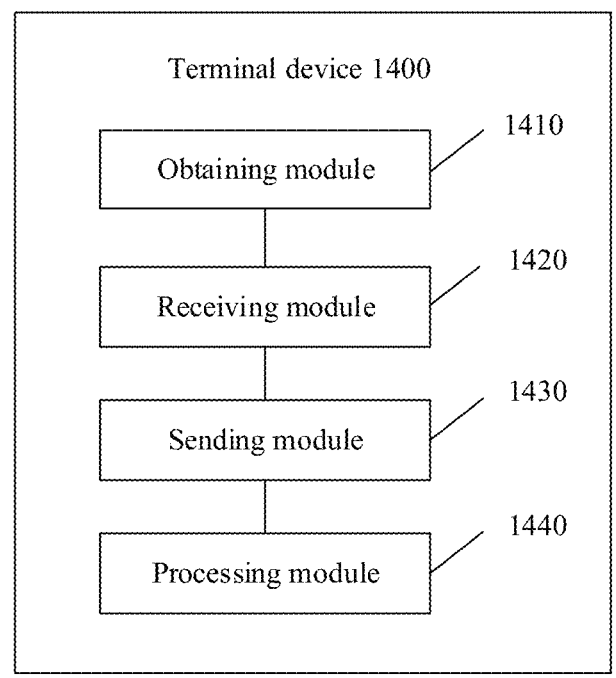
FIG. 19 is a schematic block diagram of a terminal device according to this application.

FIG. 19 is a schematic block diagram of a terminal device 1400 according to this application. As shown in FIG. 19, the terminal device 1400 includes:

an obtaining module 1410, a receiving module 1420, a sending module 1430, and a processing module 1440.

The obtaining module 1410 is configured to obtain a multicast service session connection indication.

The obtaining module 1420 is configured to receive a seventh message sent by a second terminal device. The seventh message includes any one or more of the following: an identifier corresponding to a first multicast service, an indication for requesting to receive or terminate the first multicast service, and an identifier of the second terminal device.

The receiving module 1420 is configured to receive a data packet that is of the first multicast service and that is sent by an access network device.

The sending module 1430 is configured to send first request information to the access network device based on the multicast service session connection indication. The first request information is used to request establishment of a session supporting a multicast service.

The sending module 1430 is further configured to send an eighth message to the access network device. The eighth message includes any one or more of the following: the identifier corresponding to the first multicast service, the indication for requesting to receive or terminate the first multicast service, an identifier corresponding to the first terminal device, and the identifier of the second terminal device.

The processing module 1440 is configured to update a multicast member list. The multicast member list includes any one or more of the following: an identifier corresponding to a multicast service that can be received by the first terminal device, and an identifier corresponding to the second terminal device.

In one embodiment, the obtaining module 1410, the receiving module 1420, the sending module 1430, and the processing module 1440 are configured to perform operations of the first terminal device corresponding to any one of the multicast service transmission method 200 to method 1000 in this application. For brevity, details are not described herein again.

The foregoing management device, gateway device, access network device, and terminal device are completely corresponding to the management device, the gateway device, the access network device, and the terminal device that are in the method embodiments, and corresponding modules perform corresponding steps. For details, refer to the corresponding method embodiments.

Figure 20:
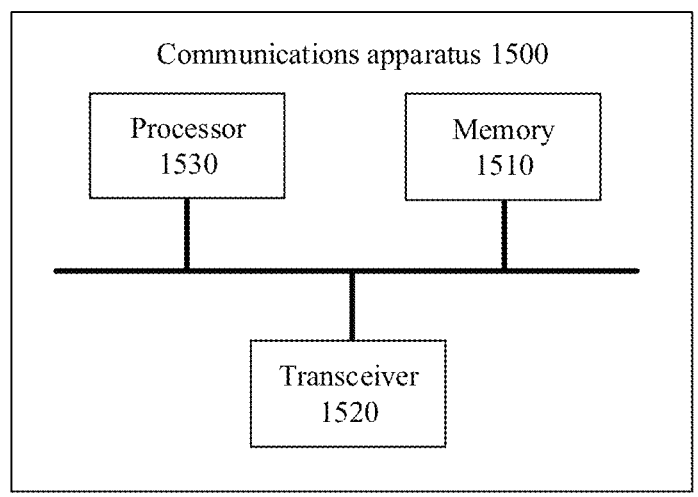
FIG. 20 is a schematic block diagram of a communications apparatus according to this application.

FIG. 20 is a schematic block diagram of a communications apparatus 1500 according to this application. The communications apparatus 1500 includes:

a memory 1510, configured to store a program, where the program includes code;

a transceiver 1520, configured to communicate with another device; and a processor 1530, configured to execute the program code in the memory 1510.

In one embodiment, when the code is executed, the processor 1530 may implement operations of the method 200 to the method 1000. For brevity, details are not described herein again. In this case, the communications apparatus 1400 may be a management device, a gateway device, an access network device, or a terminal device. The transceiver 1520 is configured to be driven by the processor 1530 to send/receive a signal.

The communications apparatus 1500 may be the foregoing management device, gateway device, access network device, and terminal device, and perform an operation of a processing module. The transceiver may include at least one of the following: an interface circuit, a transmitter, and a receiver, and these separately perform corresponding steps of a sending module and a receiving module.

This application further provides a chip system, including at least one processor. The at least one processor is configured to execute a stored instruction, so that a management device, a gateway device, an access network device, or a terminal device can perform operations corresponding to the management device, the gateway device, the access network device, or the terminal device in the foregoing methods.

This application further provides a computer program product. The computer program product includes an instruction. When the instruction is executed, the management device, the gateway device, the access network device, or the terminal device may perform operations corresponding to the management device, the gateway device, the access network device, or the terminal device in the foregoing methods.

A person of ordinary skill in the art may be aware that, in combination with the units and algorithm steps in the examples described in the embodiments disclosed in this specification, this application may be implemented by electronic hardware or a combination of electronic hardware and computer software. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the modules or units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instruction is loaded and executed on a computer, the procedure or functions according to the embodiments of this application are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive, SSD), or the like.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A multicast service transmission method, comprising:
   receiving, by a management device, a first message, wherein the first message comprises one or more of the following: an identifier corresponding to a first multicast service, an indication for requesting to receive or terminate the first multicast service, an identifier corresponding to a terminal device requesting to receive or terminate the first multicast service, or an identifier corresponding to an access network device serving the terminal device;
   sending, by the management device, configuration information of a first multicast service flow to a gateway device, wherein the first multicast service flow comprises at least one packet filtering rule corresponding to a Quality of Service (QOS) flow matching the first multicast service; and
   instructing, by the management device, the gateway device to send a data packet of the first multicast service to the terminal device or the access network device based on the at least one packet filtering rule, or instructing, by the management device, the gateway device to stop sending a data packet of the first multicast service to the terminal device or the access network device.

2. The method according to claim 1, further comprising:
   instructing, by the management device, the gateway device to establish a connection related to the first multicast service to a network device.

3. The method according to claim 2, further comprising:
   when a valid information entry of a multicast member list does not comprise an information entry of the first multicast service, instructing, by the management device, the gateway device to disconnect the connection related to the first multicast service to the network device.

4. The method according to claim 1, further comprising:
   sending, by the management device, a second message, wherein the second message is used to query whether there is a device requesting to receive the first multicast service in a network served by the management device, the second message comprises the identifier corresponding to the first multicast service, and the device comprises the terminal device and the access network device; or
   the second message is used to query whether there is a device requesting to receive a multicast service in a network served by the management device, and the device comprises the terminal device and the access network device.

5. The method according to claim 1, wherein the identifier corresponding to the terminal device comprises one or more of the following:
   an identifier of the terminal device, an identifier of a connection session established by the terminal device, a bearer identifier of the terminal device, a tunnel identifier corresponding to a session or a bearer of the terminal device, an identifier of the access network device serving the terminal device, and an identifier of a cell serving the terminal device.

6. The method according to claim 1, further comprising:
   sending, by the management device, second configuration information to the access network device, wherein the second configuration information comprises one or more of the following information: first indication information used to indicate a mode in which the gateway device sends the data packet of the first multicast service to the access network device, and second indication information used to indicate a mode in which the access network device sends the data packet of the first multicast service to the terminal device, wherein
   the mode in which the gateway device sends the data packet of the first multicast service to the access network device comprises that the gateway device sends the data packet of the first multicast service to the access network device in a unicast mode or a multicast mode, and the mode in which the access network device sends the data packet of the first multicast service to the terminal device comprises that the access network device sends the data packet of the first multicast service to the terminal device in the unicast mode or the multicast mode.

7. The method according to claim 1, further comprising:
   sending, by the management device, a third message to the access network device, wherein the third message comprises one or more of the following: an indication for adding or deleting a multicast member, an identifier corresponding to an added or deleted terminal device that is served by the access network device and that is in a member of the first multicast service, and the identifier corresponding to the first multicast service; and the member of the first multicast service comprises the terminal device requesting to receive the first multicast service.

8. The method according to claim 1, wherein a function of the management device and a function of the gateway device are set in a same device.

9. The method according to claim 1, further comprising:
   obtaining, by the management device, a quality of service parameter of the first multicast service; and
   sending, by the management device, a quality of service profile to the access network device, wherein
   the quality of service profile comprises an identifier of the quality of service flow (QOS) flow corresponding to the first multicast service, and a quality of service parameter corresponding to the QoS flow; or
   the quality of service profile comprises an identifier of a bearer corresponding to the first multicast service, and a quality of service parameter corresponding to the bearer.

10. The method according to claim 1, further comprising:
    sending, by the management device, a fourth message to the gateway device, wherein the fourth message comprises one or more of the following: first configuration information comprising first indication information, indication information for adding or deleting a multicast member, the identifier corresponding to the added or deleted terminal device that is served by the gateway device and that is in a member of the first multicast service, the identifier corresponding to the access network device serving the terminal device, and the identifier corresponding to the first multicast service; and the first indication information is used to indicate a send mode of the data packet of the first multicast service between the gateway device and the access network device.

11. The method according to claim 1, wherein the configuration information of the first multicast service flow comprises a service data flow (SDF) template related to the first multicast service, and the SDF template comprises the at least one packet filtering rule that is used by the gateway device to map, according to the packet filtering rule, a received data packet of the first multicast service to the QoS flow matching with the first multicast service for the sending.

12. The method according to claim 2, further comprising:
sending, by the management device, a second notification message to the gateway device, wherein the second notification message is used to instruct the gateway device to disconnect the connection that is of the first multicast service and that is established to the network device.

13. A multicast service transmission method, comprising:
receiving, by a gateway device, configuration information of a first multicast service flow from a management device, wherein the first multicast service flow comprises at least one packet filtering rule corresponding to a Quality of Service (QOS) flow matching a first multicast service;
receiving, by the gateway device, a data packet that is of the first multicast service and that is sent by a network device; and
sending, by the gateway device, the data packet of the first multicast service to an access network device based on the at least one packet filtering rule, wherein the sending, by the gateway device, the data packet of the first multicast service to the access network device comprises: sending, by the gateway device, the data packet of the first multicast service to the access network device in a multicast mode, or sending, by the gateway device, the data packet of the first multicast service to the access network device in a unicast mode.

14. The method according to claim 13, wherein the sending, by the gateway device, the data packet of the first multicast service to the access network device in the multicast mode comprises:
sending, by the gateway device, the data packet of the first multicast service to the access network device through a first channel, wherein the first channel is for transmitting the data packet of the first multicast service; or
sending, by the gateway device, the data packet of the first multicast service to the access network device through a first channel, wherein the first channel is for transmitting data packets of a plurality of different multicast services.

15. The method according to claim 13, wherein the sending, by the gateway device, the data packet of the first multicast service to the access network device in the unicast mode comprises:
replicating, by the gateway device, a received data packet of the first multicast service according to a plurality of terminal devices requesting to receive the first multicast service, wherein the data packet that is of the first multicast service and that is obtained after the replication comprises a first identifier, and the first identifier is used to indicate a terminal device from the plurality of terminal devices requesting to receive the data packet of the first multicast service; or the sending, by the gateway device, the data packet of the first multicast service to the access network device in the multicast mode comprises:
replicating, by the gateway device, a received data packet of the first multicast service according to a plurality of access network devices serving the plurality of terminal devices requesting to receive the first multicast service, wherein the data packet that is of the first multicast service and that is obtained after the replication comprises a second identifier, and the second identifier is used to indicate the first multicast service.

16. The method according to claim 13, wherein the configuration information of the first multicast service flow comprises a service data flow (SDF) template related to the first multicast service, and the SDF template comprises the at least one packet filtering rule that is used by the gateway device to map; and wherein the method further comprises:
mapping, by the gateway device, a received data packet of the first multicast service to the QOS flow matching with the first multicast service for the sending according to the at least one packet filtering rule.

17. The method according to claim 13, wherein the sending, by the gateway device, the data packet of the first multicast service to the access network device in the multicast mode comprises:
sending, by the gateway device, the data packet of the first multicast service to the access network device in the multicast mode, and sending, by the access network device, the data packet of the first multicast service to a terminal device in the unicast mode; or
wherein the sending, by the gateway device, the data packet of the first multicast service to the access network device in the unicast mode comprises: sending, by the gateway device, the data packet of the first multicast service to the access network device in the unicast mode, and sending, by the access network device, the data packet of the first multicast service to the terminal device in the multicast mode.

18. The method according to claim 13, further comprising:
receiving, by the gateway device, indication information from a terminal device through the access network device, wherein the indication information is used to indicate that a Protocol Data Unit (PDU) session requested by the terminal device requires support of a multicast service.

19. The method according to claim 18, wherein the indication information is a specific access point name (APN), data network name (DNN), or network slice identifier (slice ID).

20. The method according to claim 13, further comprising:
receiving, by the gateway device, second notification message from the management device, wherein the second notification message is used to instruct the gateway device to disconnect a connection that is of the first multicast service and that is established to the network device.

* * * * *